United States Patent
Baker et al.

(10) Patent No.: US 11,587,185 B2
(45) Date of Patent: Feb. 21, 2023

(54) ACCOUNTING PLATFORM FUNCTIONALITIES

(71) Applicant: Ford Squared Technologies LLC., Farmers Branch, TX (US)

(72) Inventors: Stanford C. Baker, Farmers Branch, TX (US); David L. Knedlik, Rowlett, TX (US); Joseph Brandon Abesamis, Ft. Worth, TX (US); Tyler Adams, Ft. Worth, TX (US)

(73) Assignee: Ford Squared Technologies LLC, Farmers Branch, TX (US)

( * ) Notice: Subject to any disclaimer, the term of this patent is extended or adjusted under 35 U.S.C. 154(b) by 156 days.

(21) Appl. No.: 17/174,112

(22) Filed: Feb. 11, 2021

(65) Prior Publication Data
US 2021/0174458 A1 Jun. 10, 2021

Related U.S. Application Data

(63) Continuation of application No. 16/898,286, filed on Jun. 10, 2020, now Pat. No. 10,956,989.
(Continued)

(51) Int. Cl.
*G06Q 40/02* (2012.01)
*G06Q 40/12* (2023.01)
(Continued)

(52) U.S. Cl.
CPC ......... *G06Q 40/123* (2013.12); *G06F 3/0486* (2013.01); *G06F 8/77* (2013.01);
(Continued)

(58) Field of Classification Search
CPC .... G06Q 40/123; G06Q 10/10; G06Q 30/018; G06Q 40/02; G06Q 50/26; G06F 3/0486; G06F 8/77; G06F 9/54; G06F 3/0482
(Continued)

(56) References Cited

U.S. PATENT DOCUMENTS 7,120,597 B1 * 10/2006 Knudtzon .............. G06Q 40/12
705/30
7,885,889 B2 2/2011 Oppenheimer et al.
(Continued)

FOREIGN PATENT DOCUMENTS

EP 3983890 A1 4/2022
WO WO-2020-252073 12/2020

OTHER PUBLICATIONS

Gellis, "Corporate tax microcomputer software: concepts features and concepts", The CPA Journal 59.n11: p84(4), New York Society of Certified Public Accountants, November. (Year: 1989).*
(Continued)

*Primary Examiner* — Frantzy Poinvil
(74) *Attorney, Agent, or Firm* — King IAM LLC

(57) ABSTRACT

Novel tools and techniques are provided for implementing accounting platform functionalities. In various embodiments, a computing system might access a data file(s) associated with a first entity from a first accounting software system among a plurality of accounting software systems, each operating based on corresponding one of two or more commercial accounting software that are different from and/or incompatible with each other. The computing system might autonomously extract transaction data corresponding to a transaction entry for each individual transaction. The computing system might autonomously generate a transaction-based trial balance based on the extracted transaction data, the generated transaction-based trial balance serving as a living trial balance that is continually updated based on updated or new transaction data that is accessed from the first accounting software system. The computing system might autonomously generate one of a tax trial balance or an adjusted trial balance, based on the generated transaction-based trial balance.

28 Claims, 27 Drawing Sheets

Related U.S. Application Data

(60) Provisional application No. 62/859,969, filed on Jun. 11, 2019.

(51) Int. Cl.

| | |
|---|---|
| *G06Q 10/10* | (2023.01) |
| *G06Q 40/10* | (2023.01) |
| *G06Q 30/018* | (2023.01) |
| *G06F 9/54* | (2006.01) |
| *G06F 8/77* | (2018.01) |
| *G06F 3/0486* | (2013.01) |
| *G06Q 50/26* | (2012.01) |
| *G06F 3/0482* | (2013.01) |

(52) U.S. Cl.
CPC ............ *G06F 9/54* (2013.01); *G06Q 10/10* (2013.01); *G06Q 30/018* (2013.01); *G06Q 40/02* (2013.01); *G06Q 40/10* (2013.01); *G06Q 50/26* (2013.01); *G06F 3/0482* (2013.01)

(58) Field of Classification Search
USPC ...................................................... 705/3–44
See application file for complete search history.

(56) References Cited

U.S. PATENT DOCUMENTS

| | | | | |
|---|---|---|---|---|
| 8,078,508 | B1* | 12/2011 | Shieh ..................... | G06Q 40/12 |
| | | | | 705/30 |
| 8,306,888 | B2 | 11/2012 | Blasnik et al. | |
| 8,332,286 | B1* | 12/2012 | Lopes .................... | G06Q 10/06 |
| | | | | 705/68 |
| 8,386,352 | B1* | 2/2013 | Bhatt ..................... | G06Q 40/02 |
| | | | | 705/30 |
| 8,442,850 | B2 | 5/2013 | Schorr et al. | |
| 8,924,269 | B1 | 12/2014 | Seubert et al. | |
| 9,600,536 | B1* | 3/2017 | Atar ..................... | G06F 16/2458 |
| 10,628,893 | B1 | 4/2020 | Vogel et al. | |
| 10,956,989 | B2 | 3/2021 | Baker et al. | |
| 2001/0044762 | A1* | 11/2001 | Nault ..................... | G06Q 40/12 |
| | | | | 705/30 |
| 2005/0102226 | A1 | 5/2005 | Oppenheimer et al. | |
| 2005/0222928 | A1* | 10/2005 | Steier ..................... | G06Q 40/00 |
| | | | | 705/35 |
| 2009/0276340 | A1* | 11/2009 | Knapp .................... | G06Q 30/04 |
| | | | | 705/30 |
| 2012/0059746 | A1 | 3/2012 | Thomas et al. | |
| 2012/0101936 | A1* | 4/2012 | Hakim .................... | G06Q 40/12 |
| | | | | 705/38 |
| 2012/0303494 | A1 | 11/2012 | Olave et al. | |
| 2013/0246233 | A1* | 9/2013 | Hakim .................. | G06Q 40/025 |
| | | | | 705/30 |
| 2013/0262279 | A1 | 10/2013 | Finley et al. | |
| 2013/0332324 | A1 | 12/2013 | Mischell et al. | |
| 2014/0258054 | A1 | 9/2014 | Seawall | |
| 2015/0046303 | A1* | 2/2015 | Cerrelli .................. | G06Q 40/12 |
| | | | | 705/30 |
| 2015/0106246 | A1 | 4/2015 | Krishna | |
| 2016/0078555 | A1 | 3/2016 | Nault | |
| 2016/0275626 | A1 | 9/2016 | Lee | |
| 2020/0394723 | A1 | 12/2020 | Baker et al. | |
| 2021/0049706 | A1* | 2/2021 | Seawall ................. | G06Q 40/10 |
| 2021/0166330 | A1 | 6/2021 | Baker et al. | |

OTHER PUBLICATIONS

Sullivan, :"Accounting Software", PC Week 6.n22:p107(1), Ziff Davis Enterprise, Jun. 5, 1989.*
U.S. Appl. No. 16/898,286 Non-Provisional Application, filed Jun. 10, 2020; 177 pages.
International Application No. PCT /US20/37070 International Application, filed on Jun. 10, 2020, 167 pages.
International Search Report & Written Opinion, International Application No. PCT/US20/37070, dated Sep. 21, 2020, 11 pages.
U.S. Appl. No. 16/898,286 Notice of Allowance, dated Feb. 3, 2021, 32 pages.
International Preliminary Report on Patentability, International Application No. PCT/US20/37070, dated Dec. 14, 2021, 7 pages.

* cited by examiner

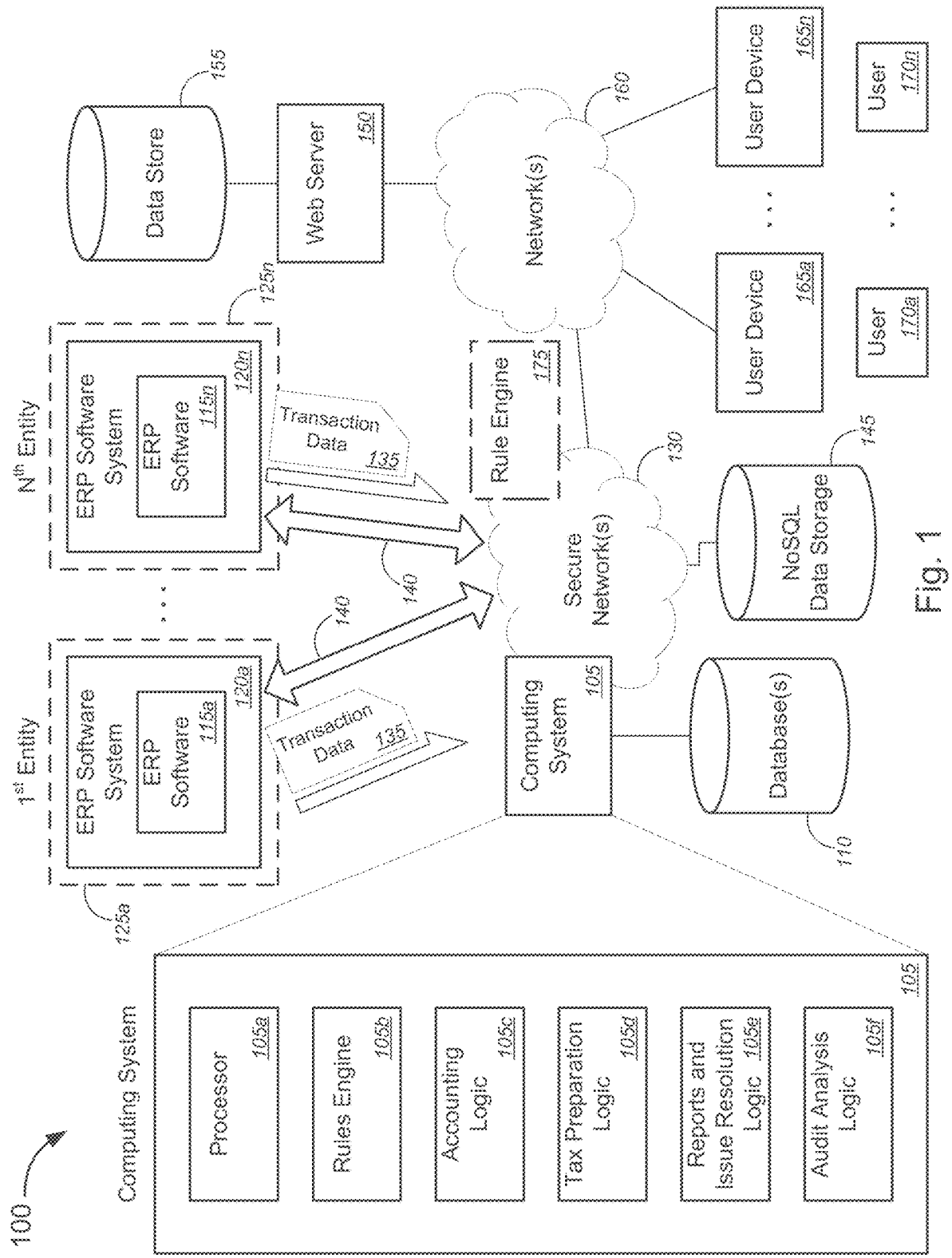

Original Chart of Accounts — 405

| Account # | Account Name |
|---|---|
| 1100 | Cash |
| 1110 | Change and Petty Cash |
| 1120 | Operating Account |
| 1200 | Accounts Receivable |
| 1210 | Trade (Customers) |
| 1300 | Inventory |
| 2100 | Accounts Payable |
| 2400 | Accrued Expenses |
| 2410 | Salaries and Wages |
| 2430 | Rent |
| 2450 | Interest |
| 2480 | Utilities |

Transition Chart of Accounts — 410

| Account # | Account Name |
|---|---|
| 0.1100 | Cash |
| 0.1110 | Change and Petty Cash |
| 0.1120 | Operating Account |
| 0.1200 | Accounts Receivable |
| 0.1210 | Trade (Customers) |
| 0.1300 | Inventory |
| 0.2100 | Accounts Payable |
| 0.2400 | Accrued Expenses |
| 0.2410 | Salaries and Wages |
| 0.2430 | Rent |
| 0.2450 | Interest |
| 0.2480 | Utilities |

Mapped Chart of Accounts — 415

| Account # | Account Name |
|---|---|
| 10000 | Cash |
| 10012 | Petty Cash |
| 10015 | Operating Account - SLAB |
| 11000 | Accounts Receivable |
| 11003 | Accounts Receivable, Trade |
| 12100 | Inventory Asset |
| 20000 | Accounts Payable |
| 21000 | Accrued Expenses |
| 60100 | Salaries and Wages |
| 60300 | Rent Expense |
| 63400 | Interest |
| 66300 | Utilities |

FIG. 4

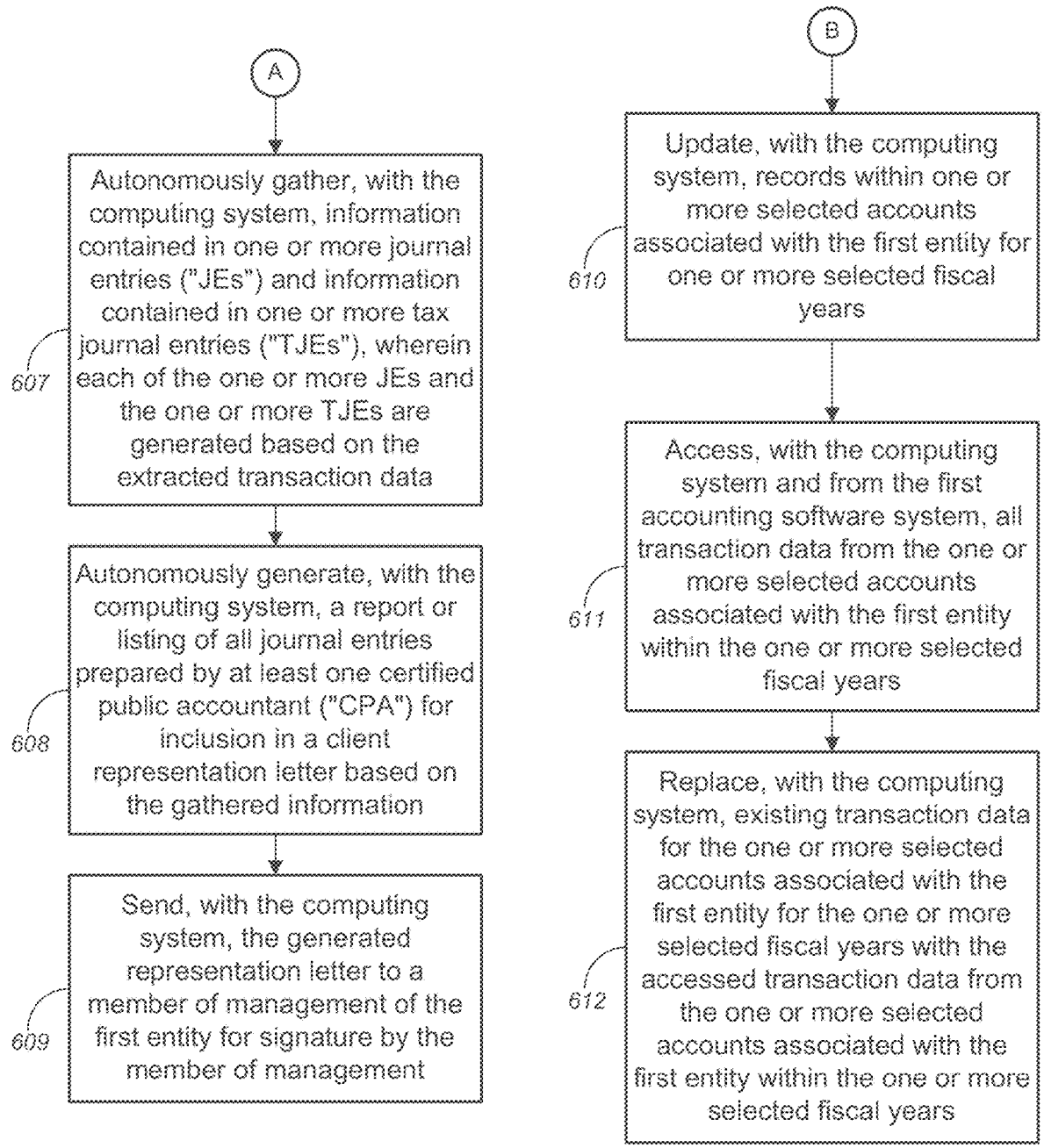

ACCOUNTING PLATFORM FUNCTIONALITIES

CROSS-REFERENCES TO RELATED APPLICATIONS

This application is a continuation application of U.S. patent application Ser. No. 16/898,286 (the "'286 application"), filed Jun. 10, 2020 now U.S. Pat. No. 10,956,989, issued 23 Mar. 2021 by Stanford C. Baker et al. entitled, "Accounting Platform Functionalities," which claims priority to U.S. Patent Application Ser. No. 62/859,969 (the "'969 application"), filed Jun. 11, 2019 by Stanford C. Baker et al. entitled, "Method and System for Implementing Accounting Platform Functionalities," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing accounting software functionalities, and, more particularly, to methods, systems, and apparatuses for implementing accounting platform functionalities.

BACKGROUND

Certified Public Accountants ("CPAs"), enrolled agents, tax preparers, and other accounting advisors are faced with the problem that each of their clients use different accounting software packages, with different chart of accounts, saved in different locations, transmitted to them in a variety of ways (e.g., as .pdf files, as backups, as Microsoft Excel documents, as printed copies of financial statements, trial balances, and general ledgers, etc.). The files are all received in the first quarter of the year and the CPA or tax preparer must transfer that data onto their platform and convert it into a workflow so that they can determine what taxable income is before extensions are due on March 15 (for business returns and many states) and April 15 (for the individual returns of business owners). Additionally, financial statements need to be audited, reviewed, or compiled for their clients' lenders and investors. With a limited number of exceptions, every client has the exact same deadlines. As a result of this, the typical tax practitioner needs to do significantly more work on 100% of their clients than time allows in that window of about 60 days ending on April 15th. Meanwhile, the firm's auditors are working on delivering the financial statements. Since the method of delivering the data to the CPA is different for every client, there is no real way to automate this workflow and the transfer back and forth of accounting data and the subsequent adjustments creates many hardships.

Any chance to "get ahead" or start early on clients involves logging in remotely to hundreds of different client accounting systems and individually accessing the files, keeping up with login credentials, user names and passwords, etc., so they can manually export the aforementioned accounting data, update depreciation schedules, check on reconciliations, and update accrued income and expense, etc. If there is no remote login capability provided by their client, schedules and reports are exported to excel or printed to a .PDF document to electronically transmit to the CPA, so that the CPA can use those documents to plan or to get ahead. However, these efforts are still limited by the calendar. Balances collected before year-end will all change before year-end. They cannot be entered on to a tax return or placed into financial statements due to the fact that they will change. A CPA cannot start updating his actual workflow because every balance could change before year-end and updating his workflow only to have to enter new numbers after year-end is a waste of time that the CPA does not have. If a client's balances change after a December 31 trial balance has been used, the only thing a CPA can do is to replace the old trial balance with a new one, and then make sure that the work previously done still ties to the new numbers. Work is typically performed and documented directly on the schedules containing the interim balances. That workpaper containing interim balances may be where year-end strategies are documented, questions on fluctuations in client activities are answered, and plans made are all documented on a schedule containing balances that have nothing to do with the actual balances at year-end. The plans and strategies documented on the interim balance workpapers are not part of a workflow for the year-end balances, because the interim balances are not relevant to year-end balances. They are only interim measurements or subtotals calculated during the year (i.e., the total calculated for a list of numbers is not affected by the inclusion or exclusion of sub-totals). Therefore, (1) answers to questions regarding significant fluctuations in the balances from one year to the next are also not in the year-end workflow, causing client inquiries being replicated at year-end when they were answered during interim planning. Additionally, they may get asked by tax preparers and the auditors creating frustration for the clients as they answer the same question(s) from different people at the same accounting firm multiple times. The reality of the hardships of an accounting firm's workflow is not apparent to most business owners and they end up questioning the competency of the firm. (2) The work done on the schedules containing the interim balances (sub-totals) must be replicated on the year-end balances (totals) often times from scratch. Since the interim balances are not part of the workflow, an inexperienced staff person may use a different, potentially incorrect, method of calculating a number, causing errors and wasted resources at year-end. (3) The strategies and plans made using interim balances to mitigate a potentially adverse tax consequence may get missed when the practitioner is preparing the tax return and elections using the year-end balances. This could cause a higher tax bill than initially communicated to the client (due to different strategies than planned) being utilized or could cause the missed filing of elections needed to complete the strategy determined when accessing interim balances due to missing the filing of elections needed to complete the strategy. Additional strategies set in place to ensure that a client remains in compliance with loan requirements may be overlooked, potentially causing incorrect year-end numbers being reported in error, which may create a strained relationship with the client and his lender.

The number of accounting platforms, versions, and report formats does not give most accountants an opportunity to address the idea of automating the process. Things that are as simple as an account number and an account description are reported in a variety of manners. For example, one accounting platform (platform A) may require account numbers to be used, while another accounting platform (platform B) may require only an account name while account numbers are optional, causing the accounting records in the same accounting file to have items in their chart of accounts with and without account numbers. The account numbers used for platform A may be in a standard format containing numbers and dashes, while platform B allows alphanumeric account numbers, causing the same platform to potentially contain accounts with and without account numbers with no consistency amongst the account numbers within the same file. When the balances for those accounts are reported in a digital format (e.g., pdf, Excel, etc.), platform A might report the account number and account name in two different cells or with no visual separators in between the account number and account name. Platform B may include them both in the same cell and separated by a special character, not found on a standard keyboard, or with no separator when no account number is used.

Often times, clients create sub-accounts in their chart of accounts, an example of which would include utilities, wherein the client sets up subsidiary accounts for gas, electric, and/or water and waste disposal, etc. Platform A may only include the name and account number of the subsidiary account number and the linking of the parent with the subsidiary account is contained in the account numbers. Platform B may report the name of the parent and the subsidiary together, on one report, and on another only show the balances for the parent account with no sub-accounts included. Reports in platform A may be submitted as an exported Excel schedule from a reporting software (e.g., Crystal Reports, or the like) and the reported balances and account descriptions end up in different columns on the same report, making it impossible to use the report as a source for other calculations or to have software read. Platform B may report the information in the same column on every report, others may report the balances in the sub-accounts in different columns, even for the same financial statement from one client to the next column or in the same client from one reporting period to the next. Some might indent on reports in the formatting, others might use tabs, and there are some that might use spaces. Adding characters into a description field makes using that report to summarize activity inconsistent, and a process that must start from scratch every single time. This represents only a partial list of the variances that accounting software packages report the balances used to prepare annual tax returns and financial statements for accountants. Because of these inconsistencies, any attempt to gather the data from Excel or machine read a pdf requires expensive optical character recognition ("OCR") technology that requires careful setup that needs to be updated and reviewed by the client. Additionally, the report does not include adjustments to be made or details of fixed asset additions, deductible and non-deductible expenses, etc. The balances at year-end, if exported to Excel, require manual manipulation to be imported into a trial balance software and that has to be manually updated into the tax return. If the data comes by pdf, paper, or in a report that is not formatted correctly, the balances have to be manually entered into the CPA's workflow so adjustments can be made to the balances so that the adjusted balances can be manually entered onto tax returns and financial statements.

The tax returns are typically extended, so the details making up some of the balances can be obtained. Inevitably, there are dozens, if not hundreds of individual transactions that need to be looked at so that the balances for depreciation expense, accumulated depreciation, interest expense, accrued interest and notes payable can be updated. Often times, individual transactions that comprise the balance in some accounts need to be obtained so that the preparer can divide them into two different pools and a deductible balance for an expense can be determined as well as the non-deductible balance for an expense category. These balances may need to be accounted for differently for financial reporting than it will be for income tax reporting purposes. Since income tax accounting differs significantly from the accrual-based accounting needed to prepare financial statements for banks and lenders in compliance with Generally Accepted Accounting Principles ("GAAP"), the amount of profit or loss a business has may differ significantly for federal tax purposes compared to profit or loss for income tax purposes. For financial reporting purposes, the limitations on deductions for a business may not be considered and a business that reports a loss on an accrual basis all year may end up with taxable income for income tax purposes. Business owners and CPAs that assume that there may not be a tax liability are often surprised at the discrepancy in income and are completely caught off guard by a tax liability at the end of the year. The compressed time frame before an extension is filed, combined with the sheer volume of data that has to be processed, often creates items that are missed all together or are not discovered until shortly before the deadline. This results in frustration and stress for their clients as they find out shortly before or on the deadline that taxes are due and that the amount that is owed is considerably different from what they believed, or were told, they would be.

Many small business owners do not obtain the profit or loss from the business reported to them by their bookkeepers and or in-house accountant as they update the records during the year. The process of monitoring cash, payables, receivables, etc. is the focus of their staff. Financial reporting is left undone, so a business owner may never see the financial statements from a business, as there are no monthly close out procedures and financial statements are not prepared. The prospect of logging into accounting software and determining what report should be run and what it means is more tedious than a person with an entrepreneurial heart may be willing to endure. Their trust is in their CPA to tell them how they did after year-end, and by that time it is often too late.

CPAs often perform two separate roles, financial reporting (including, but not limited to, annual audits, reviews, or compilations, or the like) and tax preparation. An income statement or balance sheet from the accounting software may not be formatted the same way, and therefore looking at interim financial statements is not as meaningful as it would be if the internal financial statements were prepared on a GAAP basis. The gathering of the data is a totally separate process from the data for the preparation of the tax return.

Conventional accounting software systems are unable to address these issues.

Hence, there is a need for more robust and scalable solutions for implementing accounting software functionalities, and, more particularly, to methods, systems, and apparatuses for implementing accounting platform functionalities.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a schematic diagram illustrating a system for implementing accounting platform functionalities, in accordance with various embodiments.

FIG. 4 is a schematic diagram illustrating a non-limiting example of chart of accounts mapping, in accordance with various embodiments.

FIGS. 6A-6M are flow diagrams illustrating a method for implementing accounting platform functionalities, in accordance with various embodiments.

DETAILED DESCRIPTION OF CERTAIN EMBODIMENTS

Overview

Figure 2A:
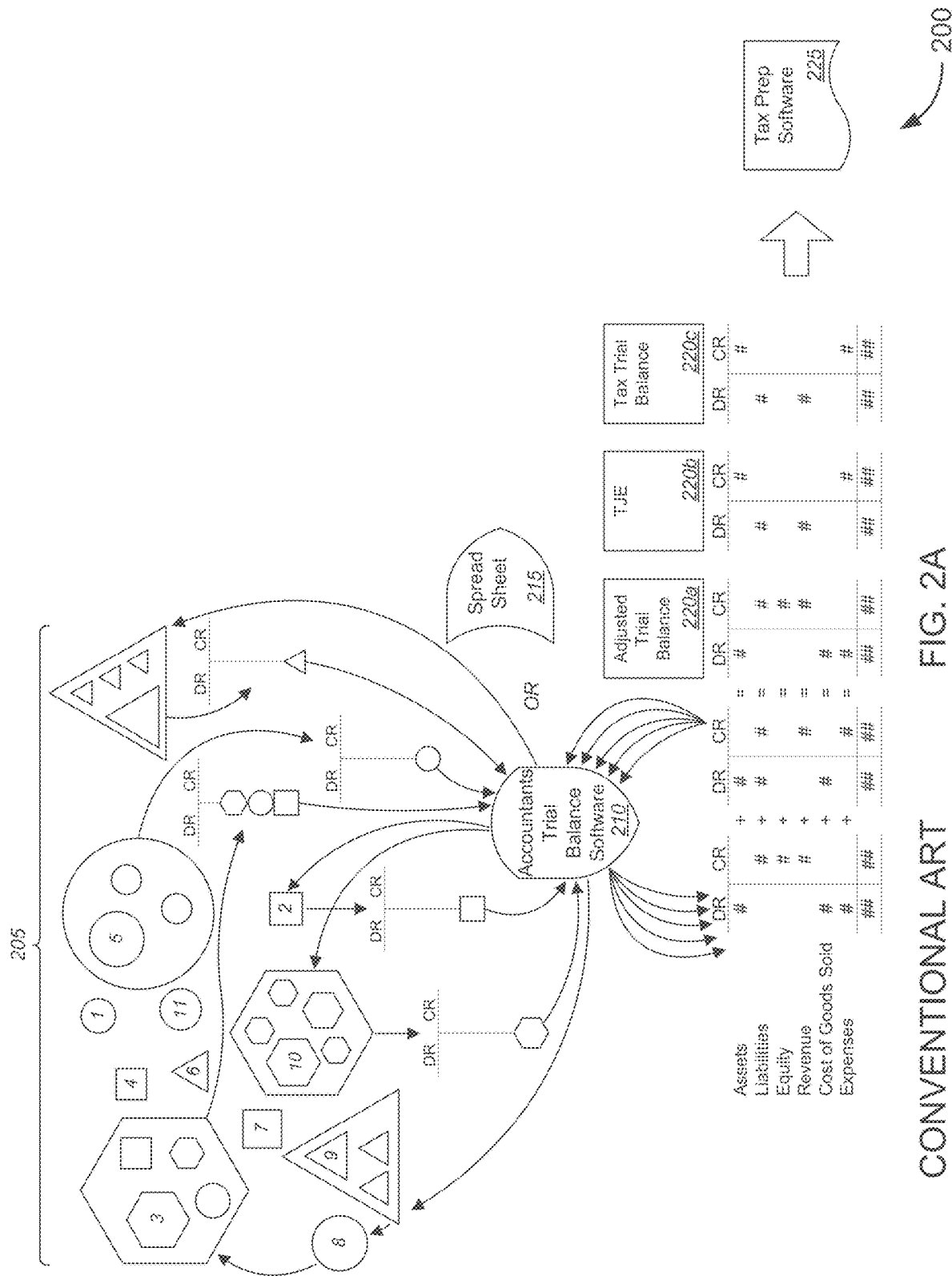
FIG. 2A is a schematic diagram illustrating a non-limiting example of a conventional tax accounting workflow.

Various embodiments provide tools and techniques for implementing accounting software functionalities, and, more particularly, to methods, systems, and apparatuses for implementing accounting platform functionalities.

In various embodiments, a computing system might access, from a first accounting software system among a plurality of accounting software systems, at least one data file associated with a first entity among one or more entities. The at least one data file might comprise accounting information associated with the first entity. The plurality of accounting software systems might each operate based on corresponding one of two or more commercial accounting software that are at least one of different from each other or incompatible with each other, and that are published by different accounting software developers. In some cases, the two or more commercial accounting software might comprise two or more commercial off-the-shelf ("COTS") accounting software, or the like. In some instances, the plurality of accounting software systems might include, without limitation, a plurality of Enterprise resource planning ("ERP") software systems, each of which operates based on corresponding one of two or more ERP software.

In some embodiments, accessing the at least one data file associated with the first entity among the one or more entities might comprise accessing, from the first accounting software system among the plurality of accounting software systems, the at least one data file associated with the first entity among one or more entities, by using at least one of one or more first application programming interfaces ("APIs") or one or more first software development kits ("SDKs") that enable communication between the computing system and the first accounting software system. Alternatively, the computing system might receive the at least one data file associated with the first entity among one or more entities—the at least one data file comprising accounting information associated with the first entity—that is sent either from the first accounting software system or from the non-relational data storage system (both via secure network(s)).

According to some embodiments, the computing system might autonomously extract the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited.

In some embodiments, the computing system might autonomously generate a transaction-based trial balance based on the extracted transaction data, the generated transaction-based trial balance serving as a living trial balance that is continually updated based on updated or new transaction data that is accessed from the first accounting or ERP software system. In some instances, the computing system might autonomously generate one of a tax trial balance or an adjusted trial balance, based on the generated transaction-based trial balance.

Merely by way of example, in some cases, the generated tax trial balance might facilitate autonomous generation of tax returns for the first entity by aggregating items to input at proper input fields or lines of a tax return form based on information obtained from the generated transaction-based trial balance. Similarly, the generated adjusted trial balance might facilitate autonomous generation of financial statements by aggregating items to input at proper fields of a financial statement based on information obtained from the generated transaction-based trial balance. According to some embodiments, each of the tax trial balance or the adjusted trial balance might be embodied by a rule engine that aggregates the respective items or information, that populates the appropriate documents (e.g., tax return forms, financial statements, etc.), and that produces, generates, and/or sends the finalized documents. Alternatively, each of the tax trial balance or the adjusted trial balance might be embodied by a trial balance document that lists the respective items or information, that lists corresponding instructions, metadata, and/or links for directing placement or entry of the items or information, and that utilizes an external system (e.g., computing system, rules engine, or the like) to populate the appropriate fields of appropriate documents (e.g., tax return forms, financial statements, etc.) based on the listed items or information and based on the listed instructions, metadata, and/or links contained in the trial balance document, and that that produces, generates, and/or sends the finalized documents. Alternatively, each of the tax trial balance or the adjusted trial balance might be embodied by a hybrid of these two alternative embodiments.

According to some embodiments, the computing system might autonomously analyze extracted transaction data among a plurality of extracted transaction data to determine whether the transaction entry corresponding to the extracted transaction data is for a tax significant account.

Based on a determination that the transaction entry corresponding to the extracted transaction data is for a tax significant account, the computing system might autonomously analyze the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting. Based on a determination that not all applicable debit and credit entries in the transaction entry have been reversed under the applicable federal and/or state/local tax basis of accounting, the computing system might identify all applicable debit and credit entries in the transaction entry that should be reversed, might autonomously reverse the identified applicable debit and credit entries, might generate one or more tax journal entries based at least in part on at least one of the reversed identified applicable debit and credit entries or the extracted transaction data, and might mark at least one of the transaction entry or the one or more tax journal entries as having been reversed.

In some embodiments, accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed are performed on an ongoing basis throughout each fiscal year (e.g., tax year or calendar year, or the like).

According to some embodiments, based on a determination that the transaction entry corresponding to the extracted transaction data is not for a tax significant account, the computing system might determine whether the transaction entry corresponding to the extracted transaction data contains any tax significant content. Based on a determination that the transaction entry corresponding to the extracted transaction data contains tax significant content, the computing system might generate a first notification to a first user, the notification containing options comprising at least one of an option to prepare a tax significant entry, an option to edit a memo, or an option to pass on the tax significant content, and/or the like. In response to the first user selecting the option to prepare a tax significant entry, the computing system might autonomously generate at least one tax journal entry based at least in part on the extracted transaction data. In response to the first user selecting the option to edit a memo, the computing system might display the tax significant content with a memo field, might provide options for the first user to edit the memo field, and, in response to the first user submitting edits to the memo field, might push an update to the first accounting or ERP software system based on the edited memo field. In response to the first user selecting the option to pass on the tax significant content, the computing system might autonomously mark the tax significant entry as having been cleared.

In some embodiments, based on a determination that not all applicable debit and credit entries in the transaction entry have been reversed under the applicable federal and/or state/local tax basis of accounting, the computing system might send a prompt to the first user indicating whether or not to reverse the identified applicable debit and credit entries as well as any future similar entries. In response to receiving a response from the first user indicating to reverse the identified applicable debit and credit entries as well as any future similar entries, the computing system might generate a first flag associated with the first entity, the first flag indicating to reverse the identified applicable debit and credit entries as well as any future similar entries.

According to some embodiments, the computing system might update records within one or more selected accounts associated with the first entity or one or more selected fiscal years, in some cases, by accessing, from the first accounting or ERP software system, all transaction data from the one or more selected accounts associated with the first entity within the one or more selected fiscal years; and replacing existing transaction data for the one or more selected accounts associated with the first entity for the one or more selected fiscal years with the accessed transaction data transaction data from the one or more selected accounts associated with the first entity within the one or more selected fiscal years.

In some embodiments, the computing system might analyze the generated one or more tax journal entries to determine whether each and every transaction as populated in the generated one or more tax journal entries complies with the applicable federal and/or state/local tax basis of accounting, which in some cases may be performed using rule engine functionality. Based on a determination that at least one transaction as populated in the generated one or more tax journal entries fails to comply with the applicable federal and/or state/local tax basis of accounting, the computing system might generate a second notification indicating how the determined at least one transaction as populated in the generated one or more tax journal entries fails to comply with the applicable federal and/or state/local tax basis of accounting; and might send the generated second notification to the first user device associated with the first user. In some cases, the computing system might determine at least one candidate solution for addressing each of the at least one transaction as populated in the generated one or more tax journal entries that has been determined to fail to comply with the applicable federal and/or state/local tax basis of accounting, which in some cases may also be performed using rule engine functionality. In some instances, the generated second notification that is sent to the first user device associated with the first user might further comprise the determined at least one candidate solution for addressing each of the at least one transaction that has been determined to fail to comply with the applicable federal and/or state/local tax basis of accounting.

Alternatively, or additionally, after determining that each and every transaction as populated in the generated one or more tax journal entries complies with the applicable federal and/or state/local tax basis of accounting, the computing system might store, in a non-relational data storage system, the generated one or more tax journal entries; might autonomously prepare one or more tax filing documents for the first entity based at least in part on the transaction data contained in the generated one or more tax journal entries or based at least in part on one or more tax journal entries retrieved from the non-relational data storage system; and might send the prepared one or more tax filing documents to at least one CPA among the one or more CPAs for review. Alternatively, even without determining whether or not the generated one or more tax journal entries complies with the applicable federal and/or state/local tax basis of accounting, the computing system might autonomously prepare one or more tax filing documents for the first entity based at least in part on the transaction data contained in the generated one or more tax journal entries and/or contained in the tax information associated with the first entity or based at least in part on the generated transaction-based trial balance, and might send the prepared one or more tax filing documents to at least one CPA among one or more CPAs for review. Regardless of the computing system determining whether or not the generated one or more tax journal entries complies with the applicable federal and/or state/local tax basis of accounting, the computing system might provide the at least one CPA with options to sign and file the prepared one or more tax filing documents with applicable governmental tax agencies on behalf of the first entity.

Alternatively, or additionally, the computing system might autonomously prepare one or more tax returns for the first entity based at least in part on the transaction data contained in the generated one or more tax journal entries, and might send the prepared one or more tax returns to at least one CPA among one or more CPAs for review. Alternatively, or additionally, the computing system might simultaneously share, over a secure platform, one or more tax data files between at least one CPA and the first user. In some cases, the one or more tax data files might include, without limitation, at least one of one or more tax-related workpapers, one or more tax estimates, or one or more tax-related financial documents, and/or the like, associated with the first entity.

According to some embodiments, the computing system might autonomously gather information contained in one or more journal entries ("JEs") and information contained in one or more tax journal entries ("TJEs"), wherein each of the one or more JEs and the one or more TJEs are generated based on the extracted transaction data; might autonomously generate a report or listing of all journal entries prepared by the CPA for inclusion in a client representation letter based on the gathered information; and might send the generated representation letter to a member of management of the first entity for signature by the member of management. The representation letter, when signed by the member of management of the first entity, represents that financial statements that are generated based on transaction data provided by the first entity amongst other items including the acceptance of the adjustments by management.

In some embodiments, the computing system might autonomously generate financial statements based at least in part on one or more of the generated transaction-based trial balance or the extracted transaction data; might analyze the generated financial statements to determine whether individual elements of the financial statements are in compliance with Generally Accepted Accounting Principles ("GAAP") based on factors determined by the CPA firm to develop such an opinion; and might autonomously generate and send an alert notification to at least one CPA to address matters that will aid the at least one CPA in determining if the financial statements are in compliance with GAAP.

According to some embodiments, the computing system might determine which account information or tax information associated with the first entity is important to a first user, based at least in part on the determined access levels that the first user has for the first entity or based at least in part on one or more of user interaction of the first user with the computing system, user profile information associated with the first user, or user preferences associated with the first user. The computing system might then generate a command center user interface for the first user, the generated command center user interface being configured to highlight at least one of account information or tax information associated with the first entity that is determined to be important to the first user, based at least in part on the determined access levels that the first user has for the first entity. The generated command center user interface might include, but is not limited to, at least one of one or more notifications, one or more summaries, one or more alerts, or one or more options for performing one or more tasks, and/or the like. Subsequently, the computing system might display the generated command center user interface on a display screen of a user device associated with the first user.

In some embodiments, the computing system might access, from one or more tax information sources, tax information associated with the third user; might analyze the accessed tax information associated with the third user to determine whether the third user is an owner or an affiliate of entities other than the first entity; and, based on a determination that the third user is an owner or an affiliate of one or more second entities, might aggregate tax information associated with each of the one or more second entities and the tax information associated with the first entity, and might display, on the display screen of the user device, the aggregated tax information for each of the one or more second entities and the first entity in the generated command center user interface. In some instances, the third user might be provided with full access to the tax information associated with each of at least one entity among the one or more second entities based on a determination that the third user is an owner of each of the at least one entity. Alternatively, or additionally, the third user might be provided with limited access to the tax information associated with each of one or more entities among the one or more second entities based on a determination that the third user is an affiliate of each of the one or more entities.

The various embodiments address the issues with conventional accounting software systems by providing an accounting platform that transfers the data inside the disparate accounting or ERP software used by various entities to a common reporting platform so that the only thing that is transferred is pure data (particularly, transaction data). The platform then prepares its own set of balances that are updated daily. These transactions are remarkably consistent across all platforms—with debits on the left and credits on the right —, and are transferred to a positive number for debits and a negative number for credits in every accounting software program. Transactions net to zero in every accounting software program. The transactions are stored in a database where account numbers and names are designated separately in every accounting platform. Additionally, those transactions can be used to obtain details needed in memos, such details including, but not limited to, information regarding vendors, information regarding customers, information regarding ship to addresses, and/or the like. In this manner, an accountant or CPA can access and see the financial activities in a consistent manner, regardless of the accounting software used or the proprietary conventions utilized by such accounting software. As a result, workflow and tax calculations may be streamlined, and new efficiencies can be achieved.

Further, a consolidated transaction-based workflow platform, such as described with respect to various embodiments, is not present in the conventional accounting software systems. In the various embodiments, automation only occurs around transactions, not reports. This avoids some of the issues with the conventional automation approaches, which attempt to work with optical character recognition ("OCR") technology, which often requires human intervention and is more difficult to code. Transaction-based workflow creates a single source of data for a firm, integrating the annual attestation, tax compliance, monthly/special purpose interim reporting, and consulting segments of a CPA firm, automatically and overnight. This paradigm will impact CPAs like no platform created before and it does not exist in conventional systems now because of the perceived barriers created by conventional desktop platforms.

The transaction-based workflow platform addresses the following problems with balanced-based workflow systems: excessive overtime (because working with year-end balances means a CPA cannot start until the deadline is here); tax day surprises (because working with year-end balances means CPAs cannot start until after year-end, when it is too late to plan and take appropriate action); redundant work (because working with balances as of a particular date means that interim work and client questions may be repeated, and the subtotal that a CPA works with during the year means nothing to the total that goes on the form at the end of the year); and inconsistent source (because working with balances relies on the formats of different Enterprise resource planning ("ERP") systems, which results in automation being expensive and difficult to create). The transaction-based workflow platform as described in accordance with the various embodiments results in the following: overtime being eliminated (because by working on transactions, the work can start as soon as the transaction is posted, 364 days before year-end); there being time to plan (because by working with transactions, real-time estimates are possible and clients will not be surprised at year-end); repetitive tasks being eliminated (because the transactions that make up a subtotal during the year make up the total at the end of the year, so that work done on, and questions asked about, those transactions need not (and thus will not) be repeated); and consistent formatting being achieved (because a journal entry that is created is the universal language that every ERP speaks, resulting in consistent data that is easy to work with). Further, the transaction-based workflow platform enables autonomous generation of a transaction-based trial balance (or living trial balance), based on transaction data accessed from ERP software associated with the client entities. The transaction-based workflow platform can then generate tax trial balances and/or adjusted trial balances based on the transaction-based trial balance. Such functionality is not possible with conventional balance-based systems and platforms. Moreover, the transaction-based workflow platform enables autonomous generation of a report or listing of all journal entries prepared by the CPA for inclusion in a client representation letter based on information gathered from journal entries and tax journal entries that are generated based on the transaction data accessed from the ERP software. The platform then sends the representation letter to a member of management of the client entity for approval and signatures. Such functionality is likewise not possible with conventional accounting systems and platforms. Additionally, the transaction-based workflow platform enables autonomous aggregation of entities associated with a particular user, while determining whether the particular user is an owner or an affiliate of each of the entities, and aggregating accounting and tax information of the entities with the access to information for each entity being full or limited based on whether the particular user is an owner or an affiliate, respectively. Such functionality is also not possible with conventional accounting systems and platforms.

These and other aspects of the accounting platform functionalities are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, accounting software technology, tax software technology, financial reporting technology, financial statement preparation technology, tax reporting technology, auditing technology, and/or the like. In other aspects, certain embodiments, can improve the functioning of user equipment or systems themselves (e.g., accounting software systems, tax software systems, financial reporting systems, financial statement preparation systems, tax reporting systems, financial auditing systems, etc.), for example, by accessing, with a computing system and from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers; autonomously extracting, with the computing system, the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited; autonomously generating, with the computing system, a transaction-based trial balance based on the extracted transaction data, the generated transaction-based trial balance serving as a living trial balance that is continually updated based on updated or new transaction data that is accessed from the first accounting software system; autonomously generating, with the computing system, one of a tax trial balance or an adjusted trial balance, based on the generated transaction-based trial balance; autonomously analyzing, with the computing system, extracted transaction data among a plurality of extracted transaction data to determine whether the transaction entry corresponding to the extracted transaction data is for a tax significant account; based on a determination that the transaction entry corresponding to the extracted transaction data is for a tax significant account, autonomously analyzing, with the computing system, the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting; and based on a determination that not all applicable debit and credit entries in the transaction entry have been reversed under the applicable federal and/or state/local tax basis of accounting, identifying, with the computing system, all applicable debit and credit entries in the transaction entry that should be reversed, autonomously reversing, with the computing system, the identified applicable debit and credit entries, generating, with the computing system, one or more tax journal entries based at least in part on at least one of the reversed identified applicable debit and credit entries or the extracted transaction data, and marking, with the computing system, at least one of the transaction entry or the one or more tax journal entries as having been reversed; and/or the like, to name a few examples, that extend beyond mere conventional computer processing operations.

These functionalities can produce tangible results outside of the implementing computer system, including, merely by way of example, providing an accounting platform that transfers the data inside the disparate accounting or ERP software used by various entities to a common reporting platform so that the only thing that is transferred is pure data (particularly, transaction data). In this manner, an accountant or CPA can access and see the financial activities in a consistent manner, regardless of the accounting software used or the proprietary conventions utilized by such accounting software. As a result, workflow and tax calculations may be streamlined, and new efficiencies can be achieved, and/or the like, at least some of which may be observed or measured by CPAs and/or members of a company or entity (e.g., owners, officers, board members, employees, etc.).

In an aspect, a method might comprise accessing, with a computing system and from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers. The method might also comprise autonomously extracting, with the computing system, the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited. The method might further comprise autonomously generating, with the computing system, a transaction-based trial balance based on the extracted transaction data, the generated transaction-based trial balance serving as a living trial balance that is continually updated based on updated or new transaction data that is accessed from the first accounting software system. The method might further comprise autonomously generating, with the computing system, one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

In some embodiments, accessing the at least one data file associated with the first entity among one or more entities might comprise accessing, with the computing system and from the first accounting software system among the plurality of accounting software systems, the at least one data file associated with the first entity among one or more entities, by using at least one of one or more first application programming interfaces ("APIs") or one or more first software development kits ("SDKs") that enable communication between the computing system and the first accounting software system. In some instances, the plurality of accounting software systems comprises a plurality of Enterprise resource planning ("ERP") software systems, each of which operates based on corresponding one of two or more ERP software. In some cases, the two or more commercial accounting software might comprise two or more commercial off-the-shelf ("COTS") accounting software.

The method might further comprise autonomously analyzing, with the computing system, extracted transaction data among a plurality of extracted transaction data to determine whether the transaction entry corresponding to the extracted transaction data is for a tax significant account. The method might comprise, based on a determination that the transaction entry corresponding to the extracted transaction data is for a tax significant account, autonomously analyzing, with the computing system, the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting. The method might further comprise, based on a determination that not all applicable debit and credit entries in the transaction entry have been reversed under the applicable federal and/or state/local tax basis of accounting, identifying, with the computing system, all applicable debit and credit entries in the transaction entry that should be reversed, autonomously reversing, with the computing system, the identified applicable debit and credit entries, generating, with the computing system, one or more tax journal entries based at least in part on at least one of the reversed identified applicable debit and credit entries or the extracted transaction data, and marking, with the computing system, at least one of the transaction entry or the one or more tax journal entries as having been reversed.

According to some embodiments, accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed are performed on an ongoing basis throughout each fiscal year.

In some embodiments, the method might further comprise, based on a determination that the transaction entry corresponding to the extracted transaction data is not for a tax significant account, determining, with the computing system, whether the transaction entry corresponding to the extracted transaction data contains any tax significant content; and based on a determination that the transaction entry corresponding to the extracted transaction data contains tax significant content, generating, with the computing system, a first notification to a first user, the notification containing options comprising at least one of an option to prepare a tax significant entry, an option to edit a memo, or an option to pass on the tax significant content. The method might comprise, in response to the first user selecting the option to prepare a tax significant entry, autonomously generating, with the computing system, at least one tax journal entry based at least in part on the extracted transaction data. The method might comprise, in response to the first user selecting the option to edit a memo, displaying, with the computing system, the tax significant content with a memo field, providing, with the computing system, options for the first user to edit the memo field, and, in response to the first user submitting edits to the memo field, pushing, with the computing system, an update to the first accounting software system based on the edited memo field. The method might comprise, in response to the first user selecting the option to pass on the tax significant content, autonomously marking, with the computing system, the tax significant entry as having been cleared.

According to some embodiments, based on a determination that not all applicable debit and credit entries in the transaction entry have been reversed under the applicable federal and/or state/local tax basis of accounting, the method might further comprise: sending, with the computing system, a prompt to a first user indicating whether or not to reverse the identified applicable debit and credit entries as well as any future similar entries; and in response to receiving a response from the first user indicating to reverse the identified applicable debit and credit entries as well as any future similar entries, generating, with the computing system, a first flag associated with the first entity, the first flag indicating to reverse the identified applicable debit and credit entries as well as any future similar entries.

In some embodiments, the method might further comprise analyzing, with the computing system, the generated one or more tax journal entries to determine whether each and every transaction as populated in the generated one or more tax journal entries complies with the applicable federal and/or state/local tax basis of accounting; and based on a determination that at least one transaction as populated in the generated one or more tax journal entries fails to comply with the applicable federal and/or state/local tax basis of accounting, performing the following: generating, with the computing system, a second notification indicating how the determined at least one transaction as populated in the generated one or more tax journal entries fails to comply with the applicable federal and/or state/local tax basis of accounting, and sending, with the computing system, the generated second notification to a user device associated with a second user among one or more users. In some instances, the one or more users might comprise at least one of one or more certified public accountants ("CPAs") working for the first entity, one or more owners of the first entity, one or more financial officers of the first entity, one or more board members of the first entity, one or more representatives of the first entity, or one or more agents of the first entity, and/or the like.

In some cases, analyzing the generated one or more tax journal entries to determine whether each and every transaction as populated in the generated one or more tax journal entries complies with the applicable federal and/or state/local tax basis of accounting might comprise analyzing the generated one or more tax journal entries, using rule engine functionality, to determine whether each and every transaction as populated in the generated one or more tax journal entries complies with the applicable federal and/or state/local tax basis of accounting.

In some embodiments, the method might further comprise determining, with the computing system, at least one candidate solution for addressing each of the at least one transaction as populated in the generated one or more tax journal entries that has been determined to fail to comply with the applicable federal and/or state/local tax basis of accounting. In some instances, the generated second notification that is sent to the second user might further comprise the determined at least one candidate solution for addressing each of the at least one transaction that has been determined to fail to comply with the applicable federal and/or state/local tax basis of accounting. In some cases, determining at least one candidate solution for addressing each of the at least one transaction as populated in the generated one or more tax journal entries that has been determined to fail to comply with the applicable federal and/or state/local tax basis of accounting might comprise determining, using rule engine functionality, at least one candidate solution for addressing each of the at least one transaction as populated in the generated one or more tax journal entries that has been determined to fail to comply with the applicable federal and/or state/local tax basis of accounting.

According to some embodiments, the method might further comprise, after determining that each and every transaction as populated in the generated one or more tax journal entries complies with the applicable federal and/or state/local tax basis of accounting, storing, with the computing system and in a non-relational data storage system, the generated one or more tax journal entries; autonomously preparing, with the computing system, one or more tax filing documents for the first entity based at least in part on the transaction data contained in the generated one or more tax journal entries or based at least in part on one or more tax journal entries retrieved from the non-relational data storage system; and sending, with the computing system, the prepared one or more tax filing documents to at least one CPA among the one or more CPAs for review.

In some embodiments, the method might further comprise autonomously preparing, with the computing system, one or more tax filing documents for the first entity based at least in part on the transaction data contained in the generated one or more tax journal entries or based at least in part on the generated transaction-based trial balance; and sending, with the computing system, the prepared one or more tax filing documents to at least one certified public accountant ("CPA") among one or more CPAs for review. In some cases, the method might further comprise providing, with the computing system, the at least one CPA with options to sign and file the prepared one or more tax filing documents with applicable governmental tax agencies on behalf of the first entity.

Alternatively, or additionally, the method might further comprise autonomously preparing, with the computing system, one or more tax returns for the first entity based at least in part on the transaction data contained in the generated one or more tax journal entries; and sending, with the computing system, the prepared one or more tax returns to at least one certified public accountant ("CPA") among one or more CPAs for review.

According to some embodiments, the method might further comprise simultaneously sharing, with the computing system and over a secure platform, one or more tax data files between at least one certified public accountant ("CPA") and the first user, wherein the one or more tax data files might comprise at least one of one or more tax-related workpapers, one or more tax estimates, or one or more tax-related financial documents associated with the first entity, and/or the like.

In some embodiments, the method might further comprise autonomously gathering, with the computing system, information contained in one or more journal entries ("JEs") and information contained in one or more tax journal entries ("TJEs"), wherein each of the one or more JEs and the one or more TJEs are generated based on the extracted transaction data; autonomously generating, with the computing system, a report or listing of all journal entries prepared by at least one certified public accountant ("CPA") for inclusion in a client representation letter based on the gathered information; and sending, with the computing system, the generated representation letter to a member of management of the first entity for signature by the member of management to represent that financial statements that are generated based on transaction data provided by the first entity amongst other items including the acceptance of the adjustments by management.

According to some embodiments, the method might further comprise updating, with the computing system, records within one or more selected accounts associated with the first entity for one or more selected fiscal years, by: accessing, with the computing system and from the first accounting software system, all transaction data from the one or more selected accounts associated with the first entity within the one or more selected fiscal years; and replacing, with the computing system, existing transaction data for the one or more selected accounts associated with the first entity for the one or more selected fiscal years with the accessed transaction data from the one or more selected accounts associated with the first entity within the one or more selected fiscal years.

In some embodiments, the method might further comprise autonomously generating, with the computing system, financial statements based at least in part on one or more of the generated transaction-based trial balance or the extracted transaction data; analyzing, with the computing system, the generated financial statements to determine whether individual elements of the generated financial statements are in compliance with Generally Accepted Accounting Principles ("GAAP") based on factors determined by certified public accountant ("CPA") firm to develop such an opinion; and autonomously generating and sending, with the computing system, an alert notification to at least one CPA to address matters that will aid the at least one CPA in determining if the financial statements are in compliance with GAAP.

According to some embodiments, the method might further comprise determining, with the computing system, which tax information associated with the first entity is important to a third user among one or more users, based at least in part on the determined access levels that the third user has for the first entity or based at least in part on one or more of user interactions of the third user with the computing system, user profile information associated with the third user, or user preferences associated with the third user. The method might also comprise generating, with the computing system, a command center user interface for the third user. The generated command center user interface might be configured to highlight tax information associated with the first entity that is determined to be important to the third user, based at least in part on the determined access levels that the third user has for the first entity. The generated command center user interface might comprise at least one of one or more notifications, one or more summaries, one or more alerts, or one or more options for performing one or more tasks, and/or the like. The method might further comprise displaying, with the computing system, the generated command center user interface on a display screen of a user device associated with the third user.

In some embodiments, the method might further comprise accessing, with the computing system and from one or more tax information sources, tax information associated with the third user; analyzing, with the computing system, the accessed tax information associated with the third user to determine whether the third user is an owner or an affiliate of entities other than the first entity; and based on a determination that the third user is an owner or an affiliate of one or more second entities, aggregating, with the computing system, tax information associated with each of the one or more second entities and the tax information associated with the first entity, and displaying, with the computing system and on the display screen of the user device, the aggregated tax information for each of the one or more second entities and the first entity in the generated command center user interface, wherein the third user is provided with full access to the tax information associated with each of at least one entity among the one or more second entities based on a determination that the third user is an owner of each of the at least one entity, and wherein the third user is provided with limited access to the tax information associated with each of one or more entities among the one or more second entities based on a determination that the third user is an affiliate of each of the one or more entities.

According to some embodiments, the method might further comprise displaying, with the computing system and on the display screen of the user device, one of a financial statement, a financial statement lead, an adjusted trial balance, a tax return, a tax lead, or a tax trial balance in a display field of the generated command center user interface. The method might further comprise receiving, with the computing system, a first user input, the first user input indicating to drag and drop a first journal entry or a first tax journal entry from a first account to a second account in the one of the financial statement, the financial statement lead, the adjusted trial balance, the tax return, the tax lead, or the tax trial balance. The method might further comprise autonomously performing, with the computing system, the following: crediting one of the first account or the second account; debiting the other of the first account or the second account; based on a determination that it is necessary to reverse the first journal entry or the first tax journal entry, reversing the first journal entry or the first tax journal entry; moving the first journal entry or the first tax journal entry under the second account in the one of the financial statement, the financial statement lead, the adjusted trial balance, the tax return, the tax lead, or the tax trial balance; and updating display of the one of the financial statement, the financial statement lead, the adjusted trial balance, the tax return, the tax lead, or the tax trial balance.

Alternatively, or additionally, the method might further comprise displaying, with the computing system and on the display screen of the user device, one of a financial statement lead, an adjusted trial balance, a tax lead, or a tax trial balance in a display field of the generated command center user interface. The method might further comprise receiving, with the computing system, a second user input, the second user input indicating to drag and drop a first account from a first account lead to a second account lead in the one of the financial statement lead, the adjusted trial balance, the tax lead, or the tax trial balance. The method might further comprise autonomously performing, with the computing system, the following: crediting one or more accounts in one of the first account lead or the second account lead; debiting one or more accounts in the other of the first account lead or the second account lead; based on a determination that it is necessary to reverse one or more journal entries or one or more tax journal entries in the one or more accounts in the first account lead or the one or more accounts in the second account lead, reversing the one or more journal entries or the one or more tax journal entries; moving the first account under the second account lead in the one of the financial statement lead, the adjusted trial balance, the tax lead, or the tax trial balance; and updating display of the one of the financial statement lead, the adjusted trial balance, the tax lead, or the tax trial balance.

In some embodiments, the method might further comprise displaying, with the computing system and on the display screen of the user device, one of a financial statement lead, an adjusted trial balance, a tax lead, or a tax trial balance in a display field of the generated command center user interface. The method might further comprise receiving, with the computing system, a third user input, the third user input indicating to expand or collapse one of a lead schedule or an account under the lead schedule in the one of the financial statement lead, the adjusted trial balance, the tax lead, or the tax trial balance. The method might further comprise: in response to the third user input indicating to expand a selected lead schedule, updating display of the one of the financial statement lead, the adjusted trial balance, the tax lead, or the tax trial balance to display all accounts under the selected lead schedule; in response to the third user input indicating to collapse the selected lead schedule, updating display of the one of the financial statement lead, the adjusted trial balance, the tax lead, or the tax trial balance to hide display of all accounts under the selected lead schedule; in response to the third user input indicating to expand a selected account under the selected lead schedule, updating display of the one of the financial statement lead, the adjusted trial balance, the tax lead, or the tax trial balance to display all journal entries or tax journal entries under the selected account under the selected lead schedule; or in response to the third user input indicating to collapse the selected account under the selected lead schedule, updating display of the one of the financial statement lead, the adjusted trial balance, the tax lead, or the tax trial balance to hide display of all journal entries or tax journal entries under the selected account under the selected lead schedule.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: access, from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers; autonomously extract the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited; autonomously generate a transaction-based trial balance based on the extracted transaction data, the generated transaction-based trial balance serving as a living trial balance that is continually updated based on updated or new transaction data that is accessed from the first accounting software system; and autonomously generate one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: access, from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers; autonomously extract the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited; autonomously generate a transaction-based trial balance based on the extracted transaction data, the generated transaction-based trial balance serving as a living trial balance that is continually updated based on updated or new transaction data that is accessed from the first accounting software system; and autonomously generate one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

In some embodiments, the computing system might comprise one of a processor of the user device running an app, a server computer over a network, a webserver, a cloud-based computing system over a network, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Some Aspects of the Invention

Command Center

The platform has a command center where a user (e.g., a CPA, multiple business owner, a member of multiple boards, etc.) can see every entity (with which the user is associated or to which the user has access) integrated into this application from one common web-browser or user interface. Typically, interfaces like this are described as dashboards, and the command center provides the CPA or accountant (or other user) the ability to see not only the financial position of a given client with summaries, graphs, and ratios, but to also see items that need attention and to take action from the platform, without having to open all the different applications associated with the different entities they typically need to open to address these issues. An analog would be the difference between looking at a thermometer and looking at a thermostat, with the accounting platform described with respect the various embodiments moving the accountant from looking at the dashboard from the passenger seat to being in the driver's seat.

Figure 3A:
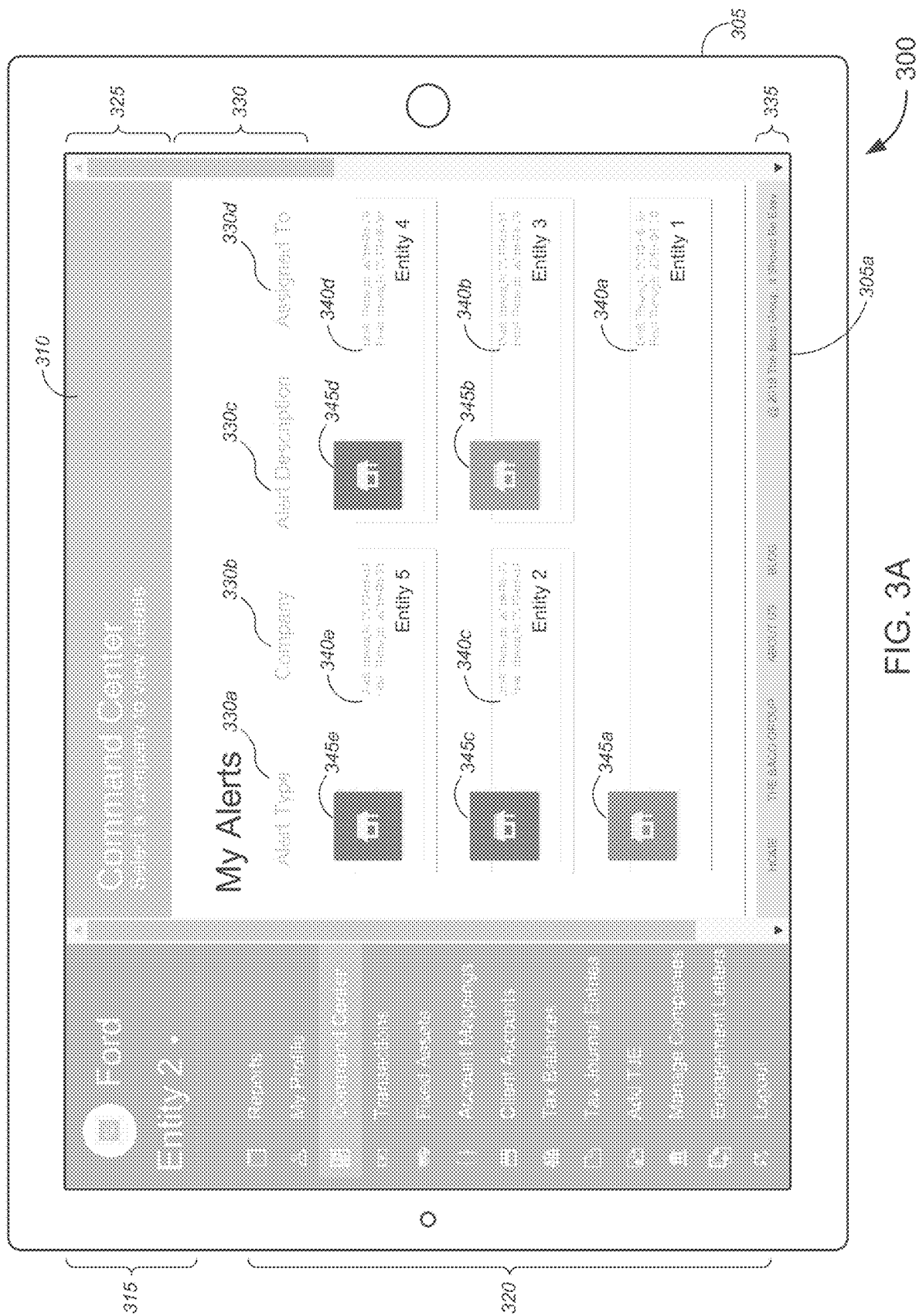
FIGS. 3A and 3B are schematic diagrams illustrating non-limiting examples of screen views of a command center user interface that may be used for implementing accounting platform functionalities, in accordance with various embodiments.
Figure 3B:
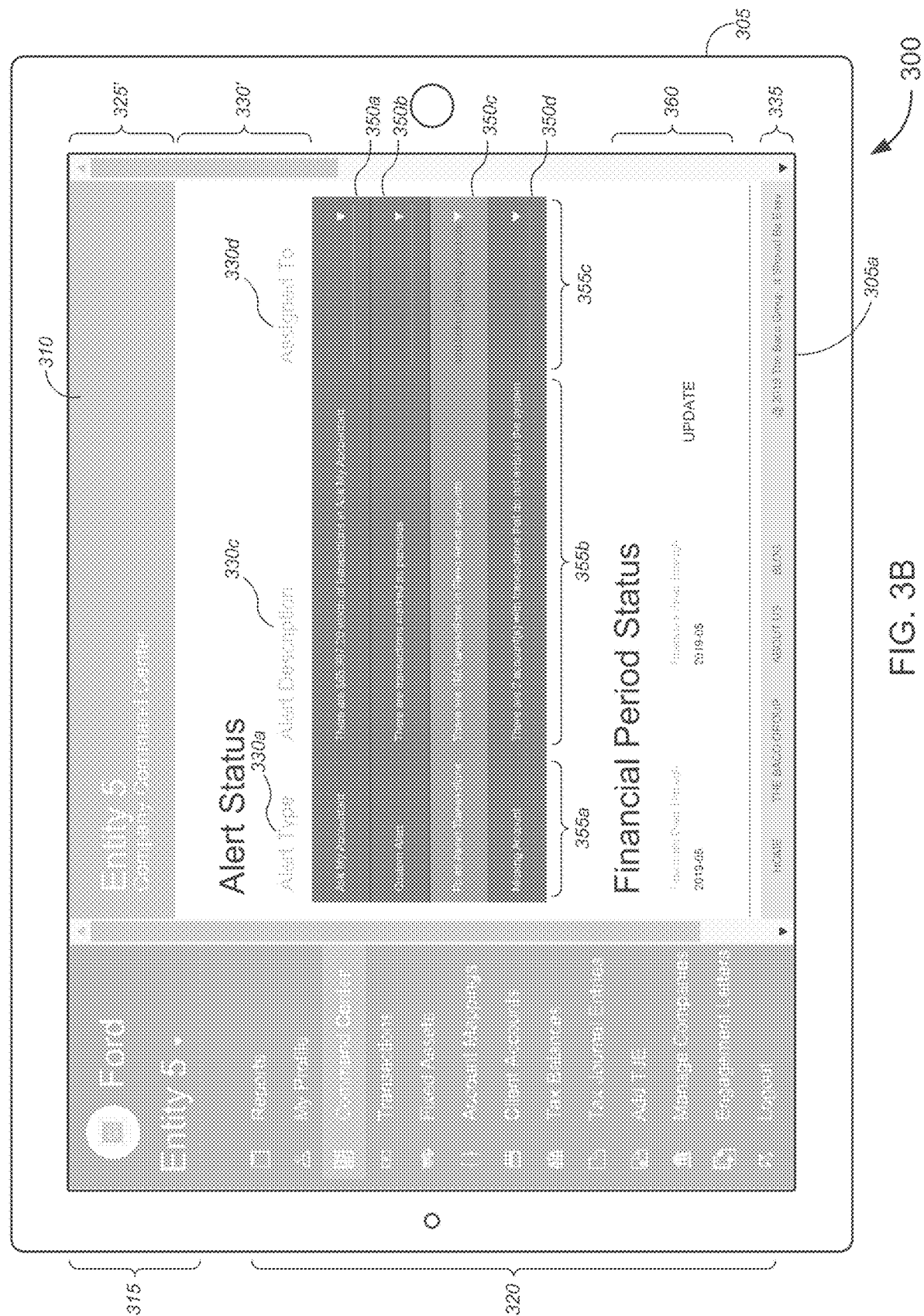

The alerts and/or notifications (collectively, "notifications" or the like) displayed in the command center (such as shown in FIGS. 3A and 3B, for example) change color to red when there are items that need addressing that have not yet been assigned, change color to yellow once they have been assigned, and change color to green after they have been cleared. The notifications are ordered so that red colored notifications are on top, followed by yellow colored notifications, then followed by green colored notifications. They can then be sorted by number of issues or by how long the issue has been outstanding. They can be filtered by user, so the interface is unique for every CPA and client who logs in.

This command center may be built on a platform that has features like Notifications, Accounting File Maintenance, Automated Tax Prep, One Click Tax Preparation, Real-Time Tax Project, CPA Connect, CPA Engage, CPA Analysis Tools, and CPA Reporting, and/or the like, as described below.

Notifications

By gathering these transactions every day, the opportunity exists to automatically scan each transaction in this common format and to flag individual transactions that may need special accounting or tax treatment. Flags can be specific to a client or may apply to every client, where material amounts can be identified and items can be treated consistently. Once a particular transaction has been identified and addressed, the system can learn from that treatment and may give the CPA the ability to have the platform repeat that treatment for similar transactions in the future. An accountant can determine that future transactions like the current one should be handled as they are today, with such determination being memorized so that the next time that particular transaction or a similar transaction is encountered, the actions from last time can be replicated automatically or with the approval of the CPA or client.

The notifications are completely customizable by the individual users, but once it has been added, the CPA can decide if that notification should be added to all their client accounts, or just that one. Notifications can also be based on account balances, if accounts that should never have a debit balance or credit balance have one, a notification can be created so that the entry can be flagged or otherwise identified so that action may be taken by the CPA or other individuals. There are several frequent mistakes made by clients in their accounting records as well as best practices, and the platform can generate standard notifications that identify when those best practices are not being followed so clients can learn, in real-time, how to handle (and/or to avoid future instances of) the issue.

Accounting File Maintenance

From the platform, the CPA may be able to make adjustments to the file through the SDKs or APIs available on the accounting software that the client is using or by forwarding the adjustments needed so the client can import or enter them directly if they choose for the accountant to not post the entries directly. In the latter case, the entries are stored as pending until the actual entry is posted by the client. The system can remind the client by e-mail, as well as send a notification that the client has entries to post.

The process of updating depreciation schedules may also be able to be performed from the platform. Schedules can be updated, totals can be obtained, and reconciliations to the client's balance can be automated and performed from the platform. The client may have access to the command center as well, so tools like working with prepaid expenses, amortizing loans, etc. can be implemented from the platform and the entries for the account can be made and reconciled there. Accounts like prepaid expenses are tax significant because they can be expensed for cash basis taxpayers, by creating and recording prepaid expense adjustments here. The adjustment for tax purposes can be reversed for the tax return in real-time. The reconciliation of these accounts can be performed in real-time as well.

One Click and Click Free Tax Preparation

By evaluating the transactions as they occur and by identifying account balances that need special tax treatment, and a summary of the adjustments that transition the accounting from GAAP to tax may be summarized in a separate section of the tax-based financial statements that may map directly to the reconciliation performed on schedules M-1 and M-3. Where rather than asking for state and other allocations after year-end, the accountant can identify the characteristics for transactions that drive those state allocations and use the platform to identify and collect them to automate state tax allocations. Thereby, the results at the end of the year can be posted directly to the tax return as soon as the client's records are marked final. If at year-end all of the notifications and alerts created during the year have been addressed or cleared and the accounts deemed tax significant all reconcile to the anticipated tax balance and where a CPA has indicated that a review of the numbers prior to exporting to the software is not necessary, a transfer of the tax balances can be made to the tax preparation software without intervention by the CPA upon the return being marked ready to process by the client or the CPA. A new alert is then created indicating that the tax return is ready to review. Similarly, if at year-end all of the notifications and alerts created during the year have been addressed or cleared and the accounts deemed tax significant all reconcile to the anticipated tax balance and where a CPA has indicated that a review of the numbers prior to exporting to the software is necessary, a tax trial balance will be prepared and an alert will notify the CPA that a tax trial balance is ready for final review upon the year-end numbers being marked ready to process by the client or the CPA. Upon review, the CPA can click one button to transfer the tax balances, which can be transferred directly into the tax preparation software without any further actions by the tax preparer.

Real-Time Tax Projections

Since those entries are now identified, it does not matter when the client records them. The process of identifying and reversing transactions throughout the year means an adjustment to tax basis reporting is being made every day, and owners who log in and see the results can see up to date, adjusted taxable income, which can be annualized to project taxable income and multiplied by their ownership percentage, so that a real-time estimate of taxable income is possible. The system can also identify their effective and marginal tax rates from their historic tax filings to calculate a projected tax for the year. Year-to-date estimated payments can be updated on the platform so that a client has a better feel for their anticipated tax liability after year-end. This approach changes the narrative for tax preparation, so that issues are identified in real-time, such issues are addressed, and updates are made, which results in clients and taxpayers no longer being surprised by what happens at year-end.

CPA Connect

With multiple CPAs logging in and accessing data through these tools, how other CPAs handle particular transactions can be shared in the form of statistics. If a CPA chooses to treat something in a different manner compared to how a majority of other CPAs treats a similar transaction by identifying it as deductible or not deductible, a diagnostic message could be displayed advising the CPA to compare answers with what other professionals are doing. If a transaction is just in a bad category, the CPA can consider moving it or describing it differently.

Additionally, the system was initially designed to prepare financial statements that tied to the lead schedules an auditor uses when preparing the annual audited financial statements, so the same benefits of real-time tax preparation allows the audit department and tax department to access and use the same data at the same time to identify individually significant transactions, material deviations in planning, related party items, as well as the tax-related notifications described above. The CPA may connect between his or her own firm and other firms to build a forum that makes audits and tax preparation even more efficient.

A CPA can watch balances in accounts and determine when oversights or errors may be occurring. The CPA can see questions that clients have and can address them from a common web-browser, serving as the command center. The platform not only can identify issues, but it is a vehicle to communicate these issues to both the client and the CPA so that they can be fixed for items that took place as recently as yesterday, not last year. When items and issues are created for a client, they are maintained until cleared, so when a CPA clicks on the notification for that client, all the unaddressed issues for just that client are filtered there (such as shown in FIG. 3B, for example). Rather than looking at e-mails and through dozens of files, open items may be addressed from that spot.

Getting distracted by other matters in e-mail or by opening several different applications to find the data may make the CPA more efficient, and items that the CPA can re-assign to staff can be done from that common browser also.

Many platforms boast of portals and places to transfer files back and forth. The basis of this platform is the common platform that the accounting function is hosted on.

This provides the ideal location for files to be shared simultaneously, so workpapers, estimates, financials, etc. can be shared seamlessly between the CPA and his or her clients.

CPA Engage

The platform may include an engagement letter preparation utility, taking the standard and often required language from the American Institute of Certified Public Accountants ("AICPA") for engagement letters to be ready to send to a client to sign and return electronically, including credit card processing information. If a client has a need in an area on the platform not covered by the engagement letter, the platform may advise the CPA that he or she has not been engaged to perform these services, so an engagement letter can be prepared autonomously. If services are being performed for a client whose engagement has expired, the site may warn the CPA of that as well.

Analysis Tools

The software may feature many of the standard analysis tools that other web-based platforms have but may also include items not included there. Things an individual CPA might like to look at or things that he or she knows may trigger IRS scrutiny can be summarized and analyzed, and notifications can be generated and sent when things go wrong.

Reporting

Depending on the structure of the client, a Controller/Chief Financial Officer ("CFO") working for the client can update the status of the financial statements, and, when financials are determined to be ready, a notification can be sent to the owners to see a draft or final version of the financial statements. Up to that point, if an owner logged in, he or she would see only the month before, marked final, so the owner was not looking at numbers in process or not final, which prevents the owner from having to consider any incomplete information that may be shown there. Additionally, when an owner or investor logs in, the financial statements are displayed automatically. So that the owner does not have to navigate around and figure out how to find them, the desired statements may be auto-generated and displayed. If the entity is a pass-through entity, it shows the owner's ownership percentage of those on a tax projection schedule, and the marginal tax rate can be adjusted, resulting in the owner obtaining an idea of how much tax might be due on the next estimated payment date or on April 15th of the following year.

The log in may also enable the owner to access at one time all the files that the owner has access to, so if he or she owns an interest in a variety of interests handled by a single CPA, he or she can see all of those at one time.

In some aspects, the system architecture might comprise several cooperating components, including, without limitation, COTS accounting software, a financial data connector, alert notification and accounting logic, a web server, a web client, tax preparation logic, COTS tax software, and/or the like, some of which are described in greater detail with respect to the figures.

COTS Accounting Software

This is the commercial, off-the-shelf accounting software package used by the client. It is not directly part of the system other than that it serves as the source of record for the client's financial data, which is accessed and updated by the other subsystems.

Financial Data Connector

The financial data connector is responsible for reading data from and writing data to the external accounting software and internal persistent data storage. It is agnostic to the actual software package that the client is using and contains adapters to interface with multiple accounting packages.

Alert Notification, and Accounting Logic

This portion of the software watches for data changes by the Financial Data Connector and calculates and stores system alerts and notifications accordingly. This subsystem is described in detail below.

Web Server

The web server is responsible for user authentication, data access, and providing content. It contains all the logic for the user experience (including, but not limited to, report generations, alerts processing, financial details editing, etc.).

Web Client

The Web Client is a Single Page Application ("SPA") that provides the direct interface for user interaction. It provides the user the ability to view and manipulate data, which may then be written back to the accounting or tax software via their individual connectors.

Tax Preparation Logic

This subcomponent is responsible for doing necessary calculations and data manipulations to support completing the client's tax return. Like the Financial Data Connector, the Tax Preparation Logic is agnostic to the actual tax software used and contains adapters to export data to most tax software packages.

COTS Tax Software

Much the same as the COTS Accounting Software, this is not directly part of the system, other than to be the recipient of data from the tax preparation subsystem and is described herein for completeness.

In some aspects, the web technologies that may be used to implement the accounting platform may include, but is not limited to, single page application, command center, performance optimizations, security, accounting and tax software interfaces, data storage, and/or the like, some of which are described in greater detail herein with respect to the figures.

Single Page Application

In some embodiments, the main user interface to the system may be through a web portal. The client facing website may be a single page application ("SPA") supported by a secure data API back end. Being a SPA limits the amount of server-side processing power needed as tasks such as page rendering and layout are shifted to the client device (e.g., user device). It also allows an enhanced user experience by limiting the number of server calls if the user revisits areas of the site as the application can maintain a consistent internal state and does not need to re-request data or content that has already been received.

This frees up server processing power to perform data intensive operations such as reporting and data aggregation with less resources than would be required if the server was also performing server-side rendering ("SSR") of all content pages.

Command Center

A novel feature of the web portal is the user's "Command Center." This interface not only provides alerts and notifications to the user, but also allows the user to directly enter and edit data that may seamlessly be updated into that target companies accounting software. Non-limiting examples of these types of data that feed back to the accounting and tax software are called out with respect to FIGS. 5A-5E and corresponding description.

Performance Optimizations

In some embodiments, Node JS may be used for web server and data access operations. Unlike conventional uses of Node JS, the system in accordance with the various embodiments might use real multi-threaded processing in Node.

Because some aspects of our system (such as reports generation) are CPU bound, they are not well-suited for standard asynchronous programming paradigms. To that end, the system makes extensive use of worker threads in order to speed up (by orders of magnitude, depending on the number of available CPU cores) our CPU bound tasks.

Security

All system functions are accomplished via a secure interface. Every interaction with the web server is via https (this is enforced as follows: any http request is automatically re-routed to the secure endpoint) and authenticated with JavaScript Web Tokens ("JWT").

Every user is assigned an access level and web pages and data API endpoints are all guarded by middleware, which checks the users access level against what is required for that resource. Additionally, a user can be limited to seeing only a subset of companies in the system and resources associated with those companies via the same middleware process.

User passwords are validated to meet a minimum requirement for length and types of characters when created, and are hashed (e.g., using the Argon2 algorithm, but not limited to this particular hashing algorithm).

Accounting and Tax Software Interfaces

One novel feature of the platform in accordance to the various embodiments is its ability to be agnostic as to the Accounting and Tax software that the various clients use. The system contains connectors that can translate transaction and account data from multiple accounting software packages (e.g., QuickBooks' desktop, QuickBooks™ Online, NetSuite™, etc.) into its own internal data format. This allows it to process alerts and notifications, and to create updates to the accounting software data in a generic transaction processing engine core and to isolate software specific dependencies for reading and writing to the accounting software at the very edge of the system.

Similarly, for tax software, the system is able to compute the necessary information required for the tax return based on the internal data structures allowing it to have no dependence on the external accounting software and additionally allows the tax software dependencies to be isolated at the edge of the system. These connectors translate the information required for the client's tax return into the correct format for individual tax software (e.g., Lacerte, etc.).

Data Storage

The system makes use of Document (or NoSQL) database technology in order to improve performance based on the way data is stored and processed. Unlike conventional data storage systems and approaches, the platform as described in some embodiments does not attempt to synchronize changes to individual transactions from the accounting software.

This system allows the accounting software to remain as the system of record. When records are updated for a client, all transactions from all accounts are pulled. The existing transactions in our system are then deleted and replaced. This is very different from existing applications, which attempt to identify changes to existing transactions and perform multiple database calls to examine and update their data.

In order to accomplish the large number of inserts and deletes needed to do transaction synchronization in this way, a persistent data storage system (e.g., MongoDB' or the like) may be used. The non-table structure and bulk insert and delete capabilities of MongoDB' or similar data storage system allows the system to perform data synchronization orders of magnitude faster. For example, a similar architecture using a standard table-based SQL database (e.g., Postgres' or the like) given the same 10,000 transaction data set took just under 15 minutes to validate and store all the transactions. Our system imports the same transaction set in under 10 seconds.

Specific Exemplary Embodiments

We now turn to the embodiments as illustrated by the drawings. FIGS. 1-8 illustrate some of the features of the method, system, and apparatus for implementing accounting software functionalities, and, more particularly, to methods, systems, and apparatuses for implementing accounting platform functionalities, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing accounting platform functionalities, in accordance with various embodiments.

In the non-limiting embodiment of FIG. 1, system 100 might comprise a computing system 105 and corresponding database(s) 110, one or more accounting software or one or more Enterprise resource planning ("ERP") software 115a-115n (collectively, "accounting software 115" or "ERP software 115" or the like) that are executed on corresponding one or more accounting software systems or one or more ERP software systems 120a-120n (collectively, "accounting software systems 120" or "ERP software systems 120" or "ERP systems 120" or the like) that are associated with or used by first through $N^{th}$ entities 125a-125n (collectively, "entities 125" or the like). Computing system 105 might include, without limitation, a processor 105a, a rules engine 105b (also referred to as a "rule engine" or the like), and one or more of accounting logic 105c, tax preparation logic 105d, reports and issue resolution logic 105e, and/or audit analysis logic 105f, and/or the like.

System 100 might further comprise secure network(s) 130, a non-relational ("NoSQL") data storage system 145, a web server 150 and corresponding data store 155, a network(s) 160, one or more user devices 165a-165n (collectively, "user devices 165" or the like) associated with one or more users 170a-170n (collectively, "users 170" or the like), and a rule engine 175 (optional; also referred to as a "rules engine" or the like). In some instances, the user devices 165 may each include, without limitation, one of a desktop computer, a laptop computer, an interactive monitor, an interactive kiosk, a tablet computer, a smart phone, a mobile phone, or a personal digital assistant, and/or the like. In some cases, the one or more users 170 might include, without limitation, at least one of one or more certified public accountants ("CPAs") working for at least one of the entities 125a-125n, one or more owners of at least one of the entities 125a-125n, one or more financial officers of at least one of the entities 125a-125n, one or more board members of at least one of the entities 125a-125n, one or more representatives of at least one of the entities 125a-125n, or one or more agents of at least one of the entities 125a-125n, and/or the like. In some cases, the computing system 105 and corresponding database(s) 110, along with the NoSQL data storage system 145 and the (optional) rule engine 175, might be communicatively coupled to or might be part of the secure network(s) 130, while the web server 150 and corresponding data store 155, along with the user devices 165, might be communicatively coupled to or might be part of network(s) 160, with the secure network(s) 130 being communicatively coupled to the network(s) 160.

According to some embodiments, the secure network(s) 130 and the network(s) 160 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 160 might include an access network of a service provider (e.g., an Internet service provider ("ISP")). In another embodiment, the network(s) 160 might include a core network of the service provider, and/or the Internet.

In operation, computing system 105 and/or rule engine 175 (collectively, "computing system" or the like) might access, from a first accounting or ERP software system 120a among a plurality of accounting or ERP software systems 120a-120n, at least one data file associated with a first entity 125a among one or more entities 125a-125n. The at least one data file might comprise accounting information associated with the first entity 125a. The plurality of accounting or ERP software systems 120a-120n might each operate based on corresponding one of two or more commercial accounting or ERP software 115a-115n that are at least one of different from each other or incompatible with each other, and that are published by different accounting or ERP software developers. In some cases, the two or more commercial accounting or ERP software might comprise two or more commercial off-the-shelf ("COTS") accounting or ERP software, or the like. In some embodiments, accessing the at least one data file associated with the first entity 125a among the one or more entities 125a-125n might comprise accessing, from the first accounting or ERP software system 120a among the plurality of accounting or ERP software systems 120a-120n, the at least one data file associated with the first entity 125a among one or more entities 125a-125n, by using at least one of one or more first application programming interfaces ("APIs") or one or more first software development kits ("SDKs") that enable communication between the computing system and the first accounting or ERP software system, as represented in FIG. 1 by the double-headed arrow 140 between the first accounting or ERP software system 120a and secure network(s) 130, to which the computing system is communicatively coupled and/or is part of. Alternatively, the computing system might receive the at least one data file associated with the first entity 125a among one or more entities 125a-125n—the at least one data file comprising accounting information associated with the first entity 125a—that is sent either from the first accounting or ERP software system 120a or from the non-relational data storage system 145 (both via secure network(s) 130).

According to some embodiments, the computing system might autonomously extract the accounting information from the at least one data file, by extracting transaction data 135 corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited.

In some embodiments, the computing system might autonomously generate a transaction-based trial balance based on the extracted transaction data, the generated transaction-based trial balance serving as a living trial balance that is continually updated based on updated or new transaction data that is accessed from the first accounting or ERP software system. In some instances, the computing system might autonomously generate one of a tax trial balance or an adjusted trial balance, based on the generated transaction-based trial balance.

Merely by way of example, in some cases, the generated tax trial balance might facilitate autonomous generation of tax returns for the first entity by aggregating items to input at proper input fields or lines of a tax return form based on information obtained from the generated transaction-based trial balance. Similarly, the generated adjusted trial balance might facilitate autonomous generation of financial statements by aggregating items to input at proper fields of a financial statement based on information obtained from the generated transaction-based trial balance. According to some embodiments, each of the tax trial balance or the adjusted trial balance might be embodied by a rule engine that aggregates the respective items or information, that populates the appropriate documents (e.g., tax return forms, financial statements, etc.), and that produces, generates, and/or sends the finalized documents. Alternatively, each of the tax trial balance or the adjusted trial balance might be embodied by a lead document that lists the respective items or information, that lists corresponding instructions, metadata, and/or links for directing placement or entry of the items or information, and that utilizes an external system (e.g., computing system, rules engine, or the like) to populate the appropriate fields of appropriate documents (e.g., tax return forms, financial statements, etc.) based on the listed items or information and based on the listed instructions, metadata, and/or links contained in the lead document, and that that produces, generates, and/or sends the finalized documents. Alternatively, each of the tax trial balance or the adjusted trial balance might be embodied by a hybrid of these two alternative embodiments.

According to some embodiments, the computing system might autonomously analyze extracted transaction data among a plurality of extracted transaction data to determine whether the transaction entry corresponding to the extracted transaction data is for a tax significant account. Based on a determination that the transaction entry corresponding to the extracted transaction data is for a tax significant account, the computing system might autonomously analyze the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting. Based on a determination that not all applicable debit and credit entries in the transaction entry have been reversed under the applicable federal and/or state/local tax basis of accounting, the computing system might identify all applicable debit and credit entries in the transaction entry that should be reversed, might autonomously reverse the identified applicable debit and credit entries, might generate one or more tax journal entries based at least in part on at least one of the reversed identified applicable debit and credit entries or the extracted transaction data, and might mark at least one of the transaction entry or the one or more tax journal entries as having been reversed.

In some embodiments, accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed are performed on an ongoing basis throughout each fiscal year (e.g., tax year or calendar year, or the like).

According to some embodiments, based on a determination that the transaction entry corresponding to the extracted transaction data is not for a tax significant account, the computing system might determine whether the transaction entry corresponding to the extracted transaction data contains any tax significant content. Based on a determination that the transaction entry corresponding to the extracted transaction data contains tax significant content, the computing system might generate a first notification to a first user, the notification containing options comprising at least one of an option to prepare a tax significant entry, an option to edit a memo, or an option to pass on the tax significant content, and/or the like. In response to the first user 170*a* selecting the option to prepare a tax significant entry, the computing system might autonomously generate at least one tax journal entry based at least in part on the extracted transaction data 135. In response to the first user 170*a* selecting the option to edit a memo, the computing system might display the tax significant content with a memo field, might provide options for the first user 170*a* to edit the memo field, and, in response to the first user 170*a* submitting edits to the memo field, might push an update to the first accounting or ERP software system 120*a* based on the edited memo field. In response to the first user selecting the option to pass on the tax significant content, the computing system might autonomously mark the tax significant entry as having been cleared.

In some embodiments, based on a determination that not all applicable debit and credit entries in the transaction entry have been reversed under the applicable federal and/or state/local tax basis of accounting, the computing system might send a prompt to the first user 170*a* indicating whether or not to reverse the identified applicable debit and credit entries as well as any future similar entries. In response to receiving a response from the first user 170*a* indicating to reverse the identified applicable debit and credit entries as well as any future similar entries, the computing system might generate a first flag associated with the first entity, the first flag indicating to reverse the identified applicable debit and credit entries as well as any future similar entries. The first flag may be stored in one or more of database(s) 110 and/or non-relational data storage system 145, or the like. The computing system might query the one or more of database(s) 110 and/or non-relational data storage system 145 for flags such as the first flag prior to or when perform tasks, and may function accordingly.

According to some embodiments, the computing system might update records within one or more selected accounts associated with the first entity 125*a* for one or more selected fiscal years (e.g., one or more selected calendar years and/or one or more selected tax years, or the like), in some cases, by accessing, from the first accounting or ERP software system 120*a*, all transaction data from the one or more selected accounts associated with the first entity 125*a* within the one or more selected fiscal years; and replacing existing transaction data for the one or more selected accounts associated with the first entity 125*a* for the one or more selected fiscal years with the accessed transaction data transaction data from the one or more selected accounts associated with the first entity 125*a* within the one or more selected fiscal years.

In some embodiments, the computing system might analyze the generated one or more tax journal entries to determine whether each and every transaction as populated in the generated one or more tax journal entries complies with the applicable federal and/or state/local tax basis of accounting, which in some cases may be performed using rule engine functionality. Based on a determination that at least one transaction as populated in the generated one or more tax journal entries fails to comply with the applicable federal and/or state/local tax basis of accounting, the computing system might generate a second notification indicating how the determined at least one transaction as populated in the generated one or more tax journal entries fails to comply with the applicable federal and/or state/local tax basis of accounting; and might send the generated second notification to the first user device 165*a* associated with the first user 170*a*. In some cases, the computing system might determine at least one candidate solution for addressing each of the at least one transaction as populated in the generated one or more tax journal entries that has been determined to fail to comply with the applicable federal and/or state/local tax basis of accounting, which in some cases may also be performed using rule engine functionality. In some instances, the generated second notification that is sent to the first user device 165*a* associated with the first user 170*a* might further comprise the determined at least one candidate solution for addressing each of the at least one transaction that has been determined to fail to comply with the applicable federal and/or state/local tax basis of accounting.

Alternatively, or additionally, after determining that each and every transaction as populated in the generated one or more tax journal entries complies with the applicable federal and/or state/local tax basis of accounting, the computing system might store, in a non-relational data storage system 145, the generated one or more tax journal entries; might autonomously prepare one or more tax filing documents for the first entity 125*a* based at least in part on the transaction data contained in the generated one or more tax journal entries or based at least in part on one or more tax journal entries retrieved from the non-relational data storage system 145; and might send the prepared one or more tax filing documents to at least one CPA among the one or more CPAs (who might be one or more of the users 170a-170n, or the like) for review. Herein, the one or more tax filing documents might include, without limitation, at least one of federal and/or state/local tax filing forms, supporting documents, a client's files in the CPA's tax preparation software, exported reports from the system or platform to import into the tax preparation software, and/or the like. Alternatively, even without determining whether or not the generated one or more tax journal entries complies with the applicable federal and/or state/local tax basis of accounting, the computing system might autonomously prepare one or more tax filing documents for the first entity based at least in part on the transaction data contained in the generated one or more tax journal entries and/or contained in the tax information associated with the first entity or based at least in part on the generated transaction-based trial balance, and might send the prepared one or more tax filing documents to at least one CPA among one or more CPAs (who might be one or more of the users 170a-170n, or the like) for review. Regardless of the computing system determining whether or not the generated one or more tax journal entries complies with the applicable federal and/or state/local tax basis of accounting, the computing system might provide the at least one CPA with options to sign (e.g., using electronic signature software, as described below with respect to FIG. 5A, or the like) and file the prepared one or more tax filing documents with applicable governmental tax agencies on behalf of the first entity.

Alternatively, or additionally, the computing system might autonomously prepare one or more tax returns for the first entity 125a based at least in part on the transaction data contained in the generated one or more tax journal entries, and might send the prepared one or more tax returns to at least one CPA among one or more CPAs (who might be one or more of the users 170a-170n, or the like) for review. Alternatively, or additionally, the computing system might simultaneously share, over a secure platform, one or more tax data files between at least one CPA and a representative of the first entity 125a (which might include the first user 170a or another of the users 170a-170n, or the like). In some cases, the one or more tax data files might include, without limitation, at least one of one or more tax-related workpapers, one or more tax estimates, or one or more tax-related financial documents, and/or the like, associated with the first entity 125a.

According to some embodiments, the computing system might autonomously gather information contained in one or more journal entries ("JEs") and information contained in one or more tax journal entries ("TJEs"), wherein each of the one or more JEs and the one or more TJEs are generated based on the extracted transaction data; might autonomously generate a report or listing of all journal entries prepared by the at least one CPA for inclusion in a client representation letter based on the gathered information; and might send the generated representation letter to a member of management of the first entity for signature by the member of management. The representation letter, when signed by the member of management of the first entity, represents that financial statements that are generated based on transaction data provided by the first entity amongst other items including the acceptance of the adjustments by management.

In some embodiments, the computing system might autonomously generate financial statements based at least in part on one or more of the generated transaction-based trial balance or the extracted transaction data; might analyze the generated financial statements to determine whether individual elements of the financial statements are in compliance with Generally Accepted Accounting Principles ("GAAP") based on factors determined by the CPA firm to develop such an opinion; and might autonomously generate and send an alert notification to the at least one CPA to address matters that will aid the at least one CPA in determining if the financial statements are in compliance with GAAP.

According to some embodiments, the computing system might determine which account information or tax information associated with the first entity 125a is important to a first user 170a, based at least in part on the determined access levels that the first user 170a has for the first entity 125a or based at least in part on one or more of user interaction of the first user 170a with the computing system, user profile information associated with the first user 170a, or user preferences associated with the first user 170a. The computing system might then generate a command center user interface (a non-limiting example of which is shown in FIGS. 3A and 3B, or the like) for the first user 170a, the generated command center user interface being configured to highlight at least one of account information or tax information associated with the first entity 125a that is determined to be important to the first user 170a, based at least in part on the determined access levels that the first user 170a has for the first entity 125a. The generated command center user interface might include, but is not limited to, at least one of one or more notifications, one or more summaries, one or more alerts, or one or more options for performing one or more tasks, and/or the like. Subsequently, the computing system might display the generated command center user interface on a display screen of a user device 165a associated with the first user 170a.

In some embodiments, the computing system might access, from one or more tax information sources, tax information associated with the third user; might analyze the accessed tax information associated with the third user to determine whether the third user is an owner or an affiliate of entities other than the first entity; and, based on a determination that the third user is an owner or an affiliate of one or more second entities, might aggregate tax information associated with each of the one or more second entities and the tax information associated with the first entity, and might display, on the display screen of the user device, the aggregated tax information for each of the one or more second entities and the first entity in the generated command center user interface. In some instances, the third user might be provided with full access to the tax information associated with each of at least one entity among the one or more second entities based on a determination that the third user is an owner of each of the at least one entity. Alternatively, or additionally, the third user might be provided with limited access to the tax information associated with each of one or more entities among the one or more second entities based on a determination that the third user is an affiliate of each of the one or more entities. Aggregation of entities and access to information based on ownership or affiliation is described in detail below with respect to FIG. 2B.

According to some embodiments, the web server 150 (and corresponding data store 155) might perform functions include, but not limited to, user authentication, data access, or content provisioning, and/or the like. In some cases, the web server 150 might contain all the logic for the user experience (including, without limitation, logic for report generation, logic for alerts processing, logic for editing accounting details, and/or the like).

According to some embodiments, the computing system might generate at least one of one or more financial statements, one or more financial reports, one or more summaries, or one or more documents for government filings, and/or the like, based at least in part on the transaction data 135. Alternatively, or additionally, the computing system might autonomously prepare one or more financial reporting documents for the first entity based at least in part on the transaction data 135, might send the prepared one or more financial reporting documents to at least one CPA among one or more CPAs (who might be one or more of the users 170a-170n, or the like) for review, and might provide the at least one CPA with options to sign and file the prepared one or more financial reporting documents with applicable governmental agencies on behalf of the first entity. Alternatively, or additionally, the computing system might simultaneously share, over a secure platform (such as the accounting platform described herein), one or more account data files between at least one CPA and a representative of the first entity 125a (which might include the first user 170a or another of the users 170a-170n, or the like). In some instances, the one or more account data files might include, but is not limited to, at least one of one or more financial workpapers, one or more financial estimates, or one or more financial documents, and/or the like, associated with the first entity 125a.

Merely by way of example, in the case that the first user is a CPA, the computing system might autonomously analyze at least one of the extracted transaction data for each individual transaction or the generated one or more tax journal entries, and/or the like, to identify at least one of one or more financial services or one or more tax services that are likely required to be performed for the first entity 125a. The computing system might determine whether the identified at least one of the one or more accounting services or the one or more tax services are currently covered by contract between the CPA and the first entity 125a or whether the identified at least one of the one or more accounting services or the one or more tax services covered by contract between the CPA and the first entity 125a will expire within a predetermined period (e.g., a week, two weeks, a month, two months, a quarter, half a year, or a year, etc.).

Figure 5A:
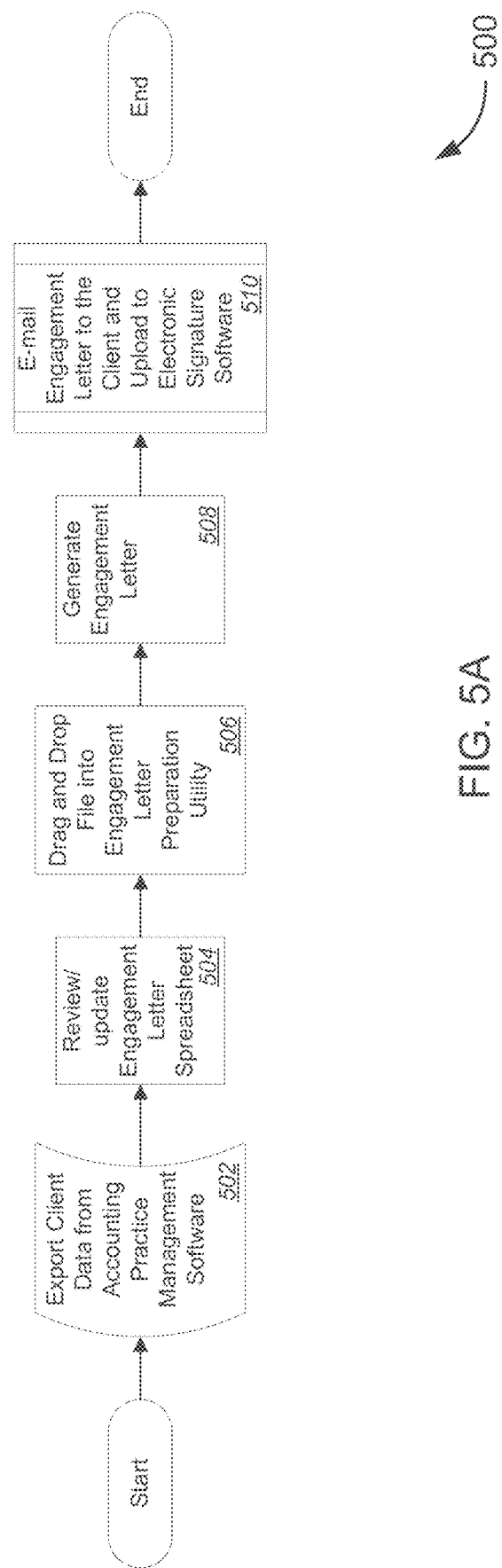
FIGS. 5A-5F are schematic flow diagrams illustrating various non-limiting examples of alert notification and accounting logic functionalities that are part of implementing accounting platform functionalities, in accordance with various embodiments.

Based on a determination that the identified at least one of the one or more accounting services or the one or more tax services are currently not covered by contract between the CPA and the first entity 125a or that the identified at least one of the one or more accounting services or the one or more tax services covered by contract between the CPA and the first entity 125a will expire within the predetermined period, the computing system might autonomously generate an engagement letter for the CPA to provide the first entity with the identified at least one of the one or more accounting services or the one or more tax services, might send, to the user device associated with the CPA, the generated engagement letter for review and signature, and might provide the CPA with an option to send a signed engagement letter to the first entity for countersignature. FIG. 5A illustrates an engagement letter preparation workflow.

In some embodiments, when two or more related companies (whether related as parent-child (or parent-subsidiary), as siblings (or subsidiary-subsidiary), or some other related manner, etc.) transact with each other, it is important (if not required) that such transactions are balanced in both (or all) accounting or ERP software systems. To that end, the computing system might access at least one data file from the accounting or ERP software operating on the accounting or ERP software system that is used by or associated with each related entity (e.g., first and second accounting or ERP software 115a and 115b operating on corresponding first and second accounting or ERP software systems 120a and 120b that is correspondingly used by or associated with a first entity 125a and a second entity 125b, or the like), or might (request and) receive the at least one first data file from a data storage system (e.g., non-relational data storage system 145, or the like). The at least one data file might comprise accounting information associated with each related entity.

Here, each related entity (e.g., first and second entities 125a and 125b, or the like) may be related to one another in that each may be related to one of the others in one of a sibling company relationship, a parent-child company relationship, or a grandparent-child company relationship, and/or the like. Here also, the corresponding accounting or ERP software 115 either may be the same or may be published by the same accounting or ERP software developers or may otherwise be compatible with each other. Alternatively, either may be different from other accounting or ERP software 115 and/or might be incompatible with other accounting or ERP software 115, with two or more of the corresponding accounting or ERP software 115 being published by different accounting or ERP software developers. In some cases, the corresponding commercial accounting or ERP software 115 might comprise one or more different commercial off-the-shelf ("COTS") accounting or ERP software, or the like. Importantly, different accounting or ERP systems or software 115 utilize different formats for balances, and thus automation of balance-based tax accounting across different entities using the different accounting or ERP software 115 becomes difficult and expensive. The various embodiments overcome the deficiencies in balance-based tax accounting by utilizing transaction-based tax accounting that creates living trial balances (or transaction-based trial balances) from underlying transaction data that is retrieved from the disparate ERP software 115, thereby bypassing the different formats for balances that causes the difficulties and expense in automation.

After accessing or receiving the at least one data file for each related entity, the computing system might autonomously extract the accounting information from the at least one data file for each entity, by extracting transaction data 135 for each individual transaction among a plurality of transactions from the accounting information contained within the at least one data file. As described above, each transaction entry might comprise at least one general ledger account that is debited and at least one general ledger account that is credited, wherein a total number of debited accounts among the at least one general ledger account that is debited equals a total number of credited accounts among the at least one general ledger account that is credited. The computing system might then autonomously analyze, for each related entity, each extracted transaction data 135 to identify debit entries and credit entries for each individual transaction for accounting in accordance with the applicable federal and/or state/local tax basis of accounting, and might autonomously generate, for each related entity, one or more account journal entries and/or one or more tax journal entries for the plurality of transactions based at least in part on the analysis of the extracted transaction data 135, each accounting transaction corresponding to each individual transaction among the plurality of transactions, each accounting transaction comprising a debit entry and a credit entry, the debit entry and the credit entry for each accounting transaction corresponding to one of the identified debit entries and one of the identified credit entries, respectively.

The computing system might then determine whether any two or more of the related entities 125 have transacted with each other, and, if so, whether such transactions have been balanced in their respective accounting or ERP software systems 120. If not, the computing system might balance transaction data among two or more of the related entities 125 corresponding to each transaction (if any) among two or more of the related entities 125. For balancing purposes, alternative or additional to the computing system balancing transaction data based on transaction data obtained from the account journal entries and/or the tax journal entries of each related entity, the computing system might balance transaction data 135 that is (requested and) received from the non-relational data storage system 145. After the applicable transactions (if any) have been balanced, copies of the balanced transaction data may be stored in the non-relational data storage system 145. In some embodiments, the computing system might update transaction data that is contained in the at least one data file associated with each related entity 125 and via the corresponding accounting or ERP software system 120, based on the balanced transaction data.

According to some embodiments, the computing system might access, from the first accounting or ERP software system 120a, a first chart of accounts associated with the first entity 125a, the first chart of accounts comprising a listing of names of accounts that the first entity has identified for recording transactions in its general ledger (such as shown, e.g., in FIG. 4, or the like). The computing system might determine whether the first chart of accounts matches a common chart of accounts. Based on a determination that at least one account number in the first chart of accounts does not match a corresponding at least one account number in a common chart of accounts, the computing system might determine whether each of the at least one account number is a numeric-only account number. Based on a determination that each of the at least one account number is a numeric-only account number, the computing system might generate a temporary account number for each of the at least one account number, by dividing each of the at least one account number by a number of digits corresponding to an account number among the at least one account number in the first chart having the largest number of digits, resulting in each temporary account number being a decimal number less than 1 (such as shown in FIG. 4, or the like).

The computing system might map the first chart of accounts to the common chart of accounts, by replacing each of the temporary account numbers with corresponding account numbers in the common chart of accounts. The computing system might determine whether at least one account name in the first chart of accounts does not match a corresponding at least one account name in the common chart of accounts. Based on a determination that at least one account name in the first chart of accounts does not match a corresponding at least one account name in the common chart of accounts, the computing system might replace each of the at least one account name in the first chart of accounts with the corresponding at least one account name in the common chart of accounts. In this manner, an auto-fix chart of accounts functionality may be implemented. This process of chart of accounts mapping, which is described in detail below with respect to FIG. 4, may be performed for the chart of accounts for any of the other entities 125b-125n.

With respect to the command center user interface, which is described above as well as described below with respect to FIGS. 3A and 3B, highlighting at least one of account information or tax information associated with each of the at least one entity among the one or more entities might comprise displaying the at least one of account information or tax information encapsulated within corresponding notifications. In such embodiments, the computing system might determine whether issues associated with each of the at least one of account information or tax information associated with the first entity (or associated with each of the at least one entity) and encapsulated within corresponding notifications have been addressed and resolved.

Based on a determination that at least one issue associated with first account information or first tax information among the at least one of account information or tax information (or associated with at least one second account information or at least one second tax information) associated with the first entity (or associated with one or more of the at least one entity) has not been addressed or reviewed by the first user, the computing system might determine whether a first notification encapsulating each of the first account information or first tax information (or whether at least one second notification encapsulating each of the at least one second account information or the at least one second tax information) currently has at least one of a color, a shape, or a highlighting effect, and/or the like, that is indicative of a status of very important or very urgent. If not, the computing system might change at least one of the color, the shape, or the highlighting effect, and/or the like, of the first notification (or the at least one second notification) to the at least one of the color, the shape, or the highlighting effect, and/or the like, that is indicative of a status of very important or very urgent.

Based on a determination that at least one issue associated with first account information or first tax information among the at least one of account information or tax information (or associated with at least one second account information or at least one second tax information) associated with the first entity (or associated with one or more of the at least one entity) has been addressed and reviewed by the first user but has not yet been resolved, the computing system might determine whether a first notification encapsulating each of the first account information or first tax information (or whether at least one second notification encapsulating each of the at least one second account information or the at least one second tax information) currently has at least one of a color, a shape, or a highlighting effect, and/or the like, that is indicative of a status of important or urgent. If not, the computing system might change at least one of the color, the shape, or the highlighting effect, and/or the like, of the first notification (or the at least one second notification) to the at least one of the color, the shape, or the highlighting effect, and/or the like, that is indicative of a status of important or urgent.

Based on a determination that all issues associated with first account information or first tax information among the at least one of account information or tax information (or associated with at least one second account information or at least one second tax information) associated with the first entity (or associated with one or more of the at least one entity) have been addressed and resolved, the computing system might determine whether a first notification encapsulating each of the first account information or first tax information (or whether at least one second notification encapsulating each of the at least one second account information or the at least one second tax information) currently has at least one of a color, a shape, or a highlighting effect, and/or the like, that is indicative of issues having been resolved. If not, the computing system might change at least one of the color, the shape, or the highlighting effect, and/or the like, of the first notification (or the at least one second notification) to the at least one of the color, the shape, or the highlighting effect, and/or the like, that is indicative of issues having been resolved.

In some embodiments, the highlighting effect might include, without limitation, at least one of embossing effect, debossing effect, outlining effect, shadowing effect, patterning effect, reflective effect, or transparency effect, and/or the like. The highlighting of the notifications in the command center view may be performed to highlight important (or de-highlight less important or completed) tasks or information associated with not just the first entity 125a, but also any of the entities 125 with or to which the first user 170a (or any of the other users 170) may be associated or may have access.

According to some embodiments, the computing system might receive, from the first user, a request for at least one of first data or first content for display within the command center user interface, and might determine whether the at least one of first data or first content in the received request is stored in a data store that is local to the computing system. Based on a determination that the at least one of first data or first content in the received request is stored in the data store that is local to the computing system, the computing system might retrieve the at least one of first data or first content from the data store without re-requesting the at least one of first data or first content from an external data store, and might display the retrieved at least one of first data or first content within the command center user interface. Based on a determination that one or more of the at least one of first data or first content in the received request is not stored in the data store that is local to the computing system, the computing system might query and request, from the external data store (e.g., non-relational data storage system 145, or the like), the one or more of the at least one of first data or first content, might receive, from the external data store, the requested one or more of the at least one of first data or first content, and might display the received at least one of first data or first content within the command center user interface.

In some aspects, the accounting platform as provided by the system 100 might include a variety of features, including, but not limited to a command center, notifications, accounting file maintenance, one click and click free tax preparation, real-time tax projections, CPA connect functionality, CPA engage functionality, analysis tools, reporting, and/or the like, some of which are described in greater detail with respect to the figures.

These and other functions of the system 100 (and its components) are described in greater detail below with respect to FIGS. 2-6.

FIG. 2A is a schematic diagram illustrating a non-limiting example 200 of a conventional tax accounting workflow.

As shown in the example 200 of FIG. 2A, different sized companies or entities 205, represented in FIG. 2A by different polygons (e.g., circles, triangles, squares, and hexagons, etc.) of different sizes, might utilize different accounting software systems and/or may use different Enterprise resource planning ("ERP") systems, such differences being denoted in FIG. 2A by smaller polygons within other polygons. Conventionally, accounts trial balances (also referred to as "static balances" or the like) might be exported from the accounting software systems or ERP systems by an accounts trial balance software 210 or using spreadsheet software 215, or the like. Due to the inconsistent or disparate sources (i.e., different account software systems and/or different formats of disparate ERP systems, or the like), however, automation of such static trial balance exporting is expensive and difficult to implement (particularly, the difficult lies with format, timing, and accuracy when automating exporting of static balances). Importantly, it is well known that static trial balances are not sufficient for tax preparation purposes as it does not take into account any changes that might occur during the taxable period after the static trial balance has been generated (especially as it is non-trivial to generate each instance of the static trial balance). The conventional system would generate an adjusted trial balance 220a based on the exported accounts trial balance for an entity 205, might generate a tax journal entry ("TJE") 220b based on the adjusted trial balance 220a, and might generate a tax trial balance 220c based on the TJE 220b. The tax trial balance 220c would then be exported to a tax preparation software 225 to prepare the appropriate tax documents. As noted above, such conventional balanced-based workflow systems are fraught with problems, including, but not limited to: excessive overtime (because working with year-end balances means a CPA cannot start until the deadline is here); tax day surprises (because working with year-end balances means CPAs cannot start until after year-end, when it is too late to plan and take appropriate action); redundant work (because working with balances as of a particular date means that interim work and client questions may be repeated, and the subtotal that a CPA works with during the year means nothing to the total that goes on the form at the end of the year); and inconsistent source (because working with balances relies on the formats of different Enterprise resource planning ("ERP") systems, which results in automation being expensive and difficult to create).

A transaction-based workflow platform as described in accordance with the various embodiments (and as shown and described below with respect to FIG. 2B) addresses the problems inherent with conventional balanced-based workflow systems, resulting in the following improvements: overtime being eliminated (because by working on transactions, the work can start as soon as the transaction is posted, 364 days before year-end); there being time to plan (because by working with transactions, real-time estimates are possible and clients will not be surprised at year-end); repetitive tasks being eliminated (because the transactions that make up a subtotal during the year make up the total at the end of the year, so that work done on, and questions asked about, those transactions need not (and thus will not) be repeated); and consistent formatting being achieved (because a journal entry that is created is the universal language that every ERP speaks, resulting in consistent data that is easy to work with).

Figure 2B:
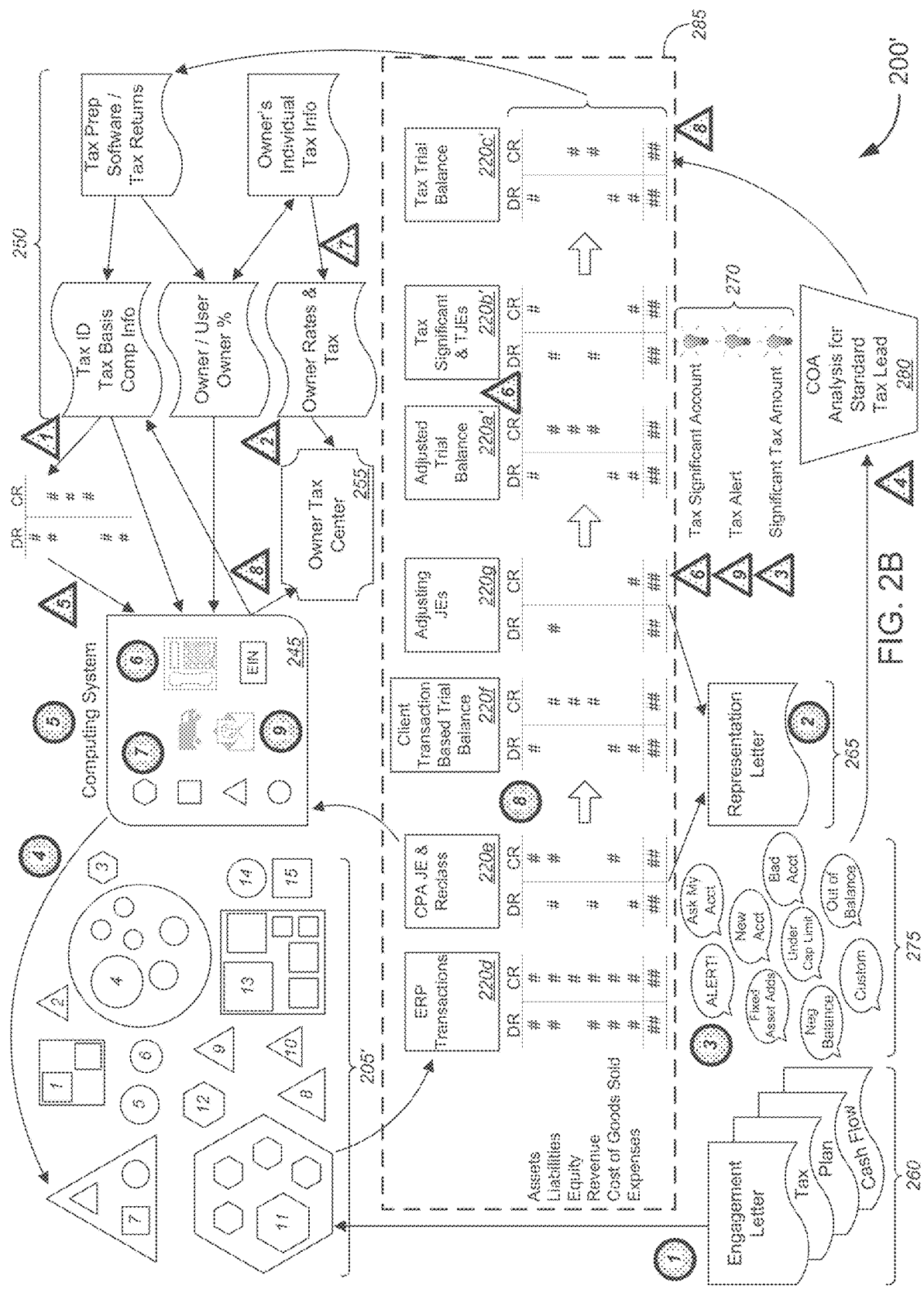
FIG. 2B is a schematic diagram illustrating a non-limiting example of a tax accounting workflow, in accordance with various embodiments.

We now turn to FIG. 2B, which is a schematic diagram illustrating a non-limiting example 200' of a tax accounting workflow, in accordance with various embodiments. As shown in the non-limiting example 200' of FIG. 2B, different sized companies or entities 205' (similar to the companies or entities 205 of FIG. 2A), represented in FIG. 2B by different polygons (e.g., circles, triangles, squares, and hexagons, etc.) of different sizes, might utilize different accounting software systems and/or may use different Enterprise resource planning ("ERP") systems, such differences being denoted in FIG. 2B by smaller polygons within other polygons.

Despite the different or disparate accounting software systems and/or ERP systems, the computing system 245 might extract transaction data (e.g., ERP transaction data 220d, or the like) from the accounting software system or ERP system of a client(s). Because only data (in this case, transaction data) is being extracted, such data extraction can be agnostic to the type of accounting software system, the type of ERP system, and the various formats of such systems, thereby avoiding issues (e.g., expense and difficulties with format, timing, and accuracy) with automation of conventional balance-based workflow systems. The computing system 245 then generates a CPA journal entry ("JE") and reclasses transactions or entries 220e based on the extracted transaction data. The computing system 245 might then generate—based on the underlying transactions that contained in the extracted transaction data—a client transaction-based trial balance 220f (also referred to as a "living trial balance" or "transaction-based trial balance," or the like), which may be used to generate adjusting JEs 220g. The computing system 245 might then generate an adjusted trial balance 220a' based on the adjusting JEs 220g. The computing system 245 might then determine whether it is a tax significant account ("TSA"), might generate tax significant entries ("TSEs") and TJEs 220b' based on the adjusted trial balance 220a' and based on such determination. The computing system might also determine whether the debit and credit entries are reversed (and might prompt the user regarding whether to remember the type of entries to reverse for future automation), and might generate a tax trial balance 220c' with the reversed entries. Based on the tax trial balance 220c', the computing system 245 might generate a standard firm tax lead, which contains the same information as the tax trial balance 220c' but presents the information in a different format or view. The tax trial balance 220c' or the standard firm tax lead may be imported into a tax preparation software for preparation of a tax return and/or may be used directly by the system to prepare the tax return.

Some of the features of the transaction-based workflow system of FIG. 2B (denoted in FIG. 2B by numbered circles corresponding to the following enumerated list) might include, without limitation, at least one of: (1) an engagement letter preparation utility 260 that provides interactivity and auto-completing functionalities to preparation of engagement letters (the workflow of which is described in detail below with respect to FIG. 5A); (2) a representation letter preparation utility 265 that automatically generates a representation letter with adjustments and reclassifications included, passed, or posted open; (3) an alerts utility that generates tax alerts 270 and/or account alerts 275; (4) a data gathering utility that collects the transaction data from the plurality of disparate accounting software systems and/or the plurality of disparate ERP systems; (5) a fixed assert center that automatically adds data to software, that calls tax adjustments, and/or the like; (6) a data access utility that provides central access to all files; (7) an agnostic posting utility that provides agnostic post and/or propose functionality with pending note functionality; (8) a transaction-based trial balance utility that generates transaction-based trial balances; (9) an e-mail utility that e-mails financial statements to users on close; and/or the like.

In some embodiments, the transaction-based workflow might be facilitated by the following onboarding process for new clients: (A) assigning a company ID, as well as assigning firm staff, for the new client; (B) pulling data from an accounting software package file(s) (e.g., a QuickBooks® file, a QuickBooks® bank statement file (also referred to as "QBO"), and/or a QuickBooks® company file (also referred to as "QBW"), or the like); (C) comparing the employer identification number ("EIN") to tax return data; (D) running a chart of accounts ("COA") analysis to create a Lead 1; and (E) running a COA analysis to create a Tax Lead (or Tax Trial Balance); and/or the like. In some instances, the COA analysis might be performed by a COA analysis utility 280, or the like. Onboarding of new clients is also described below with respect to FIG. 5B.

According to some embodiments, the computing system or rules engine (using the representation letter preparation utility 265 described above) might gather the CPA JEs and the TJEs, and might build (or automatically generate) a representation letter with adjustments and reclassifications included, passed, or posted open. The computing system or rules engine might then deliver the representation letter to a client for approval or signature. The representation letter is provided for the purpose of expressing an opinion as to whether the financial statements present a fair view of the financial position of the entity, in accordance with Generally Accepted Accounting Principles ("GAAP"), and that all representations in the letter are made to the best of the entity's management's knowledge and belief.

In some embodiments, the data that is pulled from the accounting software package file(s) (at Step (B) above) might include, without limitation, at least one of an active COA, an inactive COA, transaction data, trial balances for each of the previous three years, contact information regarding the new client (including, but not limited to, company name, company address, company website, company e-mail address for each representative of the new client, company phone numbers for each representative of the new client, and/or the like), company EIN, and/or the like.

According to some embodiments, comparing EIN to tax return data (at Step (C) above) might include, without limitation, at least one of: (i) obtaining contact information for the company, prompting for any differences from the contact information pulled from the accounting software package file(s), and updating the tax software if there is a change of address; (ii) obtaining data from tax information sources (e.g., tax information sources 250 as shown in FIG. 2B, or the like) for Page 1 (e.g., filing status data, or the like), Schedule K (e.g., data for investments in partnership, etc.), Form 8825 (e.g., for partnerships and S corporations), Farm, Cash, or Accrual basis; (iii) obtaining the trial balance for the prior year; (iv) obtaining shareholder information for each shareholder (including, but not limited to, shareholder name, social security number ("SSN"), address, e-mail, number of shares, etc.); (v) setting up investor users to potentially invite and setting up access levels for each of standard reports, drafts or finals, and with or without drill-down; (vi) using the client's SSN or EIN to pull data from tax preparation software (including, but not limited to, taxable income, filing status, marginal rate, effective rate, state tax owed, state tax payments, federal tax owed, federal tax payments, etc.); and/or the like.

In an aspect, aggregation of entities may be enabled by accessing the tax information sources 250 in FIG. 2B, thus allowing, for instance, combining all returns for a particular individual(s), determining whether an entity whose tax information has been gathered in this manner is owned or affiliated by the particular individual(s), and sending the particular individual(s) invitations to access the tax information of the entity (limited in terms of levels of access to particular types of information about the entity depending on whether the particular individual(s) is an owner or an affiliate of the entity—that is, owners are provided with full access, while affiliates are provided with limited access unless given greater access by owners). Here, two or more entities that share the same individuals as owners (regardless of differences in percentage of ownership by these individuals across the two or more entities) are considered owners (or common owners), while a change in make-up of the individuals who own the entities (e.g., with at least one more owner or at least one less owner when comparing the ownership of the two or more entities) would result in the individuals being treated as affiliates. Although affiliates are owners, they may not be automatically given access to all the information for the entity; the owners or common owners would be given the choice to include or exclude affiliates (or affiliate owners) in terms of information accessible by the affiliates on the command center user interface. For owners or common owners, the system automatically identifies the entities or companies that an individual might be an owner or part-owner of, thereby facilitating the process for generating consolidated tax returns or combined tax returns, with minimal or no user selection, such identification and facilitation, in some cases, being performed as part of the onboarding process. Here, a consolidated tax return would be generated if, e.g., Company A owns Companies B and C, while a combined tax return would be generated if, e.g., there is common ownership across all of Companies A through C (i.e., all three companies share the same individuals as owners, regardless of any differences in percentage of ownership from one company to another among the same individuals). In other words, onboarding can discover who can be consolidated or combined based on information about the individuals and companies (e.g., EIN, social security number, name, etc).

For example, the system might aggregate data for Entity X (owned by Alexis, Bob, and Charlotte with an ownership split of 40%, 30%, and 30%) and Entity Y (owned by Alexis, Bob, and Charlotte with an ownership split of 35%, 40%, and 25%), and might treat each of Alexis, Bob, and Charlotte as owners with full access to the information for each of Entity X and Entity Y. The system might also aggregate data for Entity Z (owned by Alexis, Bob, Charlotte, and Dave with an ownership split of 30%, 30%, 20% and 20%), and might treat each of Alexis, Bob, and Charlotte as owners with full access to the information for each of Entities X and Y, while Alexis, Bob, Charlotte, and Dave might each at least initially be treated as an affiliate owner with limited access to the information for Entity Z. As common owners, Alexis, Bob, and Charlotte might be given the choice of: (i) combining Entity Z in a combined tax return for Entities X, Y, and Z; (ii) giving themselves full and aggregated access to the information for all three entities; and/or (iii) giving greater (if not full) access to information for Entity Z to Dave. The system might retrieve the contact information (e.g., e-mail address, mailing address, etc.) from tax forms (e.g., Form 1040, or the like) filed by each of the individuals (in this case, Alexis, Bob, Charlotte, and Dave) or entities (in this case, Entities X, Y, and Z), and might send invitations to the individuals to register or login to accounts on the system to access information for each entity with which the particular individual is associated as either an owner or an affiliate (with corresponding levels of access to the information regarding the entity or entities). Importantly, for individuals who are owners of multiple entities (e.g., Alexis, Bob, and Charlotte in the examples above), or who otherwise are provided with authorization to access information regarding the entities (e.g., CPAs, board members, officers, agents, etc.), the information for the multiple entities may be accessible on a single command center user interface (such as shown in FIG. 3, or the like). In other words, the individual need not logout and log into different accounts to view information regarding different entities. Instead, the system recognizes or otherwise identifies (based on appropriate rules or the like) that the individual should have access (or is otherwise authorized to access) information regarding the multiple entities, and thus consolidates or aggregates the information in an overarching or integrated command center user interface. The system might also provide the individuals with options to easily (and conveniently) generate reports, statements, returns, and/or the like at any time, with such documents being generated in response to selection of such options, without having to request such documents from a CPA (and without having to wait for the CPA to generate and send the documents or having to wait till year's end, or the like).

In some embodiments, running a COA analysis to create a Tax Lead or Tax Trial Balance (at Step (E) above) might include, without limitation, at least one of: (a) highlighting other leads; (b) reclassing other leads; (c) verify whether the login from Step (A) is correct; (d) creating an alert for a partner(s) to verify the trial balance for the previous three years by lead to the trial balance for the prior year (obtained at Step (iii) above); (e) if final, then no alert push, or alternatively verifying first, using one click or click-free processing; (f) auditing flags; (g) identifying key words for triggering tax alerts; and (h) displaying teaching alerts to help teach the user about accounting, taxes, or the system; and/or the like. In some cases, creating the alert (at Step (d) above) might comprise: scanning for potential tax significant accounts ("TSAs"); highlighting differences in reclassification tax lead options and indicating where different; determining whether it is a tax significant account; determining whether the debit and credit entries have already been reversed; prompting a user to indicate whether or not to reverse/not reverse entries for future similar entries; determine whether it is a default account (particularly, if it is a Balance Sheet Account); and/or the like.

The process at Step (ii) is denoted in FIG. 2B by numbered triangular marker #1. The processes at Steps (iv) and (vi) are denoted in FIG. 2B by numbered triangular marker #2. In some instances, the transaction data that is pulled from the accounting software package file(s) (at Step (B) above; which might include data regarding significant tax amount, or the like) might be searched for alerts regarding the data pulled from the tax preparation software (at Step (vi) above), as denoted in FIG. 2B by numbered triangular marker #3. The processes at Step (E) is denoted in FIG. 2B by numbered triangular marker #4. Creating the alert at Step (D) is denoted in FIG. 2B by numbered triangular marker #5. The tax significant account alert 270, as shown in FIG. 2B and as described above with respect to Step (D) above, is denoted in FIG. 2B by numbered triangular markers #6. The effective rate data that is pulled from the tax preparation software (at Step (vi) above) is denoted in FIG. 2B by numbered triangular marker #7. The no alert push or verify first by one click or click-free processing (at Step (e) above) is denoted in FIG. 2B by numbered triangular markers #8. Identifying key words for triggering tax alerts (at Step (g) above) is denoted in FIG. 2B by numbered triangular marker #9.

Figure 2C:
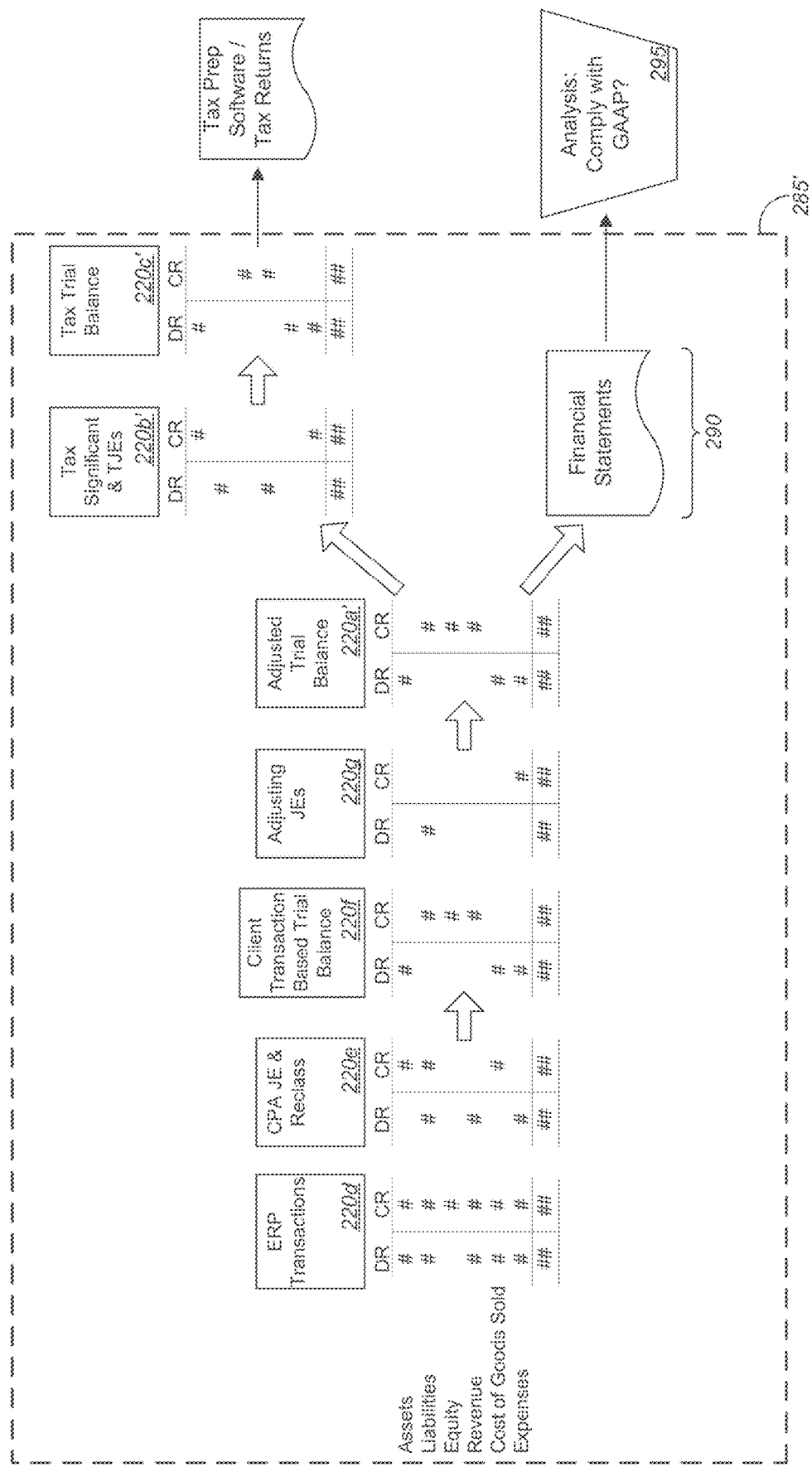
FIG. 2C is a schematic diagram illustrating a non-limiting example of a combination of an accounting workflow for tax preparation and an accounting workflow for financial statement preparation, in accordance with various embodiments.

FIG. 2C is a schematic diagram illustrating a non-limiting example 200" of a combination of an accounting workflow for tax return preparation and an accounting workflow for financial statement preparation, in accordance with various embodiments. FIG. 2C is intended to be an alternative and/or a cutout from FIG. 2B. That is, FIG. 2C is intended to function in a similar, if not identical, manner as example 200' of FIG. 2B, except that the region denoted by dash-lined border 285 in FIG. 2B is replaced by the alternative dash-lined border region 285' in FIG. 2C.

As shown in the dash-lined border region 285' in the non-limiting example 200" of FIG. 2C, the ERP transactions 220d (which are extracted from the various ERPs associated with the clients or entities) might be used to generate CPA JEs and reclassifications 220e, which may be used to generate client transaction-based trial balance 220f, which in turn may be used to generate adjusting journal entries ("JEs") 220g, which may be used to generate adjusted trial balance 220a'. The adjusted trial balance 220a' may be used to generate tax significant entries and TJEs 220b', which may be used to generate tax trial balance 220c', which may optionally be used to generate a standard firm tax lead (which contains the same information as the tax trial balance 220c' but presents the information in a different format or view), as described in detail above with respect to FIG. 2B. The tax trial balance 220c' or the standard firm tax lead may be imported into a tax preparation software for preparation of a tax return and/or may be used directly by the system to prepare the tax return. Alternatively, or additionally, the adjusting JEs 220g may be used to generate a standard firm financial statement lead (which contains the same information as the adjusted trial balance 220a' but presents the information in a different format or view).

Merely by way of example, in some cases, the tax trial balance or the standard firm tax lead might facilitate autonomous generation of tax returns for the first entity by aggregating items to input at proper input fields or lines of a tax return form based on information obtained from the generated transaction-based trial balance. Similarly, the adjusted trial balance or the standard firm financial statement lead might facilitate autonomous generation of financial statements by aggregating items to input at proper fields of a financial statement based on information obtained from the generated transaction-based trial balance. According to some embodiments, each of the tax trial balance (or the standard firm tax lead) or the adjusted trial balance (or the standard firm financial statement lead) might be embodied by a rule engine that aggregates the respective items or information, that populates the appropriate documents (e.g., tax return forms, financial statements, etc.), and that produces, generates, and/or sends the finalized documents. Alternatively, each of the tax trial balance (or the standard firm tax lead) or the adjusted trial balance (or the standard firm financial statement lead) might be embodied by a lead document that lists the respective items or information, that lists corresponding instructions, metadata, and/or links for directing placement or entry of the items or information, and that utilizes an external system (e.g., computing system, rules engine, or the like) to populate the appropriate fields of appropriate documents (e.g., tax return forms, financial statements, etc.) based on the listed items or information and based on the listed instructions, metadata, and/or links contained in the lead document, and that that produces, generates, and/or sends the finalized documents. Alternatively, each of the tax trial balance (or the standard firm tax lead) or the adjusted trial balance (or the standard firm financial statement lead) might be embodied by a hybrid of these two alternative embodiments.

According to some embodiments, the adjusting JEs 220g and/or the adjusted trial balance 220a' may be used to generate one or more financial statements 290, which may be one of audited, reviewed, compiled, or "prepared" (formerly referred to as "management use only" or the like; which typically includes language that no assurance is provided, or the like). In some embodiments, the system might analyze the one or more financial statements to determine whether individual elements of the generated financial statements are in compliance with GAAP (in some cases, based on factors determined by the CPA firm to develop such an opinion). In some instances, the GAAP analysis of the generated financial statements might be performed by a GAAP analysis utility 295, or the like. Based on a determination that at least some individual elements of the generated financial statements are not in compliance with GAAP, the system might autonomously generate and send an alert notification to at least one CPA to address matters that will aid the at least one CPA in determining if the generated financial statements are in compliance with GAAP.

FIGS. 3A and 3B (collectively, "FIG. 3") are schematic diagrams illustrating non-limiting examples 300 of screen views of a command center user interface that may be used for implementing accounting platform functionalities, in accordance with various embodiments. In the non-limiting example of FIG. 3, the user device 300 might comprise a housing 305 and a display screen 305a (which might include a touchscreen display or a non-touch display, or the like). In some cases, the user device 300 (although depicted in FIG. 3 as a tablet computer) may include, without limitation, one of a desktop computer, a laptop computer, an interactive monitor, an interactive kiosk, a tablet computer, a smart phone, a mobile phone, or a personal digital assistant, and/or the like.

Figure 6A:
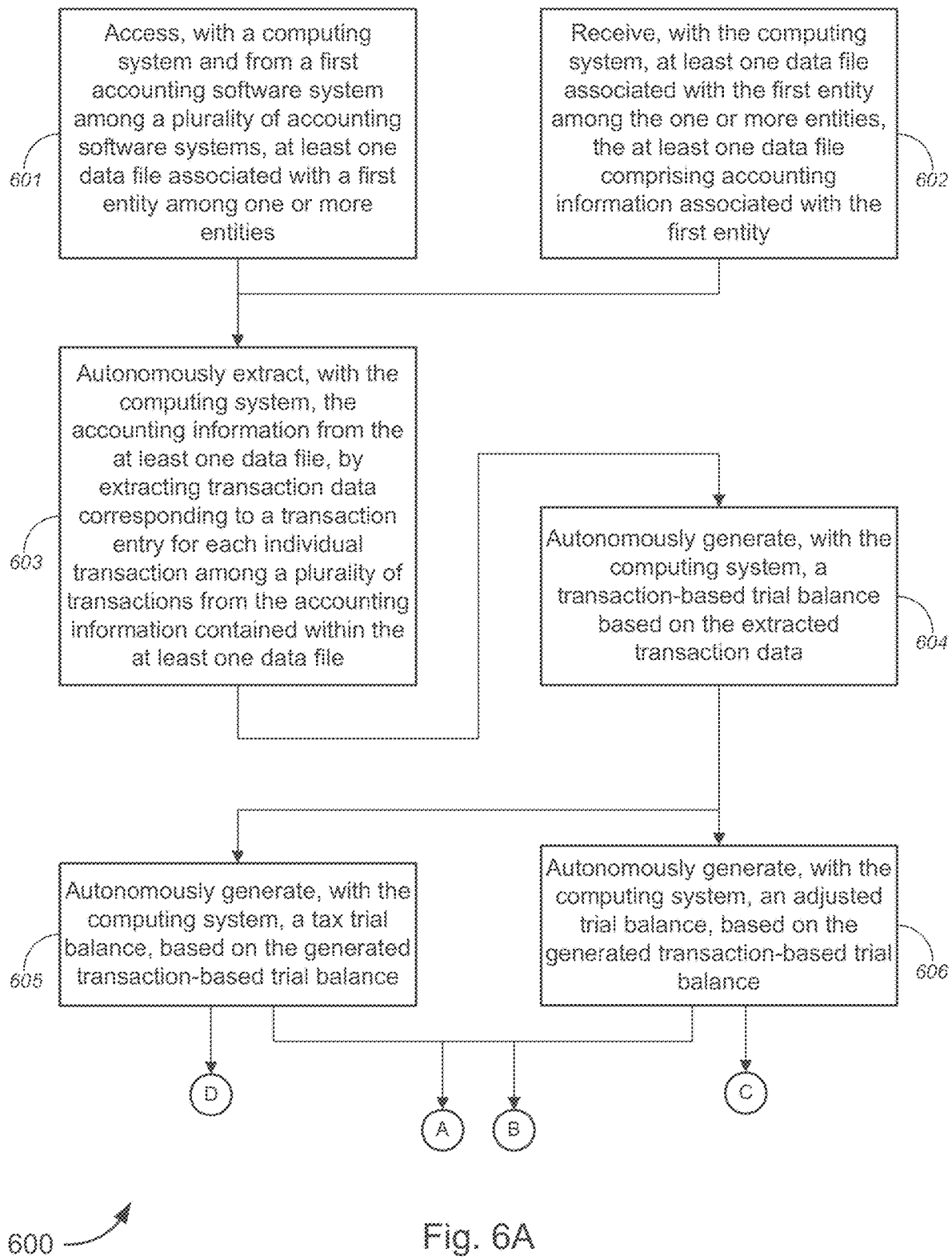
Figure 6D:
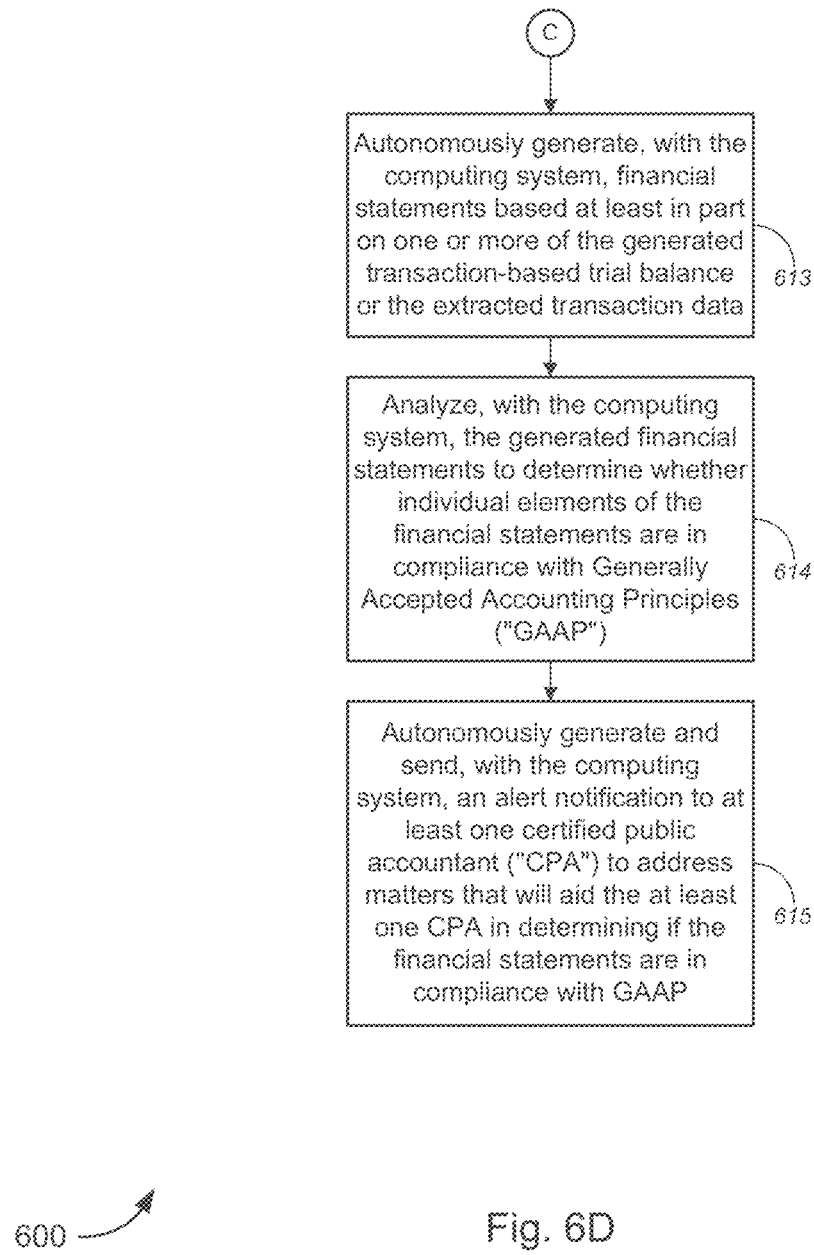
Figure 6E:
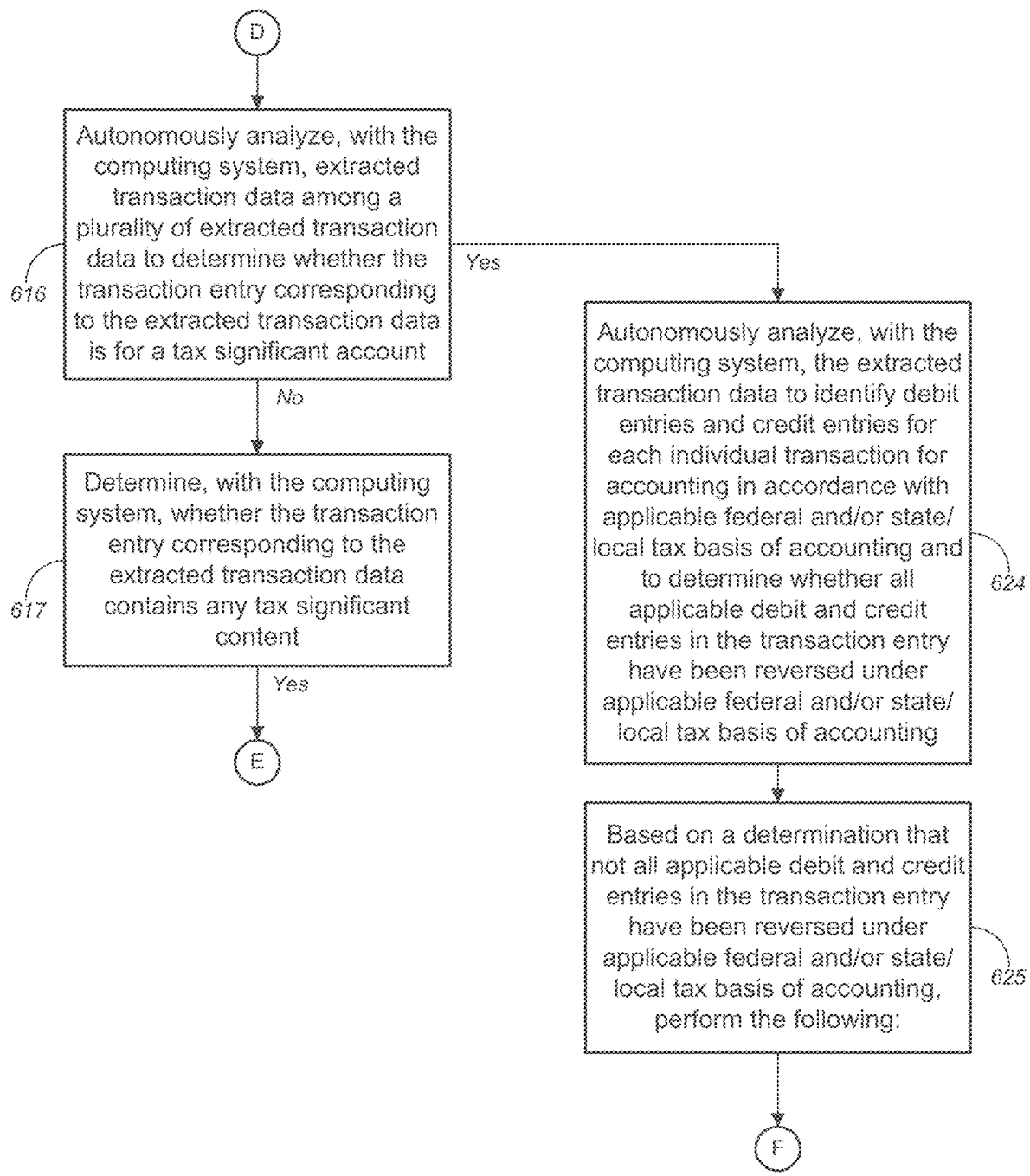
Figure 6F:
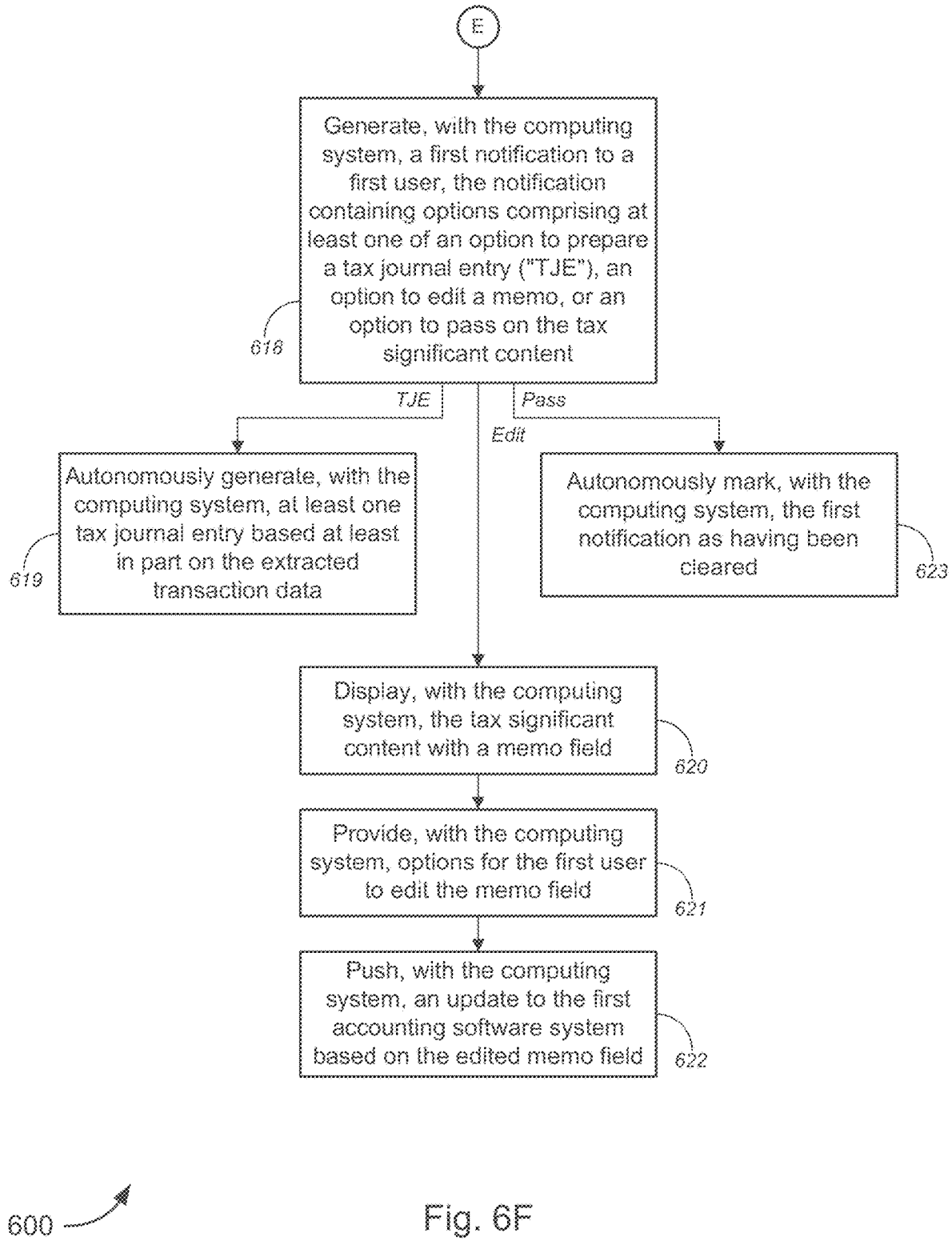
Figure 6G:
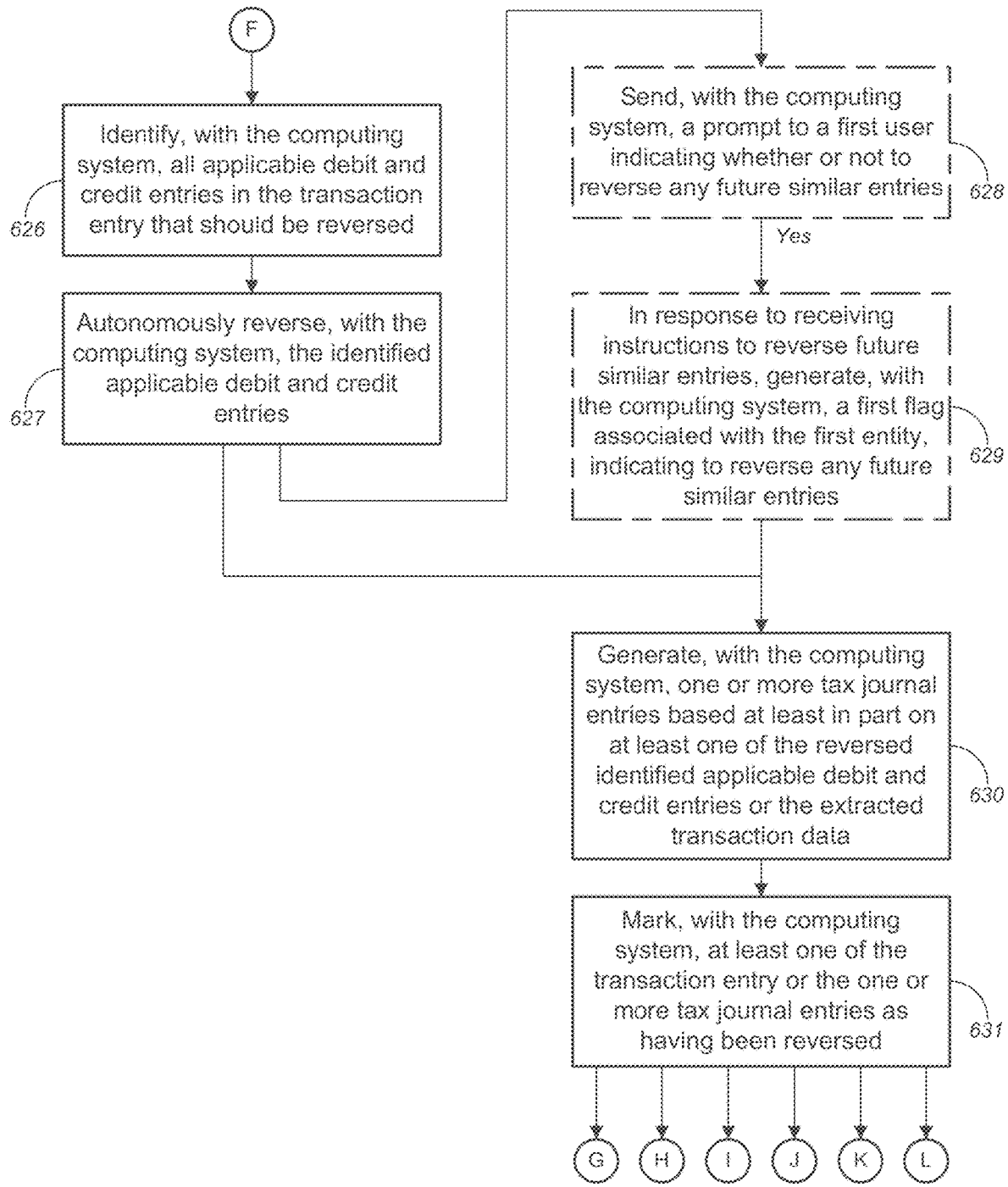

Displayed (or executed) on the user device 300 might be an accounting platform, which might provide the functionality of displaying a command center user interface 310, which is described in detail herein (e.g., with respect to FIGS. 1 and 6G, or the like). As shown in FIGS. 3A and 3B, a side panel of the command center user interface 310 might include, without limitation, a side panel header portion 315 (which might display, for example, a user name of the user, in this case, "Ford"; an entity name, in this case, "Entity 2"; a logo associated with the user and/or the entity; and the like) and options 320 to select one of a plurality of user interfaces (with the command center user interface 310 being presently selected and shown in FIG. 3 and the corresponding option to select the command center user interface being highlighted, as also shown in FIG. 3).

Other options 320 to select among the plurality of user interfaces might include, but are not limited to, a reports user interface (presenting financial reports, tax reports, and/or financial statements, or the like), a user profile user interface (presenting user profile information, preferences, and/or options, or the like), a transactions user interface (presenting at least one transaction as well as search and filter options for displaying one or more transactions associated with the selected entity(ies), or the like), a fixed assets user interface (presenting at least one fixed asset as well as search and filter options for displaying one or more fixed assets associated with the selected entity(ies), or the like), an account mappings user interface (presenting chart of accounts mappings, such as shown and described below with respect to FIG. 4, or the like), a client accounts user interface (presenting one, more, or all client accounts associated with the selected entity, as well as search and filter options for displaying particular one or more client accounts associated with the selected entity(ies), or the like), a tax balances user interface (presenting tax balances for each selected entity, or the like), a tax journal entries user interface (presenting at least one tax journal entry as well as search and filter options for displaying one or more tax journal entry associated with the selected entity(ies), or the like), an add tax journal entry ("TJE") user interface (presenting options or a setup wizard or the like for adding a tax journal entry for each selected entity, or the like), a manage companies user interface (presenting companies that are associated with or accessible to the user, as well as options to manage the accounts, taxes, financial reports, financial statements, and/or other accounting information associated with each such company, or the like), an engagement letters user interface (presenting options or preferences for the user (typically CPAs or the like) to select to enable autonomous identification of financial and/or tax services offered by the CPA that are not currently covered by an existing engagement letter with a particular one(s) of the entities that are clients to the CPA, and autonomous preparation or generation of an engagement letter to cover such services, or the like, as described herein with respect to FIGS. 1 and 5A, or the like), and/or a logout option, or the like.

With reference to FIG. 3A, the command center user interface 310 might comprise a command center header portion 325, an alerts sub-header portion 330, and a footer portion 335. The command center header portion 325 might include, without limitation, a title (in this case, "Command Center" or the like) and a prompt for the user to "Select a company to view details." The alerts sub-header portion 330 might include, but is not limited to, a title (in this case, "My Alerts" or the like), and options 330a-330d to select, sort by, or filter by, among other things, an alert type 330a, a company 330b, an alert description 330c, and/or persons to whom the alerts are assigned 330d, or the like. The footer portion 335 might include, without limitation, a link to "Home"; a link to "The BACO Group"; a link to a page "About Us" (i.e., the BACO Group or Ford Squared Technologies, or the like); and a link to a Blog; and copyright information associated with the accounting platform; or the like.

In some embodiments, the computing system (such as computing system 105 of FIG. 1, or the like) might determine whether the user (in this case, "Ford" or the like) is associated with one or more entities (in this case, entities 1 through 5, or the like). In response to such determination, the computing system might determine access levels that the user has for each entity among the one or more entities with which the user is associated, with the access levels dictating how much information about each entity is displayed to the user (from a limited access level providing bare minimum information about a particular entity, to an intermediate access level providing more information about a particular entity, to a full access level providing all information about a particular entity, etc., with the types of information being selectively customizable to fit within particular access levels that are not limited to the three listed above). The computing system might then determine or identify which account information or tax information associated with each entity with which the user is associated is important to the user, in some cases, based at least in part on the determined access levels that the user has for each entity with which the user is associated or based at least in part on one or more of user interaction of the user with the computing system, user profile information associated with the user, or user preferences associated with the user, and/or the like.

In some instances, the generated command center user interface 310 might be further configured to highlight at least one of account information or tax information associated with each of at least one entity among the one or more entities with which the user is associated that is determined to be important to the user, based at least in part on the determined access levels that the user has for each of the at least one entity with which the user is associated. In some embodiments, highlighting at least one of account information or tax information associated with each of the at least one entity among the one or more entities might comprise displaying the at least one of account information or tax information encapsulated within corresponding notifications (such as notifications 340a-340e in FIG. 3A, or the like). In such embodiments, the computing system might determine whether issues associated with each of the at least one of account information or tax information associated with each of the at least one entity and encapsulated within corresponding notifications have been addressed and/or resolved.

Based on a determination that at least one issue associated with at least one account information or at least one tax information associated with one or more of the at least one entity has not been addressed or reviewed by the user, the computing system might determine whether at least one notification encapsulating each of the at least one account information or the at least one tax information currently has at least one of a color (e.g., red, or the like), a shape, or a highlighting effect, and/or the like, that is indicative of a status of very important or very urgent. If not, the computing system might change at least one of the color, the shape, or the highlighting effect, and/or the like, of the at least one notification to the at least one of the color, the shape, or the highlighting effect, and/or the like, that is indicative of a status of very important or very urgent.

Based on a determination that at least one issue associated with at least one account information or at least one tax information associated with one or more of the at least one entity has been addressed and reviewed by the user but has not yet been resolved, the computing system might determine whether at least one notification encapsulating each of the at least one account information or the at least one tax information currently has at least one of a color (e.g., amber or orange, or the like), a shape, or a highlighting effect, and/or the like, that is indicative of a status of important or urgent. If not, the computing system might change at least one of the color, the shape, or the highlighting effect, and/or the like, of the at least one notification to the at least one of the color, the shape, or the highlighting effect, and/or the like, that is indicative of a status of important or urgent.

Based on a determination that all issues associated with at least one account information or at least one tax information associated with one or more of the at least one entity have been addressed and resolved, the computing system might determine whether at least one notification encapsulating each of the at least one account information or the at least one tax information currently has at least one of a color (e.g., green, or the like), a shape, or a highlighting effect, and/or the like, that is indicative of issues having been resolved. If not, the computing system might change at least one of the color, the shape, or the highlighting effect, and/or the like, of the at least one notification to the at least one of the color, the shape, or the highlighting effect, and/or the like, that is indicative of issues having been resolved.

In some embodiments, the highlighting effect might include, without limitation, at least one of embossing effect, debossing effect, outlining effect, shadowing effect, patterning effect, reflective effect, or transparency effect, and/or the like. According to some embodiments, the notifications might be automatically reordered or rearranged to more prominently display the most important or most urgent notification (e.g., on the top, at the start of a series of notifications, or the like).

For example, as shown in FIG. 3A, a first notification 340a associated with Entity 1 might be highlighted with a color 345a (in this case, green or the like) indicating that all issues associated with at least one account information or at least one tax information associated with Entity 1 have been addressed and resolved. On the other hand, a second notification 340b associated with Entity 3 might be highlighted with a color 345*b* (in this case, amber or orange, or the like) indicating that at least one issue associated with at least one account information or at least one tax information associated with Entity 3 has been addressed and reviewed by the user but has not yet been resolved. Third through fifth notifications 340*c*-340*e* associated with Entities 2, 4, and 5, respectively, might be highlighted with a color 345*c*, 345*d*, or 345*e* (in this case, red, or the like) indicating that at least one issue associated with at least one account information or at least one tax information associated with each of Entities 2, 4, and 5 has not been addressed or reviewed by the user. Selecting any of these notifications would result in the display of additional information regarding the issues associated with the at least one account information or the at least one tax information associated with the particular entity. For example, selecting the fifth notification 340*e* might result in the display of information as shown in FIG. 3B.

Turning to FIG. 3B, the command center user interface 310 specific to the selected entity (in this case, Entity 5 or the like) might comprise a command center header portion 325', an alert status sub-header portion 330', a financial period status portion 360, and the footer portion 335. The command center head portion 325' might include, without limitation, a title (in this case, "Entity 5: Company Command Center" or the like). The alert status sub-header portion 330' might include, but is not limited to, a title (in this case, "Alert Status" or the like), and headings 330*a*, 330*c*, and 330*d* indicating, among other things, an alert type 330*a*, an alert description 330*c*, and/or persons to whom the alerts are assigned 330*d*, or the like. The footer portion 335 might be the same as the footer portion 335 as shown, and described above, with respect to FIG. 3A. The side panel of the command center user interface 310 of FIG. 3B might be similar to, if not identical, to that of the side panel of the command center user 310 of FIG. 3A. In some cases, the entity name in the side panel header portion 315 might reflect that information regarding the selected entity (in this case, Entity 5 or the like) is being displayed in the command center user interface 310.

As shown in FIG. 3B, when the fifth notification 340*e* in the command center user interface 310 of FIG. 3A has been selected, the alert status portion of the command center user interface 310 of FIG. 3B might display a list of alerts 350*a*-350*d*, with each alert including, but not limited to, an alert type 355*a*, an alert description 355*b*, and an assigned-to field 355*c*, or the like, corresponding to headings, 330*a*, 330*c*, and 330*d*, respectively. For example, a first alert 350*a* (which might be highlighted in red, or the like) might have an alert type 355*a*, "Ask My Accountant" (which may prompt the user to consult with a CPA), with an alert description 355*b*, "There are $65,987.20 worth of transactions in Ask My Accountant" (which might indicate that there are transactions that require further review and/or reallocation, or the like), and an assigned-to field 355*c* that indicates that no one has yet been assigned to handle this alert but has a dropdown list for the user to select such a person. Similarly, a second alert 350*b* (which might also be highlighted in red, or the like) might have an alert type 355*a*, "Custom Alert" (which may also prompt the user to consult with a CPA), with an alert description 355*b*, "There are transactions marked as penalties" (which might indicate that there are transactions that require being designated as deductible or non-deductible, or the like), and an assigned-to field 355*c* that indicates that no one has yet been assigned to handle this alert but has a dropdown list for the user to select such a person. In some instances, a third alert 350*c* (which might be highlighted in amber or orange, or the like) might have an alert type 355*a*, "Fixed Asset Transactions" (which may prompt the user to consult with a CPA), with an alert description 355*b*, "There are 195 transactions in Fixed Asset accounts" (which might indicate that there are transactions that must be identified for tax reporting, or the like), and an assigned-to field 355*c* that indicates that the alert has been assigned to Ford Baker (with his e-mail listed), but has a dropdown list for the user to select someone else (if desired). In another example, a fourth alert 350*d* (which might be highlighted in red, or the like) might have an alert type 355*a*, "Missing Account" (which may also prompt the user to consult with a CPA), with an alert description 355*b*, "There are 2 account(s) with transactions that do not exist in the system" (which might indicate that the missing accounts be entered into the system, or the like), and an assigned-to field 355*c* that indicates that no one has yet been assigned to handle this alert but has a dropdown list for the user to select such a person.

In FIG. 3B, the financial period status portion 360 might provide the user with options to select financial draft through periods or dates as well as to select financial final through periods or dates, with an update button or link to update one or both of these selected periods or dates. By selecting these dates, the notifications depicted in the command center user interface 310 of FIG. 3A might reflect the draft through and final through dates, which may be used by the user to prioritize tasks and alerts.

Although not shown in FIG. 3, the command center user interface might display tax or financial statement lead schedules, with accounts under the lead schedules being expandable or collapsible under the user interface view. For example for a financial statement, a lead schedule that might be displayed might be Operating Expenses, which might include, but is not limited to, the following accounts, for example: Accounting, Advertising, Communications, Occupancy, Office Expense, Salaries and Wages, Supplies, Taxes, etc. The user is given the option to expand each lead to display the accounts under it, or to collapse the lead to hide the accounts. Similarly, each account may be expanded or collapsed to show or hide transactions or journal entries (in the case of financial statements leads or adjusted trial balances) or tax journal entries (in the case of tax leads or tax trial balances), and thus enables aggregation or consolidation of information while providing the option to hide some information from view (to avoid information overload).

Another feature of the command center user interface is the drag and drop feature, which is not available in conventional accounting software. In particular, when reviewing the financial statement lead (or adjusted trial balance (or similarly when reviewing the tax lead (or tax trial balance)), if a journal entry (or tax journal entry, as the case may be) was discovered to be misclassified or discovered to be entered under the wrong account, the system enables the user (e.g., CPA) to drag and drop the incorrect journal entry (or tax journal entry) into the right account, either in the same lead or in a different lead. In response to dragging and dropping the incorrect journal entry (or tax journal entry), the system may automatically credit one account while debiting the other account, and reversing entries as necessary, without the user having to do anything other than dragging and dropping the incorrect journal entry (or tax journal entry) into the correct account. In a non-limiting example, the command center user interface might display a lead schedule or financial statement lead for Company 1, the lead schedule or financial statement lead listing the account leads along with account numbers, as well as listing the account number and account names of accounts under a selected or highlighted account lead. If the user discovers that the account named "Installation" has been misclassified or misplaced in the account lead named "Revenues" (with account number 4000), the user can simply drag the "Installation" Account from the "Revenues" account lead into the correct account lead (in this case, the account lead named "Other Equity" with account number 3400). In response to dragging and dropping the "Installation" account from the wrong account lead ("Revenues") to the correct account lead ("Other Equity"), the system may automatically credit one account while debiting the other account, and reversing entries as necessary, without the user having to do anything other than dragging and dropping the incorrect account into the correct account lead. This drag and drop functionality greatly facilitates review and correction of financial statement leads (or adjusted trial balances) and/or tax leads (or tax trial balances), with minimal if any difficulty, and is intuitive, easy, and quick to use.

FIG. 4 is a schematic diagram illustrating a non-limiting example 400 of chart of accounts mapping, in accordance with various embodiments. In mapping Chart of Accounts, the accounts that a company or entity uses in day to day business activities inside of its accounting software may be automatically assigned to the correct place in the Tax Lead Schedule (or Tax Trial Balance). For example, an account for Pre-Paid Legal Expenses might be assigned to "Prepaid Expenses" for tax purposes. This mapping may be performed by way of a proprietary rules engine (such as rules engine 105b in FIG. 1, or the like). In some cases, the rules engine might identify the account type from the accounting software (e.g., Expense, Long Term Liability, Cash, etc.) and might also identify certain metadata about the account, including, but not limited to, the account name, the account description, the payees, and/or the like, and might use that data to determine whether the account should be assigned. If the rules engine is not able to make a decision on the account, the user may be asked to assign the account. The rules engine may then store the assignment and the corresponding metadata for that account in a data storage device (e.g., database(s) 110 or non-relational data storage system 145 in FIG. 1, or the like), and may use this information when evaluating new transactions.

Referring to FIG. 4, in the non-limiting example 400, an original chart of accounts 405 is shown. The original chart of accounts 405 might contain a number of accounts that include an account number and an account name. For example, the cash account might have 1100 as an account number, while the change and petty cash account might have 1110 as an account number, and the operating account might have 1120 as an account number, and so on. Some of the other accounts might include, without limitation, accounts receivable, trade (customers), inventory, accounts payable, accrued expenses, salaries and wages, rent, interest, and utilities, and the like, with corresponding account numbers being 1200, 1210, 1300, 2100, 2400, 2410, 2430, 2450, and 2480, respectively.

To map the original chart of accounts to a more universal chart of accounts, the computing system (such as computing system 105 of FIG. 1, or the like) might generate a transition chart of accounts 410, which might copy the account names in the original chart of accounts 405, while each account number by a number of digits corresponding to an account number in the original chart of accounts having the largest number of digits (e.g., any of the account numbers from 1100 to 2480, as shown in FIG. 4), resulting in each temporary account number being a decimal number less than 1—namely, 0.1100 (for the cash account), 0.1110 (for the change and petty cash account), 0.1120 (for the operating account), 0.1200 (for the accounts receivable account), 0.1210 (for the trade (customers) account), 0.1300 (for the inventory account), 0.2100 (for the accounts payable account), 0.2400 (for the accrued expenses account), 0.2410 (for the salaries and wages account), 0.2430 (for the rent account), 0.2450 (for the interest account), and 0.2480 (for the utilities account), or the like.

To complete the mapping of the chart of accounts, the computing system might generate a mapped chart of accounts 415, which might replace the account numbers in the transition chart of accounts 410 with corresponding account numbers in the universal chart of accounts, while replacing the original account names in the original chart of accounts 405 with corresponding account names in the universal chart of accounts, resulting in account numbers (and corresponding account names) as follows: 10000 (for the cash account), 10012 (for the petty cash account), 10015 (for the operating account—SLAB), 11000 (for the accounts receivable account), 11003 (for the accounts receivable, trade account), 12100 (for the inventory asset account), 20000 (for the accounts payable account), 21000 (for the accrued expenses account), 60100 (for the salaries and wages account), 60300 (for the rent expense account), 63400 (for the interest account), and 66300 (for the utilities account), or the like, as shown in FIG. 4.

Although specific examples of account numbers and account names are shown in FIG. 4, the various embodiments are not so limited, and any suitable account numbers and/or account names may be used as appropriate or as desired.

FIGS. 5A-5F (collectively, "FIG. 5") are schematic flow diagrams illustrating various non-limiting examples 500, 500',500",500"', and 500"" of alert notification and accounting logic functionalities that are part of implementing accounting platform functionalities, in accordance with various embodiments.

With reference to the non-limiting embodiment 500 of FIG. 5A, an engagement letter preparation process might begin with exporting of client data from an accounting practice management software (e.g., Office Tools® Pro, or other client data tracking software, or the like) into an engagement letter workbook template for an engagement letter preparation utility (block 502). In some embodiments, the client data that is exported, collected, and/or contained in the engagement letter workbook might include, without limitation, a billing summary for each client, a contact list (including, but not limited to, account number, legal name, phone number, and/or employer identification number ("EIN"), and/or the like), and/or data regarding projects by contact (which includes all the projects that have been created for each client), and/or the like.

Once the client data has been exported, a user (e.g., a certified public accountant ("CPA"), an owner(s) of the client, a financial officer(s) of the client, a board member(s) of the client, a representative(s) of the client, or an agent(s) of the client, and/or the like) is provided with options to review and/or modify any information in the engagement letter workbook that needs to be adjusted (block 504). The engagement letter preparation utility (e.g., Baco Tech Engage software, or the like) might also provide the user with options to drag and drop the file (i.e., the saved engagement letter workbook) into the engagement letter preparation utility (block 506). At block 508, the engagement letter preparation utility might generate an engagement letter, based on the client data. As the engagement letter preparation utility has all of the required notices and disclosures, as well as the standard and often required language, from the American Institute of Certified Public Accountants ("AICPA"), the generated engagement letter would be in accordance with all required information. At block 510, the engagement letter preparation utility might e-mail the generated engagement letter to the client. Once the client has received the e-mail with the engagement letter, the client can enter the client's billing information, sign the letter, and upload to an electronic signature software system (e.g., DocuSign® eSignature Transaction Management System, or the like).

Figure 5B:
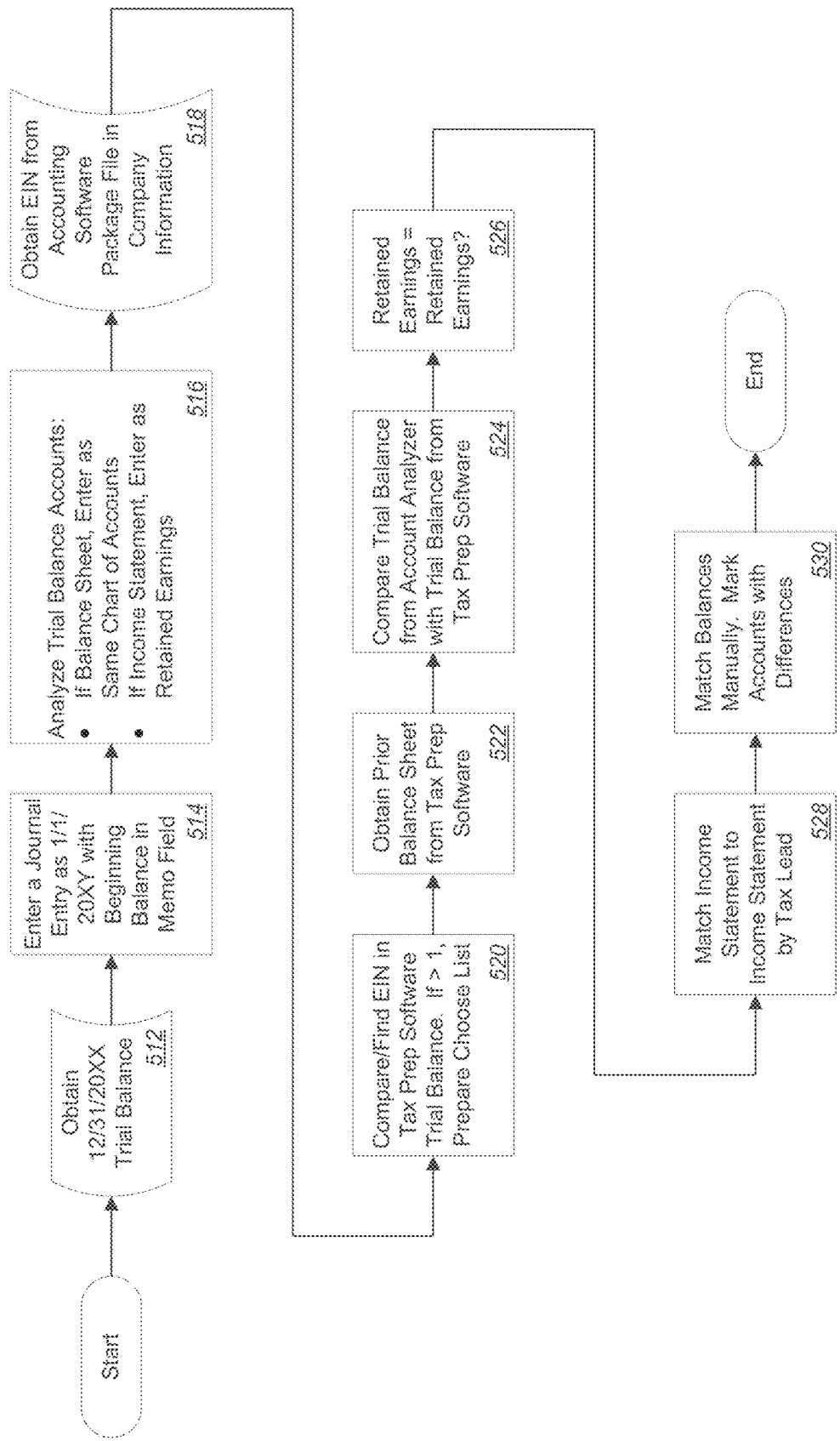

Referring to the non-limiting embodiment 500' of FIG. 5B, onboarding of new clients in accordance with the various embodiments is described. At block 512, the system (such as computing system 105 of FIG. 1, or the like) might the December 31' trial balance from the previous year (i.e., 12/31/20XX trial balance) for the client. At block 514, the system might enter as the January $1^{st}$ entry (i.e., 1/1/20XY entry) with the beginning balance in the memo field. At block 516, the system might analyze the trial balance accounts. If the trial balance account contains a balance sheet, the system might enter as the same chart of accounts. If the trial balance account contains an income statement, the system might enter as retained earnings. At block 518, the system might obtain the client's EIN from an accounting software package file (e.g., a QuickBooks® file, or the like), in company information.

At block 520, the system might compare or find the EIN in the trial balance of a tax preparation software (e.g., Lacerte® tax preparation software, or the like). If there are more than one EIN for the client, the system might prepare a choose list. At block 522, the system might obtain a prior balance sheet from the tax preparation software. At block 524, the system might compare the trial balance from the account analyzer (at block 516) with the trial balance from the tax preparation software (at block 522). At block 526, the system might determine whether the retained earnings based on the two trial balances are the same. If so, the system might match income statement to income statement by tax lead or by tax trial balance (block 528). At block 530, the system might provide the user with options to manually match balances and to mark accounts with differences.

Figure 5C:
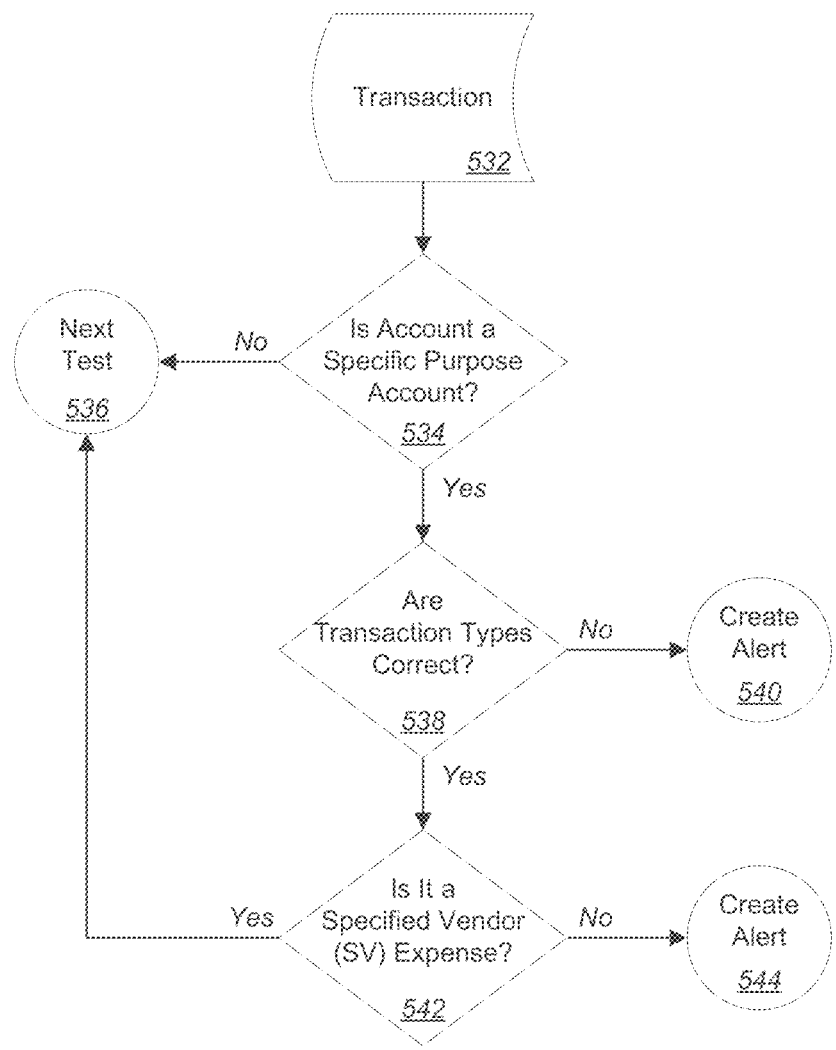

Turning to the non-limiting embodiment 500" of FIG. 5C, an accounting error workflow is shown. For a transaction 532, the system might determine whether an account associated with the transaction is a specific purpose account or special purpose account ("SPA") (block 534). Herein, an SPA might refer to an account (including, but not limited to, accounts receivable, accounts payable, payroll liabilities, and/or sales tax liabilities, and/or the like) that have a prescribed workflow that is used by accounting software to record the creation and subsequent disposition of certain assets and liabilities, by using specific transaction types ("TT") that the system utilizes for a specific accounting process ("SAP"). Herein, a TT that is used to create assets or liabilities in an accounting process might include, without limitation, one of an invoice, a charge, a bill, a paycheck, a payroll liability adjustment, and/or an adjustment. On the other hand, a TT that is used to dispose of assets or liabilities in an accounting process might include, but are not limited to, a customer credit memo, a receipt, a bill payment, a credit, a payroll liability payment, a payroll liability adjustment, a sales tax payment, a customer credit, and/or a sales tax adjustment, and/or the like. Herein also, a SAP might refer to a set of actions that creates and subsequently disposes of specific assets and liabilities, and might include, without limitation, customer balances, vendor balances, payroll taxes, and/or sale tax, and/or the like. Table 1 below illustrates the SPAs, TTs, and specified vendors ("SVs") or types of common expenses that correspond to particular SAPs.

TABLE 1

| | Identified SAP | | | |
|---|---|---|---|---|
| | Customer Balances | Vendor Balances | Payroll Taxes | Sales Tax |
| Identified SPA | Accounts Receivable | Accounts Payable | Payroll Liabilities | Sales Tax Liability |
| Identified TT used to create assets/liabilities | Invoice Charge | Bill | Paycheck Payroll liability adjustment | Invoice Adjustment |
| Identified TT used to dispose of assets/liabilities | Customer Receipt | Bill payment Credit | Payroll liability payment Payroll liability adjustment | Sales tax payment Customer credit Sales tax adjustment |
| SV or Type of common expenses | Customer | Vendor | U.S. Treasury check to payroll tax | |

Turning back to FIG. 5C, based on a determination that the account associated with the transaction is not a SPA, the system proceeds to the process at block 536, at which the system might perform the next test, where another transaction is analyzed for accounting error. On the other hand, based on a determination that the account associated with the transaction is a SPA, the system continues to the process at block 538. At block 538, the system might determine whether the transaction types are correct. If not, the system might create an alert indicating which transaction type(s) is not correct (block 540). If so, the system might determine whether the transaction is a SV expense (block 542). If not, the system might create an alert indicating that the transaction is not a SV expense. If so, the system proceeds to the process at block 536 (which is described above).

Figure 5D:
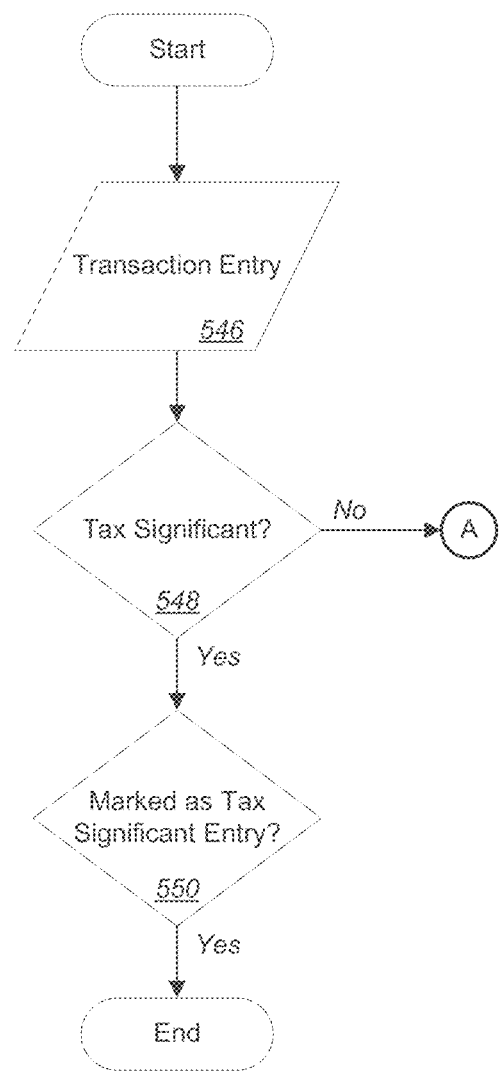
Figure 5E:
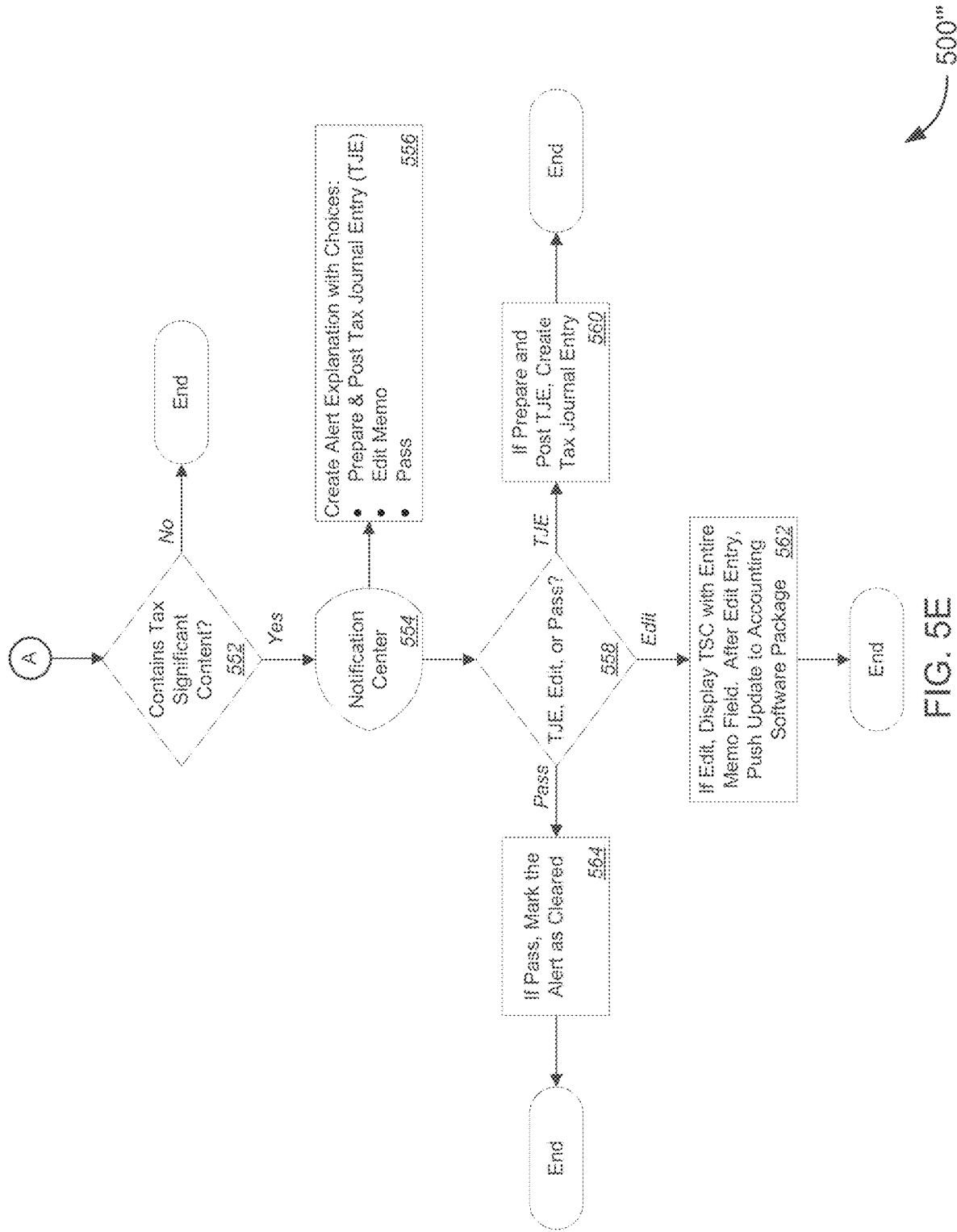

With reference to the non-limiting embodiment 500"' of FIGS. 5D and 5E, a tax significant workflow is shown. At block 546, the system might receive, extract, and/or analyze a transaction entry. Each transaction entry might be one line of a transaction and might include at least one general ledger account that is debited and at least one general ledger account that is credited, where a total number of debited accounts among the at least one general ledger account that is debited equals a total number of credited accounts among the at least one general ledger account that is credited.

At block 548, the system might determine whether the transaction entry corresponding to the extracted transaction data is for a tax significant account. If not, the system might proceed to the process at block 552 in FIG. 5E, following the circular marker denoted, "A." If so, the system might proceed to block 550, at which the system might determine whether the transaction entry has been marked as a tax significant entry ("TSE"). If so, the process ends.

At block 552 in FIG. 5E (following the circular marker denoted, "A"), the system might determine whether the transaction entry contains tax significant content ("TSC"). If not, the process ends. If so, the system might utilize a notification center (at block 554) to create an alert explanation with the following choices (block 556): (i) prepare and post a tax journal entry ("TJE"); (ii) edit memo; or (iii) pass. At block 558, the system might determine which choice was selected by the user (i.e., TJE, Edit, or Pass). Based on a determination that the user selected to prepare and post a tax journal entry, the system might autonomously generate at least one TJE based at least in part on the extracted transaction data (block 560). The process would then end. Alternatively, based on a determination that the user selected to edit a memo, the system, at block 562, might display the TSC with a memo field, might provide options for the user to edit the memo field, and, in response to the user submitting edits to the memo field, might push an update to the accounting software system (or accounting software package or ERP software system) based on the edited memo field. The process would then end. Alternatively, based on a determination that the user selected to pass on the tax significant content, the system might autonomously mark the alert or notification as having been cleared (block 564). The process would then end.

Figure 5F:
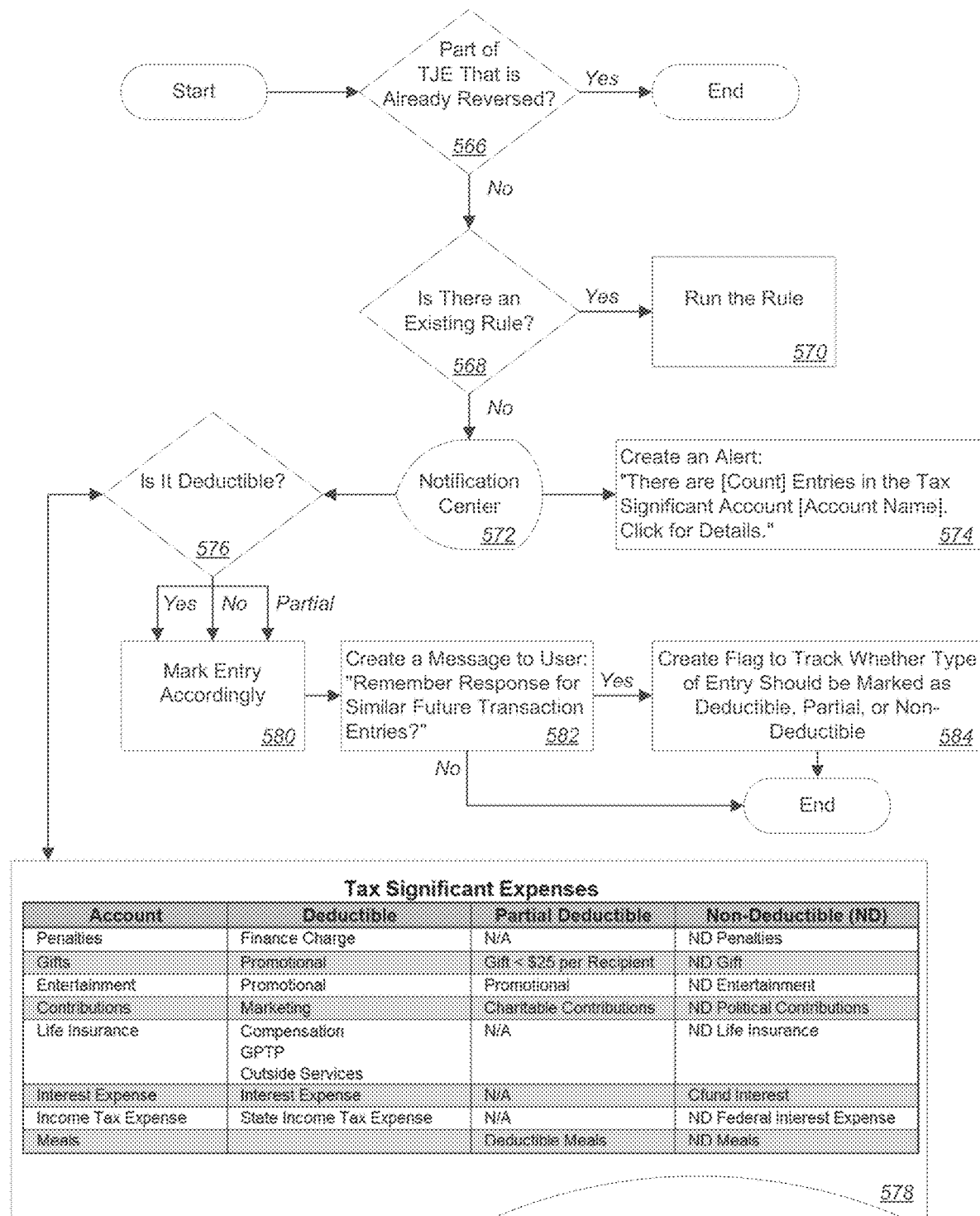

Referring to the non-limiting embodiment 500'''' of FIG. 5F, a tax significant expenses workflow is shown. At block 566, the system might determine whether a transaction entry is part of a TJE that is already (or has already been) reversed. If so, the process would end. If not, the process continues to the process at block 568, at which the system might determine whether there is an existing rule (such as in rules engine 105b in FIG. 1, or the like) for handling such a transaction entry. If so, the system might run the rule (block 570). If not, the system might utilize a notification center (at block 572) to create an alert (block 574) indicating the following: "There are [Count] Entries in the Tax Significant Account [Account Name]. Click for Details." In the actual alert to the user, "[Count]" would be replaced by a number representing the number of entries in the TSA, while "[Account Name]" would be replaced by the name of the TSA. At block 576, the system might determine whether the transaction entry is tax deductible, based at least in part on the information in tax significant expenses ("TSX") chart 578, as shown in FIG. 5F. In response to the system or the user selecting one of "Yes" (or "Deductible"), "No" (or "Non-Deductible"), or "Partial" (or "Partial Deductible"), based on the information in the TSX chart 578, the system might mark the transaction entry accordingly (block 580). At block 582, the system might create a message to the user (or otherwise, prompt the user) as to whether or not to remember the (Deductible, Non-Deductible, or Partial Deductible) response for similar future transaction entries. If not, the process would end. If so, the system might create a flag to track whether the type of transaction entry should be marked as Deductible, Non-Deductible, or Partial Deductible in the future (block 584). The process would then end.

FIGS. 6A-6M (collectively, "FIG. 6") are flow diagrams illustrating a method 600 for implementing accounting platform functionalities, in accordance with various embodiments. Method 600 of FIG. 6A continues onto each of FIGS. 6B-6E following the circular markers denoted, "A," "B," "C," and "D," respectively. Method 600 continues from FIG. 6E onto FIG. 6F following the circular marker denoted, "E," or continues onto FIG. 6G following the circular marker denoted, "F." Method 600 of FIG. 6G continues onto each of FIGS. 6H-6M following the circular markers denoted, "G," "H," "I," "J," "K," and "L," respectively.

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200',300, 400, 500, 500',500",500"', and 500"" of FIGS. 1, 2B-2C, 3A-3B, 4, 5A, 5B, 5C, 5D-5E, and 5F, respectively (or components thereof), such methods may also be implemented using any suitable hardware (or software) implementation. Similarly, while each of the systems, examples, or embodiments 100, 200',300, 400, 500, 500', 500",500"', and 500"" of FIGS. 1, 2B-2C, 3A-3B, 4, 5A, 5B, 5C, 5D-5E, and 5F, respectively (or components thereof), can operate according to the method 600 illustrated by FIG. 6 (e.g., by executing instructions embodied on a computer readable medium), the systems, examples, or embodiments 100, 200',300, 400, 500, 500',500",500"', and 500"" of FIGS. 1, 2B-2C, 3A-3B, 4, 5A, 5B, 5C, 5D-5E, and 5F can each also operate according to other modes of operation and/or perform other suitable procedures.

In the non-limiting embodiment of FIG. 6A, method 600, at block 601, might comprise accessing, with a computing system and from a first accounting software system among a plurality of accounting software systems (or Enterprise resource planning ("ERP") software systems, or accounting software packages such as QuickBooks™ desktop, QuickBooks™ Online, NetSuite™, etc.), at least one data file associated with a first entity among one or more entities. The at least one data file might comprise accounting information associated with the first entity. The plurality of accounting software systems might each operate based on corresponding one of two or more commercial accounting software that are at least one of different from each other or incompatible with each other and that are published by different accounting software developers. Alternatively, method 600, at block 602, might comprise receiving, with the computing system, at least one data file associated with the first entity among the one or more entities, the at least one data file comprising accounting information associated with the first entity.

According to some embodiments, the computing system might include, without limitation, one of a processor of the user device running an app, a server computer over a network, a webserver, a cloud-based computing system over a network, and/or the like. In some embodiments, the plurality of accounting software systems comprises a plurality of Enterprise resource planning ("ERP") software systems, each of which operates based on corresponding one of two or more ERP software. In some cases, the two or more commercial accounting software might include two or more commercial off-the-shelf ("COTS") accounting software.

In some embodiments, accessing the at least one data file associated with the first entity among one or more entities might comprise accessing, with the computing system and from the first accounting software system among the plurality of accounting software systems, the at least one data file associated with the first entity among one or more entities, by using at least one of one or more first application programming interfaces ("APIs") or one or more first software development kits ("SDKs") that enable communication between the computing system and the first accounting software system.

At block 603, method 600 might comprise autonomously extracting, with the computing system, the accounting information from the at least one data file, by extracting transaction data corresponding to a transaction entry for each individual transaction among a plurality of transactions from the accounting information contained within the at least one data file. Each transaction entry might include at least one general ledger account that is debited and at least one general ledger account that is credited, where a total number of debited accounts among the at least one general ledger account that is debited equals a total number of credited accounts among the at least one general ledger account that is credited.

Method 600 might further comprise, at block 604, autonomously generating, with the computing system, a transaction-based trial balance based on the extracted transaction data, the generated transaction-based trial balance serving as a living trial balance that is continually updated based on updated or new transaction data that is accessed from the first accounting software system. Method 600 might further comprise autonomously generating, with the computing system, a tax trial balance, based on the generated transaction-based trial balance (block 605); or autonomously generating, with the computing system, an adjusted trial balance, based on the generated transaction-based trial balance (block 606). The generated tax trial balance facilitates autonomous generation of tax returns for the first entity by aggregating items to input at proper input fields or lines of a tax return form based on information obtained from the generated transaction-based trial balance. The generated adjusted trial balance facilitates autonomous generation of financial statements by aggregating items to input at proper fields of a financial statement based on information obtained from the generated transaction-based trial balance. According to some embodiments, each of the tax trial balance or the adjusted trial balance might be embodied by a rule engine that aggregates the respective items or information, that populates the appropriate documents (e.g., tax return forms, financial statements, etc.), and that produces, generates, and/or sends the finalized documents. Alternatively, each of the tax trial balance or the adjusted trial balance might be embodied by a lead document that lists the respective items or information, that lists corresponding instructions, metadata, and/or links for directing placement or entry of the items or information, and that utilizes an external system (e.g., computing system, rules engine, or the like) to populate the appropriate fields of appropriate documents (e.g., tax return forms, financial statements, etc.) based on the listed items or information and based on the listed instructions, metadata, and/or links contained in the lead document, and that that produces, generates, and/or sends the finalized documents. Alternatively, each of the tax trial balance or the adjusted trial balance might be embodied by a hybrid of these two alternative embodiments. Method 600 of FIG. 6A might continue onto the process(es) at one or more of block 607 in FIG. 6B, block 610 in FIG. 6C, block 613 in FIG. 6D, and block 616 in FIG. 6E following one of the circular markers denoted, "A," "B," "C," and "D," respectively.

At block 607 in FIG. 6B (following the circular marker denoted, "A"), method 600 might comprise autonomously gathering, with the computing system, information contained in one or more journal entries ("JEs") and information contained in one or more tax journal entries ("TJEs"), wherein each of the one or more JEs and the one or more TJEs are generated based on the extracted transaction data. Method 600 might comprise autonomously generating, with the computing system, a report or listing of all journal entries prepared by at least one certified public accountant ("CPA") for inclusion in a client representation letter based on the gathered information (block 608). Method 600, at block 609, might comprise sending, with the computing system, the generated representation letter to a member of management of the first entity for signature by the member of management to represent that financial statements that are generated based on transaction data provided by the first entity amongst other items including the acceptance of the adjustments by management.

At block 610 in FIG. 6C (following the circular marker denoted, "B"), method 600 might comprise updating, with the computing system, records within one or more selected accounts associated with the first entity for one or more selected fiscal years, by: accessing, with the computing system and from the first accounting software system, all transaction data from the one or more selected accounts associated with the first entity within the one or more selected fiscal years (block 611); and replacing, with the computing system, existing transaction data for the one or more selected accounts associated with the first entity for the one or more selected fiscal years with the accessed transaction data from the one or more selected accounts associated with the first entity within the one or more selected fiscal years (block 612). In this manner, the updating process can be performed quickly and without the need to verify or compare existing or new information.

At block 613 in FIG. 6D (following the circular marker denoted, "C"), method 600 might comprise autonomously generating, with the computing system, financial statements based at least in part on one or more of the generated transaction-based trial balance or the extracted transaction data. Method 600, at block 614, might comprise analyzing, with the computing system, the generated financial statements to determine whether individual elements of the financial statements are in compliance with Generally Accepted Accounting Principles ("GAAP") based on factors determined by the CPA firm to develop such an opinion. Method 600 might further comprise autonomously generating and sending, with the computing system, an alert notification to at least one CPA to address matters that will aid the at least one CPA in determining if the financial statements are in compliance with GAAP (block 615).

At block 616 in FIG. 6E (following the circular marker denoted, "D"), method 600 might comprise autonomously analyzing, with the computing system, extracted transaction data among a plurality of extracted transaction data to determine whether the transaction entry corresponding to the extracted transaction data is for a tax significant account. If so, method 600 might continue onto the process at block 624. If not, method 600 might continue onto the process at block 617. At block 617, method 600 might comprise, based on a determination that the transaction entry corresponding to the extracted transaction data is not for a tax significant account, determining, with the computing system, whether the transaction entry corresponding to the extracted transaction data contains any tax significant content. If so, method 600 might continue onto the process at one of block 618 in FIG. 6F, following the circular marker denoted, "E."

At block 618 (following the circular marker denoted, "E"), method 600 might comprise generating, with the computing system, a first notification to a first user, the notification containing options comprising at least one of an option to prepare and post a tax journal entry ("TJE"), an option to edit a memo, or an option to pass on the tax significant content.

In response to the first user selecting the option to prepare and post a tax journal entry, method 600 might further comprise autonomously generating, with the computing system, at least one tax journal entry based at least in part on the extracted transaction data (block 619). Alternatively, in response to the first user selecting the option to edit a memo, method 600 might further comprise displaying, with the computing system, the tax significant content with a memo field (block 620), providing, with the computing system, options for the first user to edit the memo field (block 621), and, in response to the first user submitting edits to the memo field, pushing, with the computing system, an update to the first accounting software system based on the edited memo field (block 622). Alternatively, in response to the first user selecting the option to pass on the tax significant content, method 600 might further comprise autonomously marking, with the computing system, the alert or the first notification as having been cleared (block 623).

Turning back to FIG. 6E, at block 624, method 600 might comprise, based on a determination that the transaction entry corresponding to the extracted transaction data is for a tax significant account, autonomously analyzing, with the computing system, the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting. Method 600, at block 625, might comprise, based on a determination that not all applicable debit and credit entries in the transaction entry have been reversed under the applicable federal and/or state/local tax basis of accounting, performing the following (which are shown in FIG. 6G, following the circular marker denoted, "F"): identifying, with the computing system, all applicable debit and credit entries in the transaction entry that should be reversed (block 626); autonomously reversing, with the computing system, the identified applicable debit and credit entries (block 627); sending, with the computing system, a prompt to a first user indicating whether or not to reverse any future similar entries (optional block 628); in response to receiving instructions to reverse future similar entries, generating, with the computing system, a first flag associated with the first entity, indicating to reverse any future similar entries (optional block 629); generating, with the computing system, one or more tax journal entries based at least in part on at least one of the reversed identified applicable debit and credit entries or the extracted transaction data (block 630); and marking, with the computing system, at least one of the transaction entry or the one or more tax journal entries as having been reversed (block 631).

In some embodiments, accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed may be performed on an ongoing basis throughout each fiscal year (e.g., tax year or calendar year, or the like).

Figure 6H:
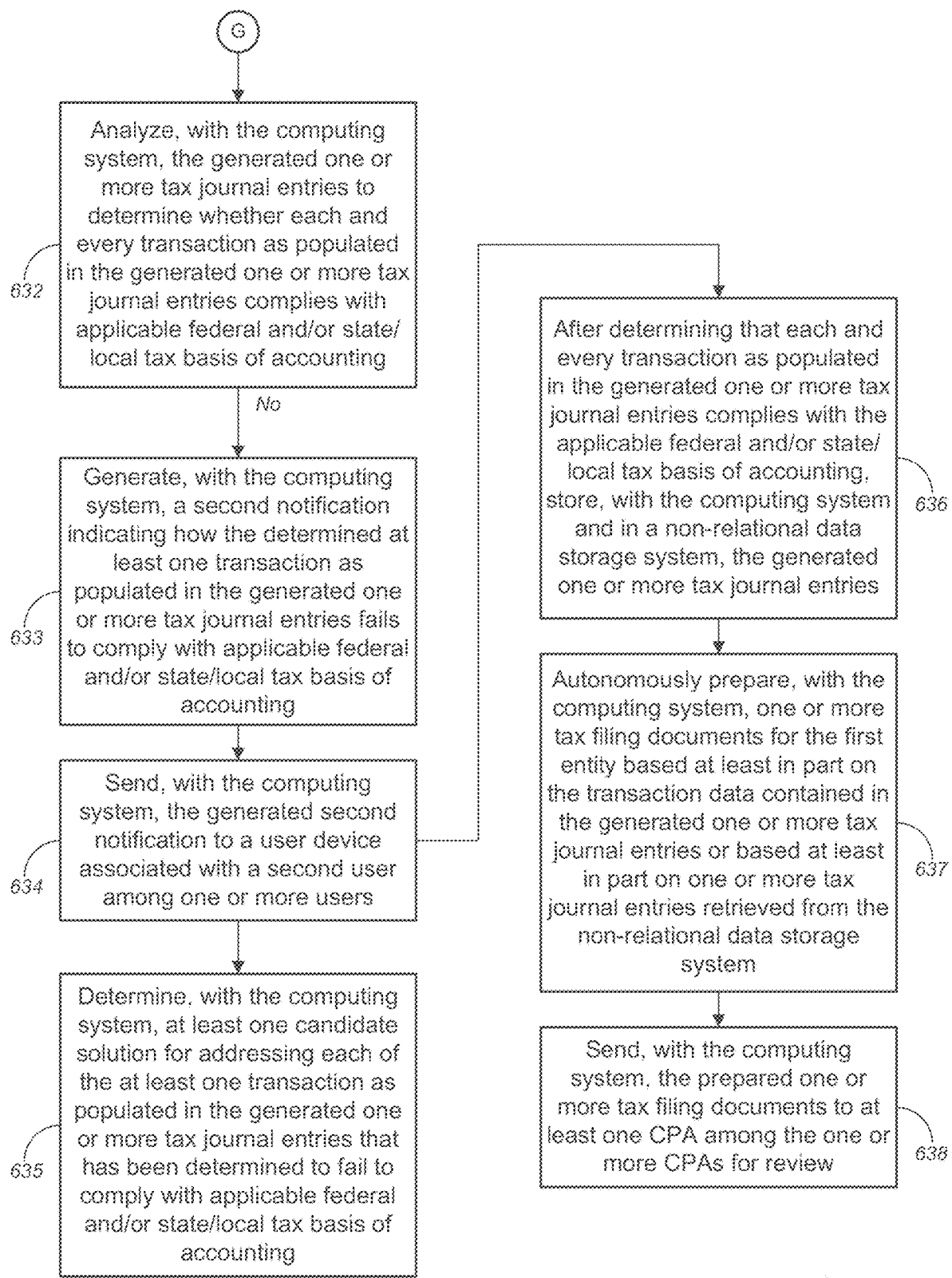
Figure 6I:
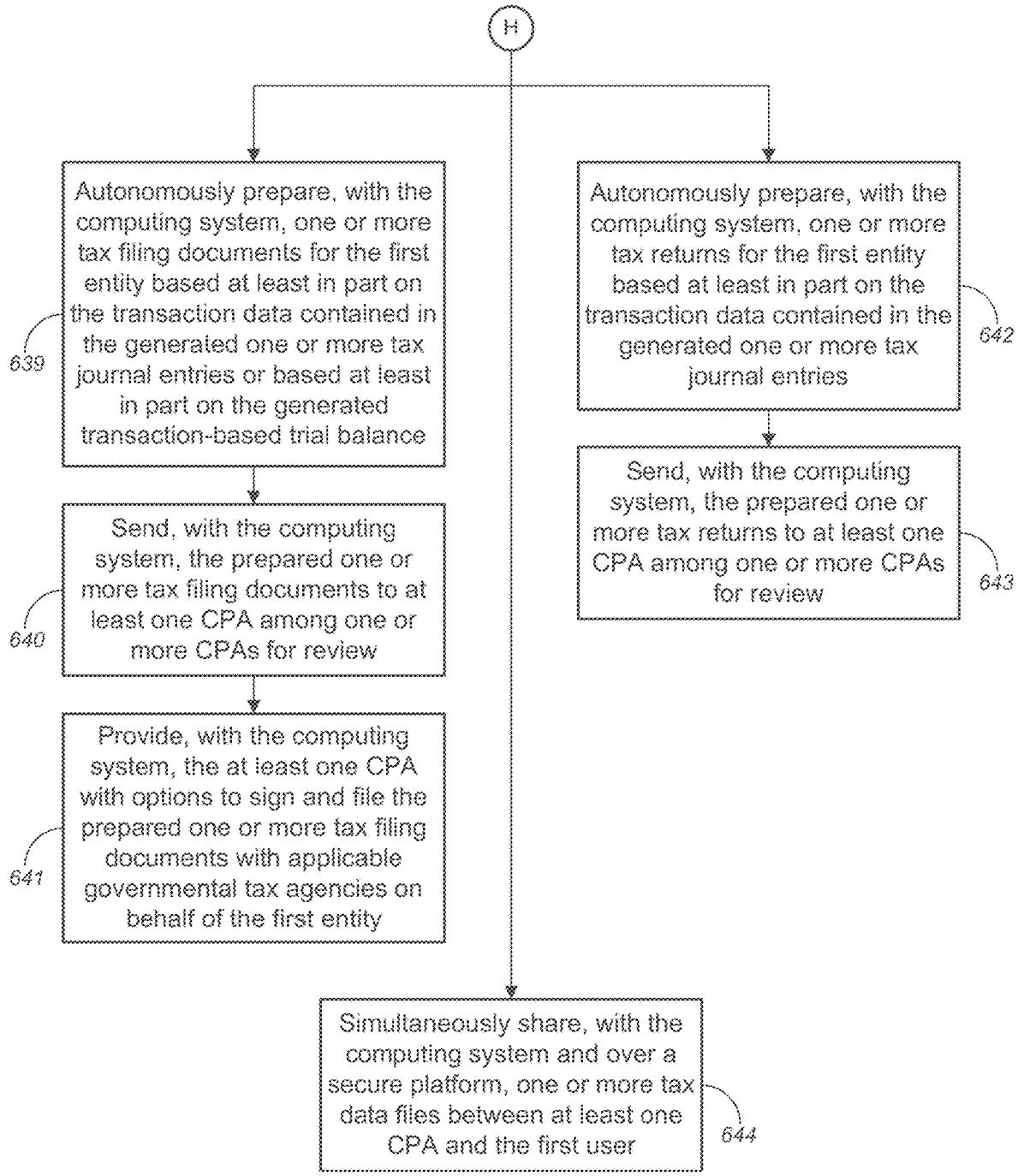
Figure 6J:
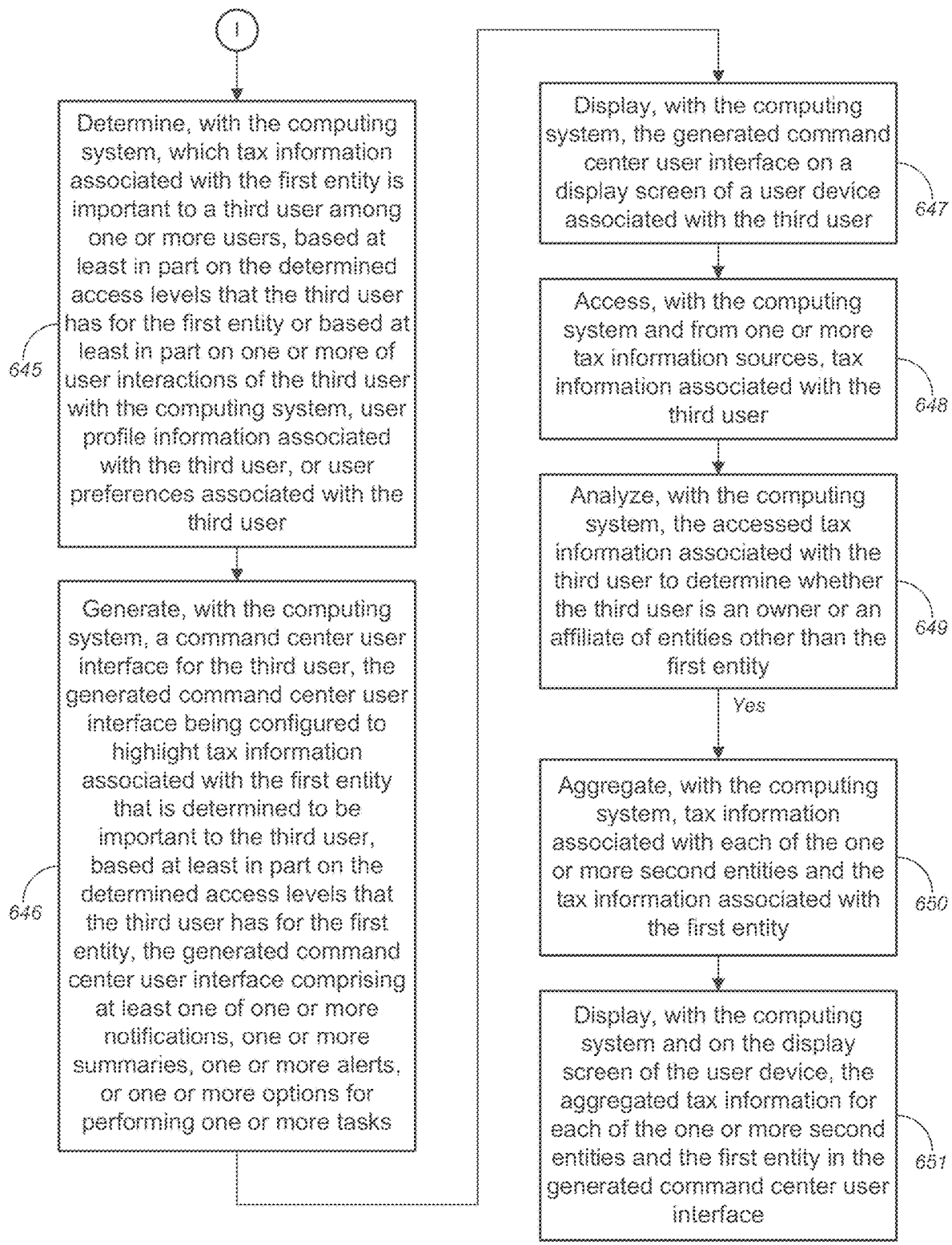
Figure 6K:
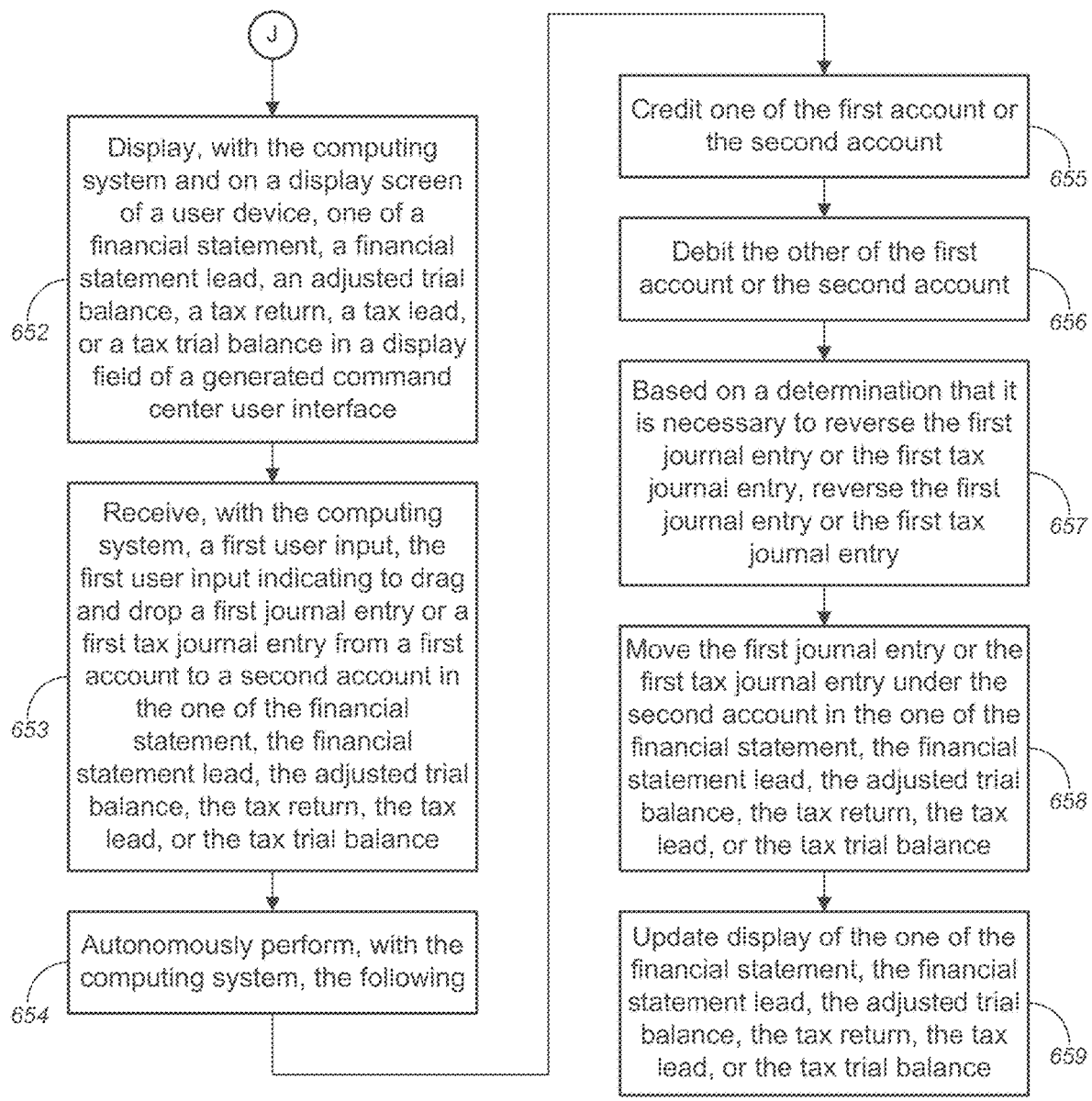
Figure 6L:
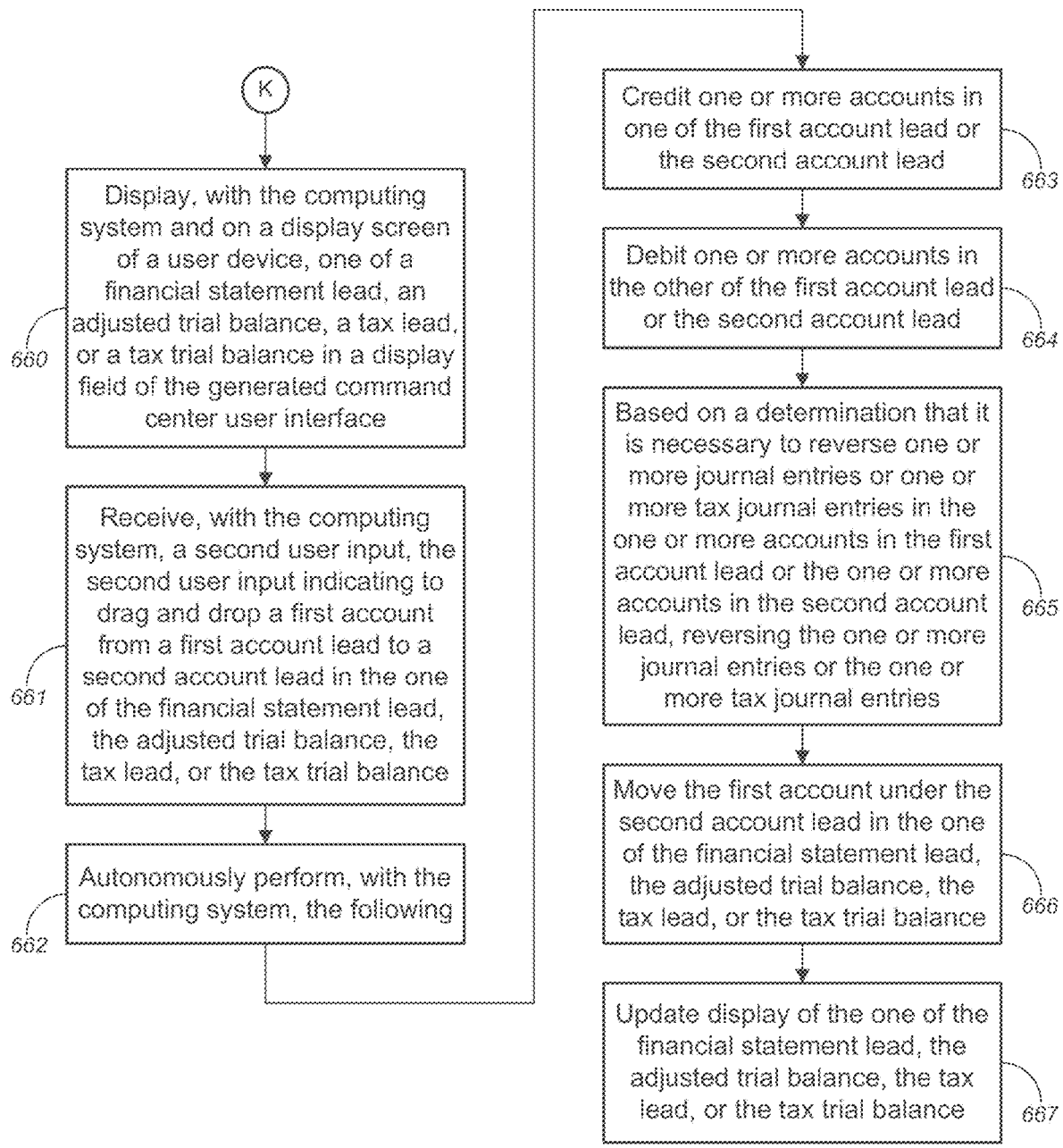
Figure 6M:
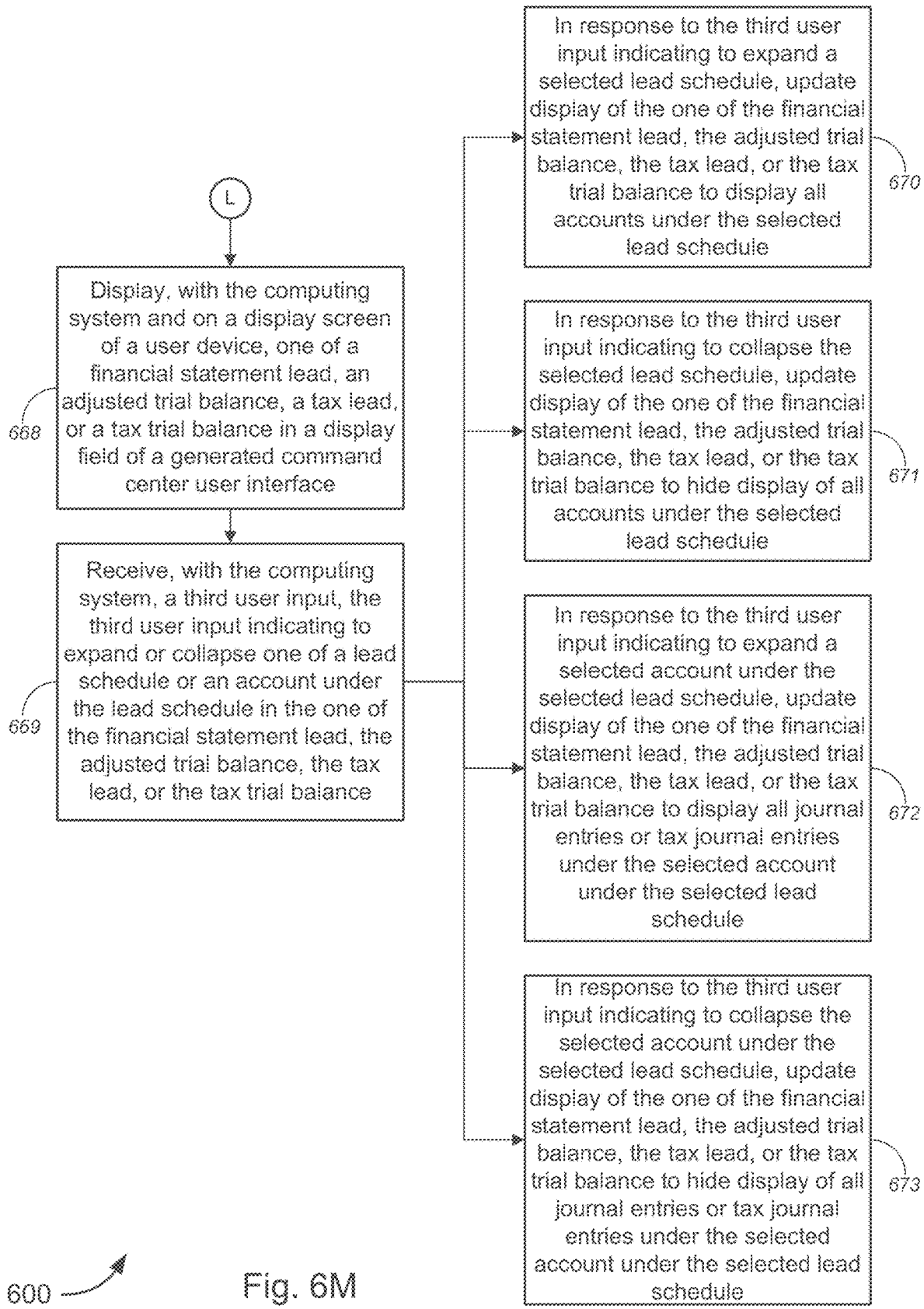

Method 600 might continue onto at least one of the process at block 632 in FIG. 6H following the circular marker denoted, "G," the process at block 639, 642, or 644 in FIG. 6I following the circular marker denoted, "H," the process at block 645 in FIG. 6J following the circular marker denoted, "I," the process at block 652 in FIG. 6K following the circular marker denoted, "J," the process at block 660 in FIG. 6L following the circular marker denoted, "J," or the process at block 668 in FIG. 6M following the circular marker denoted, "L."

At block 632 in FIG. 6H (following the circular marker denoted, "G"), method 600 might comprise analyzing, with the computing system, the generated one or more tax journal entries to determine whether each and every transaction as populated in the generated one or more tax journal entries complies with the applicable federal and/or state/local tax basis of accounting. In some embodiments, analyzing the generated one or more tax journal entries to determine whether each and every transaction as populated in the generated one or more tax journal entries complies with the applicable federal and/or state/local tax basis of accounting might comprise analyzing the generated one or more tax journal entries, using rule engine functionality, to determine whether each and every transaction as populated in the generated one or more tax journal entries complies with the applicable federal and/or state/local tax basis of accounting.

Based on a determination that at least one transaction as populated in the generated one or more tax journal entries fails to comply with the applicable federal and/or state/local tax basis of accounting, method 600 might comprise performing the following: generating, with the computing system, a second notification indicating how the determined at least one transaction as populated in the generated one or more tax journal entries fails to comply with the applicable federal and/or state/local tax basis of accounting (block 633); and sending, with the computing system, the generated second notification to a user device associated with a second user among one or more users (block 634). In some instances, the one or more users might include, but are not limited to, at least one of one or more CPAs working for the first entity, one or more owners of the first entity, one or more financial officers of the first entity, one or more board members of the first entity, one or more representatives of the first entity, or one or more agents of the first entity, and/or the like.

Method 600 might further comprise, at block 635, determining, with the computing system, at least one candidate solution for addressing each of the at least one transaction as populated in the generated one or more tax journal entries that has been determined to fail to comply with the applicable federal and/or state/local tax basis of accounting. In some cases, the generated second notification that is sent to the second user might further include the determined at least one candidate solution for addressing each of the at least one transaction that has been determined to fail to comply with the applicable federal and/or state/local tax basis of accounting. According to some embodiments, determining at least one candidate solution for addressing each of the at least one transaction as populated in the generated one or more tax journal entries that has been determined to fail to comply with the applicable federal and/or state/local tax basis of accounting might comprise determining, using rule engine functionality, at least one candidate solution for addressing each of the at least one transaction as populated in the generated one or more tax journal entries that has been determined to fail to comply with the applicable federal and/or state/local tax basis of accounting.

Alternatively, or additionally, method 600 might further comprise, after determining that each and every transaction as populated in the generated one or more tax journal entries complies with the applicable federal and/or state/local tax basis of accounting, storing, with the computing system and in a non-relational data storage system, the generated one or more tax journal entries (block 636); autonomously preparing, with the computing system, one or more tax filing documents for the first entity based at least in part on the transaction data contained in the generated one or more tax journal entries or based at least in part on one or more tax journal entries retrieved from the non-relational data storage system (block 637); and sending, with the computing system, the prepared one or more tax filing documents to at least one CPA among the one or more CPAs for review (block 638). Herein, the one or more tax filing documents might include, without limitation, at least one of federal and/or state/local tax filing forms, supporting documents, a client's files in the CPA's tax preparation software, exported reports from the system or platform to import into the tax preparation software, and/or the like.

At block 639 in FIG. 6I (following the circular marker denoted, "H"), method 600 might comprise autonomously preparing, with the computing system, one or more tax filing documents for the first entity based at least in part on the transaction data contained in the generated one or more tax journal entries. Method 600 might further comprise sending, with the computing system, the prepared one or more tax filing documents to at least one CPA among the one or more CPAs for review (block 640); and providing, with the computing system, the at least one CPA with options to sign and file the prepared one or more tax filing documents with applicable governmental tax agencies on behalf of the first entity (block 641).

Alternatively, at block 642 in FIG. 6I (following the circular marker denoted, "H"), method 600 might comprise autonomously preparing, with the computing system, one or more tax returns for the first entity based at least in part on the transaction data contained in the generated one or more tax journal entries. Method 600, at block 643, might comprise sending, with the computing system, the prepared one or more tax returns to at least one CPA among the one or more CPAs for review.

Alternatively, at block 644 in FIG. 6I (following the circular marker denoted, "H"), method 600 might comprise simultaneously sharing, with the computing system and over a secure platform, one or more tax data files between at least one CPA and the first user. The one or more tax data files might include, without limitation, at least one of one or more tax-related workpapers, one or more tax estimates, or one or more tax-related financial documents associated with the first entity, and/or the like.

At block 645 in FIG. 6J (following the circular marker denoted, "I"), method 600 might comprise determining, with the computing system, which tax information associated with the first entity is important to a third user among one or more users, based at least in part on the determined access levels that the third user has for the first entity or based at least in part on one or more of user interactions of the third user with the computing system, user profile information associated with the third user, or user preferences associated with the third user, and/or the like. Method 600 might further comprise, at block 646, generating, with the computing system, a command center user interface for the third user. The generated command center user interface might be configured to highlight tax information associated with the first entity that is determined to be important to the third user, based at least in part on the determined access levels that the third user has for the first entity. The generated command center user interface might include, but is not limited to, at least one of one or more notifications, one or more summaries, one or more alerts, or one or more options for performing one or more tasks, and/or the like. Method 600 might further comprise displaying, with the computing system, the generated command center user interface on a display screen of a user device associated with the third user (block 647).

Alternatively, or additionally, method 600 might comprise, at block 648, accessing, with the computing system and from one or more tax information sources, tax information associated with the third user. At block 649, method 600 might comprise analyzing, with the computing system, the accessed tax information associated with the third user to determine whether the third user is an owner or an affiliate of entities other than the first entity. Method 600 might further comprise, based on a determination that the third user is an owner or an affiliate of one or more second entities, aggregating, with the computing system, tax information associated with each of the one or more second entities and the tax information associated with the first entity (block 650), and displaying, with the computing system and on the display screen of the user device, the aggregated tax information for each of the one or more second entities and the first entity in the generated command center user interface (block 651). In some instances, the third user might be provided with full access to the tax information associated with each of at least one entity among the one or more second entities based on a determination that the third user is an owner of each of the at least one entity. Alternatively, or additionally, the third user might be provided with limited access to the tax information associated with each of one or more entities among the one or more second entities based on a determination that the third user is an affiliate of each of the one or more entities. Aggregation of entities and access to information based on ownership or affiliation is described in detail above with respect to FIG. 2B.

At block 652 in FIG. 6K (following the circular marker denoted, "J"), method 600 might comprise displaying, with the computing system and on the display screen of the user device, one of a financial statement, a financial statement lead, an adjusted trial balance, a tax return, a tax lead, or a tax trial balance in a display field of the generated command center user interface. Method 600, at block 653, might comprise receiving, with the computing system, a first user input, the first user input indicating to drag and drop a first journal entry or a first tax journal entry from a first account to a second account in the one of the financial statement, the financial statement lead, the adjusted trial balance, the tax return, the tax lead, or the tax trial balance. At block 654, method 600 might comprise autonomously performing, with the computing system, the following: crediting one of the first account or the second account (block 655); debiting the other of the first account or the second account (block 656); based on a determination that it is necessary to reverse the first journal entry or the first tax journal entry, reversing the first journal entry or the first tax journal entry (block 657); moving the first journal entry or the first tax journal entry under the second account in the one of the financial statement, the financial statement lead, the adjusted trial balance, the tax return, the tax lead, or the tax trial balance (block 658); and updating display of the one of the financial statement, the financial statement lead, the adjusted trial balance, the tax return, the tax lead, or the tax trial balance (block 659).

At block 660 in FIG. 6L (following the circular marker denoted, "K"), method 600 might comprise displaying, with the computing system and on the display screen of the user device, one of a financial statement lead, an adjusted trial balance, a tax lead, or a tax trial balance in a display field of the generated command center user interface. Method 600, at block 661, might comprise receiving, with the computing system, a second user input, the second user input indicating to drag and drop a first account from a first account lead to a second account lead in the one of the financial statement lead, the adjusted trial balance, the tax lead, or the tax trial balance. At block 662, method 600 might comprise autonomously performing, with the computing system, the following: crediting one or more accounts in one of the first account lead or the second account lead (block 663); debiting one or more accounts in the other of the first account lead or the second account lead (block 664); based on a determination that it is necessary to reverse one or more journal entries or one or more tax journal entries in the one or more accounts in the first account lead or the one or more accounts in the second account lead, reversing the one or more journal entries or the one or more tax journal entries (block 665); moving the first account under the second account lead in the one of the financial statement lead, the adjusted trial balance, the tax lead, or the tax trial balance (block 666); and updating display of the one of the financial statement lead, the adjusted trial balance, the tax lead, or the tax trial balance (block 667).

At block 668 in FIG. 6M (following the circular marker denoted, "L"), method 600 might comprise displaying, with the computing system and on the display screen of the user device, one of a financial statement lead, an adjusted trial balance, a tax lead, or a tax trial balance in a display field of the generated command center user interface. Method 600 might further comprise, at block 669, receiving, with the computing system, a second user input, the second user input indicating to expand or collapse one of a lead schedule or an account under the lead schedule in the one of the financial statement lead, the adjusted trial balance, the tax lead, or the tax trial balance. Method 600 might further comprise: in response to the second user input indicating to expand a selected lead schedule, updating display of the one of the financial statement lead, the adjusted trial balance, the tax lead, or the tax trial balance to display all accounts under the selected lead schedule (block 670); in response to the second user input indicating to collapse the selected lead schedule, updating display of the one of the financial statement lead, the adjusted trial balance, the tax lead, or the tax trial balance to hide display of all accounts under the selected lead schedule (block 671); in response to the second user input indicating to expand a selected account under the selected lead schedule, updating display of the one of the financial statement lead, the adjusted trial balance, the tax lead, or the tax trial balance to display all journal entries or tax journal entries under the selected account under the selected lead schedule (block 672); or in response to the second user input indicating to collapse the selected account under the selected lead schedule, updating display of the one of the financial statement lead, the adjusted trial balance, the tax lead, or the tax trial balance to hide display of all journal entries or tax journal entries under the selected account under the selected lead schedule (block 673).

Exemplary System and Hardware Implementation

Figure 7:
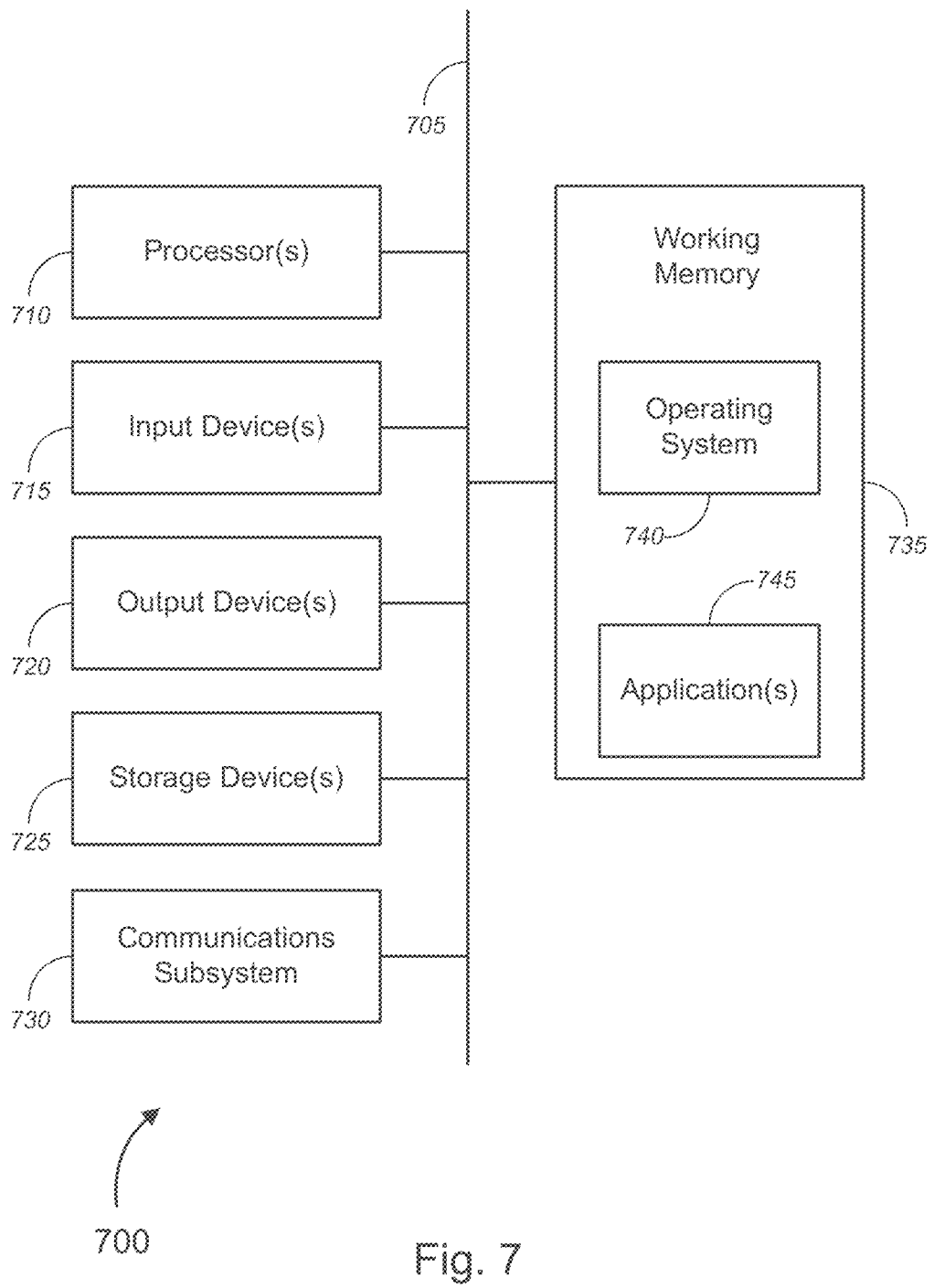
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing system 105, accounting or Enterprise resource planning ("ERP") software systems 120a-120n, web server 150, user devices 165a-165n and 305, and rule engine 175, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing system 105, accounting or ERP software systems 120a-120n, web server 150, user devices 165a-165n and 305, and rule engine 175, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 may further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
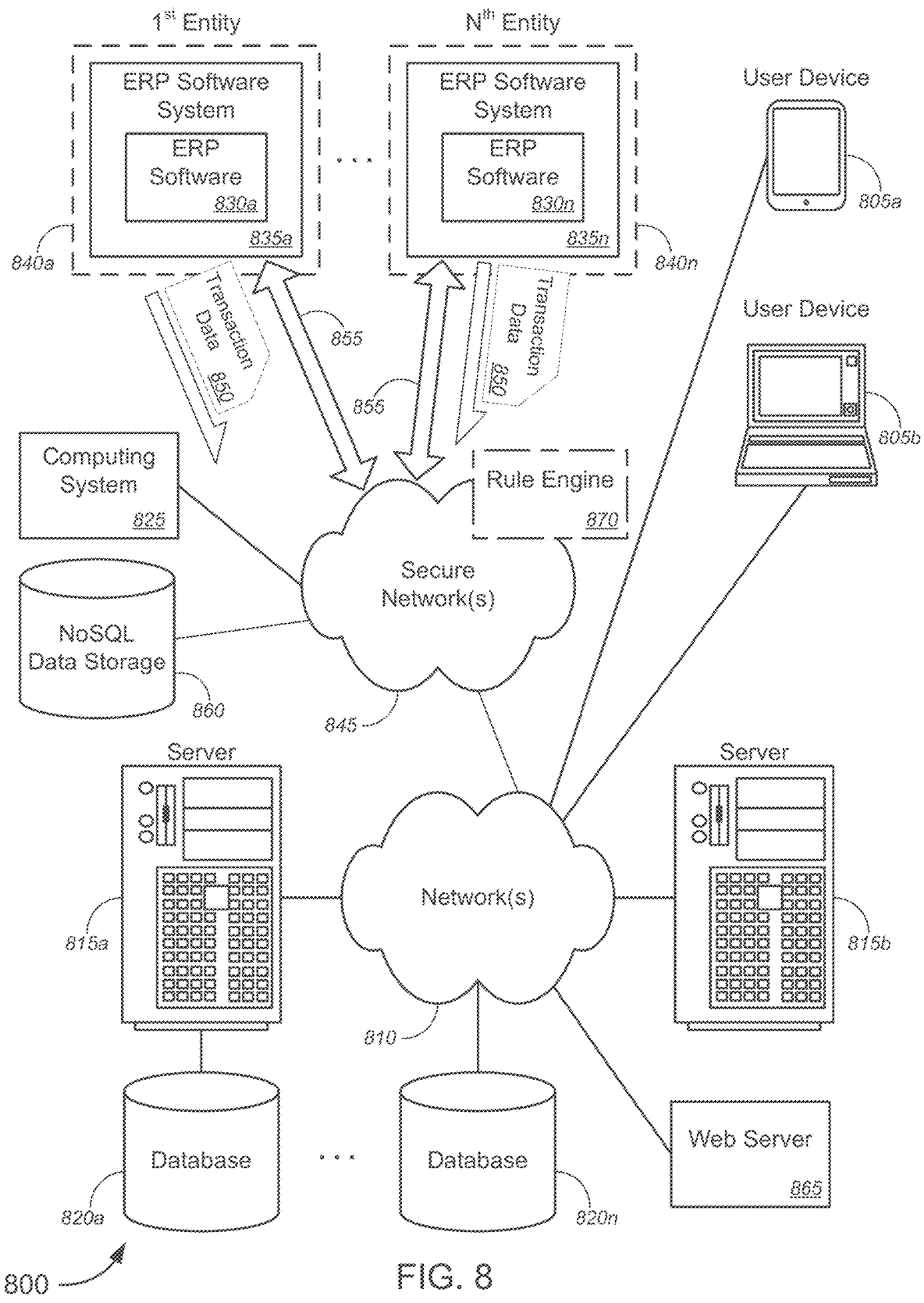
FIG. 8 is a block diagram illustrating a networked system of computers, computing systems, or system hardware architecture, which can be used in accordance with various embodiments.

As noted above, a set of embodiments comprises methods and systems for implementing accounting software functionalities, and, more particularly, to methods, systems, and apparatuses for implementing accounting platform functionalities. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 810 (similar to network(s) 130 or 160 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing accounting software functionalities, and, more particularly, to methods, systems, and apparatuses for implementing accounting platform functionalities, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 (similar to computing system 105 of FIG. 1, or the like), accounting software or Enterprise resource planning ("ERP") software 830a-830n (collectively, "accounting software 830" or "ERP software 830" or the like; similar to ERP software 115a-115n of FIG. 1, or the like) that are executed on corresponding accounting software systems or ERP software systems 835a-835n (collectively, "accounting software systems 835" or "ERP software systems 835" or "ERP systems 835" or the like; similar to accounting or ERP software systems 120a-120n of FIG. 1, or the like) that are associated with or used by first through N$^{th}$ entities 840a-840n (collectively, "entities 840" or the like; similar to entities 125a-125n of FIG. 1, or the like). System 800 might further comprise secure network(s) 845 (similar to secure network(s) 130 of FIG. 1, or the like), a non-relational ("NoSQL") data storage system 860 (similar to non-relational data storage system 145 of FIG. 1, or the like), a web server 865 (similar to web server 150 of FIG. 1, or the like), and rule engine 870 (optional; similar to rule engine 175 of FIG. 1, or the like).

In operation, computing system 825 and/or rule engine 870 (collectively, "computing system" or the like) might access, from a first accounting or ERP software system 835a among a plurality of accounting or ERP software systems 835a-835n, at least one data file associated with a first entity 840a among one or more entities 840a-840n. The at least one data file might comprise accounting information associated with the first entity 840a. The plurality of accounting or ERP software systems 835a-835n might each operate based on corresponding one of two or more commercial accounting or ERP software 830a-830n that are at least one of different from each other or incompatible with each other, and that are published by different accounting or ERP software developers. In some cases, the two or more commercial accounting or ERP software might comprise two or more commercial off-the-shelf ("COTS") accounting or ERP software, or the like. In some embodiments, accessing the at least one data file associated with the first entity 840a among the one or more entities 840a-840n might comprise accessing, from the first accounting or ERP software system 835a among the plurality of accounting or ERP software systems 835a-835n, the at least one data file associated with the first entity 840a among one or more entities 840a-840n, by using at least one of one or more first application programming interfaces ("APIs") or one or more first software development kits ("SDKs") that enable communication between the computing system and the first accounting or ERP software system, as represented in FIG. 8 by the double-headed arrow 855 between the first accounting or ERP software system 835a and secure network(s) 845, to which the computing system is communicatively coupled and/or is part of. Alternatively, the computing system might receive the at least one data file associated with the first entity 840a among one or more entities 840a-840n—the at least one data file comprising accounting information associated with the first entity 840a—that is sent either from the first accounting or ERP software system 835a or from the non-relational data storage system 860 (both via secure network(s) 845).

According to some embodiments, the computing system might autonomously extract the accounting information from the at least one data file, by extracting transaction data 850 corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited.

In some embodiments, the computing system might autonomously generate a transaction-based trial balance based on the extracted transaction data, the generated transaction-based trial balance serving as a living trial balance that is continually updated based on updated or new transaction data that is accessed from the first accounting or ERP software system. In some instances, the computing system might autonomously generate one of a tax trial balance or an adjusted trial balance, based on the generated transaction-based trial balance.

Merely by way of example, in some cases, the generated tax trial balance might facilitate autonomous generation of tax returns for the first entity by aggregating items to input at proper input fields or lines of a tax return form based on information obtained from the generated transaction-based trial balance. Similarly, the generated adjusted trial balance might facilitate autonomous generation of financial statements by aggregating items to input at proper fields of a financial statement based on information obtained from the generated transaction-based trial balance. According to some embodiments, each of the tax trial balance or the adjusted trial balance might be embodied by a rule engine that aggregates the respective items or information, that populates the appropriate documents (e.g., tax return forms, financial statements, etc.), and that produces, generates, and/or sends the finalized documents. Alternatively, each of the tax trial balance or the adjusted trial balance might be embodied by a lead document that lists the respective items or information, that lists corresponding instructions, metadata, and/or links for directing placement or entry of the items or information, and that utilizes an external system (e.g., computing system, rules engine, or the like) to populate the appropriate fields of appropriate documents (e.g., tax return forms, financial statements, etc.) based on the listed items or information and based on the listed instructions, metadata, and/or links contained in the lead document, and that that produces, generates, and/or sends the finalized documents. Alternatively, each of the tax trial balance or the adjusted trial balance might be embodied by a hybrid of these two alternative embodiments.

According to some embodiments, the computing system might autonomously analyze extracted transaction data among a plurality of extracted transaction data to determine whether the transaction entry corresponding to the extracted transaction data is for a tax significant account.

Based on a determination that the transaction entry corresponding to the extracted transaction data is for a tax significant account, the computing system might autonomously analyze the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting. Based on a determination that not all applicable debit and credit entries in the transaction entry have been reversed under the applicable federal and/or state/local tax basis of accounting, the computing system might identify all applicable debit and credit entries in the transaction entry that should be reversed, might autonomously reverse the identified applicable debit and credit entries, might generate one or more tax journal entries based at least in part on at least one of the reversed identified applicable debit and credit entries or the extracted transaction data, and might mark at least one of the transaction entry or the one or more tax journal entries as having been reversed.

In some embodiments, accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed are performed on an ongoing basis throughout each fiscal year (e.g., tax year or calendar year, or the like).

According to some embodiments, based on a determination that the transaction entry corresponding to the extracted transaction data is not for a tax significant account, the computing system might determine whether the transaction entry corresponding to the extracted transaction data contains any tax significant content. Based on a determination that the transaction entry corresponding to the extracted transaction data contains tax significant content, the computing system might generate a first notification to a first user, the notification containing options comprising at least one of an option to prepare a tax significant entry, an option to edit a memo, or an option to pass on the tax significant content, and/or the like. In response to the first user selecting the option to prepare a tax significant entry, the computing system might autonomously generate at least one tax journal entry based at least in part on the extracted transaction data 850. In response to the first user selecting the option to edit a memo, the computing system might display the tax significant content with a memo field, might provide options for the first user to edit the memo field, and, in response to the first user submitting edits to the memo field, might push an update to the first accounting or ERP software system 835a based on the edited memo field. In response to the first user selecting the option to pass on the tax significant content, the computing system might autonomously mark the tax significant entry as having been cleared.

In some embodiments, based on a determination that not all applicable debit and credit entries in the transaction entry have been reversed under the applicable federal and/or state/local tax basis of accounting, the computing system might send a prompt to the first user indicating whether or not to reverse the identified applicable debit and credit entries as well as any future similar entries. In response to receiving a response from the first user indicating to reverse the identified applicable debit and credit entries as well as any future similar entries, the computing system might generate a first flag associated with the first entity, the first flag indicating to reverse the identified applicable debit and credit entries as well as any future similar entries. The first flag may be stored in one or more of database(s) 820a-820n and/or non-relational data storage system 860, or the like. The computing system might query the one or more of database(s) 820a-820n and/or non-relational data storage system 860 for flags such as the first flag prior to or when perform tasks, and may function accordingly.

According to some embodiments, the computing system might update records within one or more selected accounts associated with the first entity 840a for one or more selected fiscal years, in some cases, by accessing, from the first accounting or ERP software system 835a, all transaction data from the one or more selected accounts associated with the first entity 840a within the one or more selected fiscal years; and replacing existing transaction data for the one or more selected accounts associated with the first entity 840a for the one or more selected fiscal years with the accessed transaction data transaction data from the one or more selected accounts associated with the first entity 840a within the one or more selected fiscal years.

In some embodiments, the computing system might analyze the generated one or more tax journal entries to determine whether each and every transaction as populated in the generated one or more tax journal entries complies with the applicable federal and/or state/local tax basis of accounting, which in some cases may be performed using rule engine functionality. Based on a determination that at least one transaction as populated in the generated one or more tax journal entries fails to comply with the applicable federal and/or state/local tax basis of accounting, the computing system might generate a second notification indicating how the determined at least one transaction as populated in the generated one or more tax journal entries fails to comply with the applicable federal and/or state/local tax basis of accounting; and might send the generated second notification to the first user device 805a associated with the first user. In some cases, the computing system might determine at least one candidate solution for addressing each of the at least one transaction as populated in the generated one or more tax journal entries that has been determined to fail to comply with the applicable federal and/or state/local tax basis of accounting, which in some cases may also be performed using rule engine functionality. In some instances, the generated second notification that is sent to the first user device 805a associated with the first user might further comprise the determined at least one candidate solution for addressing each of the at least one transaction that has been determined to fail to comply with the applicable federal and/or state/local tax basis of accounting.

Alternatively, or additionally, after determining that each and every transaction as populated in the generated one or more tax journal entries complies with the applicable federal and/or state/local tax basis of accounting, the computing system might store, in a non-relational data storage system 860, the generated one or more tax journal entries; might autonomously prepare one or more tax filing documents for the first entity 840a based at least in part on the transaction data contained in the generated one or more tax journal entries or based at least in part on one or more tax journal entries retrieved from the non-relational data storage system 860; and might send the prepared one or more tax filing documents to at least one CPA among the one or more CPAs (who might be one or more of the users, or the like) for review. Herein, the one or more tax filing documents might include, without limitation, at least one of federal and/or state/local tax filing forms, supporting documents, a client's files in the CPA's tax preparation software, exported reports from the system or platform to import into the tax preparation software, and/or the like. Alternatively, even without determining whether or not the generated one or more tax journal entries complies with the applicable federal and/or state/local tax basis of accounting, the computing system might autonomously prepare one or more tax filing documents for the first entity based at least in part on the transaction data contained in the generated one or more tax journal entries and/or contained in the tax information associated with the first entity or based at least in part on the generated transaction-based trial balance, and might send the prepared one or more tax filing documents to at least one CPA among one or more CPAs (who might be one or more of the users, or the like) for review. Regardless of the computing system determining whether or not the generated one or more tax journal entries complies with the applicable federal and/or state/local tax basis of accounting, the computing system might provide the at least one CPA with options to sign (e.g., using electronic signature software, as described with respect to FIG. 5A, or the like) and file the prepared one or more tax filing documents with applicable governmental tax agencies on behalf of the first entity.

Alternatively, or additionally, the computing system might autonomously prepare one or more tax returns for the first entity 840a based at least in part on the transaction data contained in the generated one or more tax journal entries, and might send the prepared one or more tax returns to at least one CPA among one or more CPAs (who might be one or more of the users, or the like) for review. Alternatively, or additionally, the computing system might simultaneously share, over a secure platform, one or more tax data files between at least one CPA and a representative of the first entity 840a (which might include the first user or another of the users, or the like). In some cases, the one or more tax data files might include, without limitation, at least one of one or more tax-related workpapers, one or more tax estimates, or one or more tax-related financial documents, and/or the like, associated with the first entity 840a.

According to some embodiments, the computing system might autonomously gather information contained in one or more journal entries ("JEs") and information contained in one or more tax journal entries ("TJEs"), wherein each of the one or more JEs and the one or more TJEs are generated based on the extracted transaction data; might autonomously generate a report or listing of all journal entries prepared by at least one CPA for inclusion in a client representation letter based on the gathered information; and might send the generated representation letter to a member of management of the first entity for signature by the member of management. The representation letter, when signed by the member of management of the first entity, represents that financial statements that are generated based on transaction data provided by the first entity amongst other items including the acceptance of the adjustments by management.

In some embodiments, the computing system might autonomously generate financial statements based at least in part on one or more of the generated transaction-based trial balance or the extracted transaction data; might analyze the generated financial statements to determine whether individual elements of the financial statements are in compliance with Generally Accepted Accounting Principles ("GAAP") based on factors determined by the CPA firm to develop such an opinion; and might autonomously generate and send an alert notification to the at least one CPA to address matters that will aid the at least one CPA in determining if the financial statements are in compliance with GAAP.

According to some embodiments, the computing system might determine which account information or tax information associated with the first entity 840a is important to a first user, based at least in part on the determined access levels that the first user has for the first entity 840a or based at least in part on one or more of user interaction of the first user with the computing system, user profile information associated with the first user, or user preferences associated with the first user. The computing system might then generate a command center user interface (a non-limiting example of which is shown in FIGS. 3A and 3B, or the like) for the first user, the generated command center user interface being configured to highlight at least one of account information or tax information associated with the first entity 840a that is determined to be important to the first user, based at least in part on the determined access levels that the first user has for the first entity 840a. The generated command center user interface might include, but is not limited to, at least one of one or more notifications, one or more summaries, one or more alerts, or one or more options for performing one or more tasks, and/or the like. Subsequently, the computing system might display the generated command center user interface on a display screen of a user device 805a associated with the first user.

In some embodiments, the computing system might access, from one or more tax information sources, tax information associated with the third user; might analyze the accessed tax information associated with the third user to determine whether the third user is an owner or an affiliate of entities other than the first entity; and, based on a determination that the third user is an owner or an affiliate of one or more second entities, might aggregate tax information associated with each of the one or more second entities and the tax information associated with the first entity, and might display, on the display screen of the user device, the aggregated tax information for each of the one or more second entities and the first entity in the generated command center user interface. In some instances, the third user might be provided with full access to the tax information associated with each of at least one entity among the one or more second entities based on a determination that the third user is an owner of each of the at least one entity. Alternatively, or additionally, the third user might be provided with limited access to the tax information associated with each of one or more entities among the one or more second entities based on a determination that the third user is an affiliate of each of the one or more entities. Aggregation of entities and access to information based on ownership or affiliation is described in detail above with respect to FIG. 2B.

According to some embodiments, the web server 865 (and corresponding data store) might perform functions include, but not limited to, user authentication, data access, or content provisioning, and/or the like. In some cases, the web server 865 might contain all the logic for the user experience (including, without limitation, logic for report generation, logic for alerts processing, logic for editing accounting details, and/or the like).

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    accessing, with a computing system and from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers;
    autonomously extracting, with the computing system, the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited;
    autonomously generating, with the computing system, a transaction-based trial balance based on the extracted transaction data, the generated transaction-based trial balance serving as a living trial balance that is continually updated based on updated or new transaction data that is accessed from the first accounting software system; and
    autonomously generating, with the computing system, one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

2. The method of claim 1, wherein accessing the at least one data file associated with the first entity among one or more entities comprises accessing, with the computing system and from the first accounting software system among the plurality of accounting software systems, the at least one data file associated with the first entity among one or more entities, by using at least one of one or more first application programming interfaces ("APIs") or one or more first software development kits ("SDKs") that enable communication between the computing system and the first accounting software system.

3. The method of claim 1, wherein the plurality of accounting software systems comprises a plurality of Enterprise resource planning ("ERP") software systems, each of which operates based on corresponding one of two or more ERP software.

4. The method of claim 1, wherein the two or more commercial accounting software comprise two or more commercial off-the-shelf ("COTS") accounting software.

5. The method of claim 1, further comprising:
    autonomously analyzing, with the computing system, extracted transaction data among a plurality of extracted transaction data to determine whether the transaction entry corresponding to the extracted transaction data is for a tax significant account;
    based on a determination that the transaction entry corresponding to the extracted transaction data is for a tax significant account, autonomously analyzing, with the computing system, the extracted transaction data to identify debit entries and credit entries for each individual transaction for accounting in accordance with applicable federal and/or state/local tax basis of accounting and to determine whether all applicable debit and credit entries in the transaction entry have been reversed under the applicable federal and/or state/local tax basis of accounting; and
    based on a determination that not all applicable debit and credit entries in the transaction entry have been reversed under the applicable federal and/or state/local tax basis of accounting, identifying, with the computing system, all applicable debit and credit entries in the transaction entry that should be reversed, autonomously reversing, with the computing system, the identified applicable debit and credit entries, generating, with the computing system, one or more tax journal entries based at least in part on at least one of the reversed identified applicable debit and credit entries or the extracted transaction data, and marking, with the computing system, at least one of the transaction entry or the one or more tax journal entries as having been reversed.

6. The method of claim 5, wherein accessing the at least one data file associated with the first entity, autonomously extracting the accounting information from the at least one data file, autonomously generating the transaction-based trial balance, autonomously generating the one of the tax trial balance or the adjusted trial balance, autonomously analyzing extracted transaction data among a plurality of extracted transaction data to determine whether the transaction entry corresponding to the extracted transaction data is for a tax significant account, autonomously analyzing the extracted transaction data to identify debit entries and credit entries for each individual transaction and to determine whether all applicable debit and credit entries in the transaction entry have been reversed under the applicable federal and/or state/local tax basis of accounting, identifying all applicable debit and credit entries in the transaction entry that should be reversed, autonomously reversing the identified applicable debit and credit entries, generating one or more tax journal entries, and marking at least one of the transaction entry or the one or more tax journal entries as having been reversed are performed on an ongoing basis throughout each fiscal year.

7. The method of claim 5, further comprising:
based on a determination that the transaction entry corresponding to the extracted transaction data is not for a tax significant account, determining, with the computing system, whether the transaction entry corresponding to the extracted transaction data contains any tax significant content;
based on a determination that the transaction entry corresponding to the extracted transaction data contains tax significant content, generating, with the computing system, a first notification to a first user, the notification containing options comprising at least one of an option to prepare a tax significant entry, an option to edit a memo, or an option to pass on the tax significant content;
in response to the first user selecting the option to prepare a tax significant entry, autonomously generating, with the computing system, at least one tax journal entry based at least in part on the extracted transaction data;
in response to the first user selecting the option to edit a memo, displaying, with the computing system, the tax significant content with a memo field, providing, with the computing system, options for the first user to edit the memo field, and, in response to the first user submitting edits to the memo field, pushing, with the computing system, an update to the first accounting software system based on the edited memo field; and
in response to the first user selecting the option to pass on the tax significant content, autonomously marking, with the computing system, the tax significant entry as having been cleared.

8. The method of claim 5, wherein, based on a determination that not all applicable debit and credit entries in the transaction entry have been reversed under the applicable federal and/or state/local tax basis of accounting, the method further comprises:
sending, with the computing system, a prompt to a first user indicating whether or not to reverse the identified applicable debit and credit entries as well as any future similar entries; and
in response to receiving a response from the first user indicating to reverse the identified applicable debit and credit entries as well as any future similar entries, generating, with the computing system, a first flag associated with the first entity, the first flag indicating to reverse the identified applicable debit and credit entries as well as any future similar entries.

9. The method of claim 5, further comprising:
analyzing, with the computing system, the generated one or more tax journal entries to determine whether each and every transaction as populated in the generated one or more tax journal entries complies with the applicable federal and/or state/local tax basis of accounting; and
based on a determination that at least one transaction as populated in the generated one or more tax journal entries fails to comply with the applicable federal and/or state/local tax basis of accounting, performing the following:
generating, with the computing system, a second notification indicating how the determined at least one transaction as populated in the generated one or more tax journal entries fails to comply with the applicable federal and/or state/local tax basis of accounting, and
sending, with the computing system, the generated second notification to a user device associated with a second user among one or more users;
wherein the one or more users comprise at least one of one or more certified public accountants ("CPAs") working for the first entity, one or more owners of the first entity, one or more financial officers of the first entity, one or more board members of the first entity, one or more representatives of the first entity, or one or more agents of the first entity.

10. The method of claim 9, wherein analyzing the generated one or more tax journal entries to determine whether each and every transaction as populated in the generated one or more tax journal entries complies with the applicable federal and/or state/local tax basis of accounting comprises analyzing the generated one or more tax journal entries, using rule engine functionality, to determine whether each and every transaction as populated in the generated one or more tax journal entries complies with the applicable federal and/or state/local tax basis of accounting.

11. The method of claim 9, further comprising:
determining, with the computing system, at least one candidate solution for addressing each of the at least one transaction as populated in the generated one or more tax journal entries that has been determined to fail to comply with the applicable federal and/or state/local tax basis of accounting;
wherein the generated second notification that is sent to the second user further comprises the determined at least one candidate solution for addressing each of the at least one transaction that has been determined to fail to comply with the applicable federal and/or state/local tax basis of accounting.

12. The method of claim 11, wherein determining at least one candidate solution for addressing each of the at least one transaction as populated in the generated one or more tax journal entries that has been determined to fail to comply with the applicable federal and/or state/local tax basis of accounting comprises determining, using rule engine functionality, at least one candidate solution for addressing each of the at least one transaction as populated in the generated one or more tax journal entries that has been determined to fail to comply with the applicable federal and/or state/local tax basis of accounting.

13. The method of claim 9, further comprising:
after determining that each and every transaction as populated in the generated one or more tax journal entries complies with the applicable federal and/or state/local tax basis of accounting, storing, with the computing system and in a non-relational data storage system, the generated one or more tax journal entries;
autonomously preparing, with the computing system, one or more tax filing documents for the first entity based at least in part on the transaction data contained in the generated one or more tax journal entries or based at least in part on one or more tax journal entries retrieved from the non-relational data storage system; and
sending, with the computing system, the prepared one or more tax filing documents to at least one CPA among the one or more CPAs for review.

14. The method of claim 5, further comprising:
autonomously preparing, with the computing system, one or more tax filing documents for the first entity based at least in part on the transaction data contained in the generated one or more tax journal entries or based at least in part on the generated transaction-based trial balance; and
sending, with the computing system, the prepared one or more tax filing documents to at least one certified public accountant ("CPA") among one or more CPAs for review.

15. The method of claim 14, further comprising:
providing, with the computing system, the at least one CPA with options to sign and file the prepared one or more tax filing documents with applicable governmental tax agencies on behalf of the first entity.

16. The method of claim 5, further comprising:
autonomously preparing, with the computing system, one or more tax returns for the first entity based at least in part on the transaction data contained in the generated one or more tax journal entries; and
sending, with the computing system, the prepared one or more tax returns to at least one certified public accountant ("CPA") among one or more CPAs for review.

17. The method of claim 1, further comprising:
simultaneously sharing, with the computing system and over a secure platform, one or more tax data files between at least one certified public accountant ("CPA") and the first user, wherein the one or more tax data files comprise at least one of one or more tax-related workpapers, one or more tax estimates, or one or more tax-related financial documents associated with the first entity.

18. The method of claim 1, further comprising:
autonomously gathering, with the computing system, information contained in one or more journal entries ("JEs") and information contained in one or more tax journal entries ("TJEs"), wherein each of the one or more JEs and the one or more TJEs are generated based on the extracted transaction data;
autonomously generating, with the computing system, a report or listing of all journal entries prepared by at least one certified public accountant ("CPA") for inclusion in a client representation letter based on the gathered information; and
sending, with the computing system, the generated representation letter to a member of management of the first entity for signature by the member of management to represent that financial statements that are generated based on transaction data provided by the first entity amongst other items including the acceptance of the adjustments by management.

19. The method of claim 1, further comprising:
updating, with the computing system, records within one or more selected accounts associated with the first entity for one or more selected fiscal years, by:
accessing, with the computing system and from the first accounting software system, all transaction data from the one or more selected accounts associated with the first entity within the one or more selected fiscal years; and
replacing, with the computing system, existing transaction data for the one or more selected accounts associated with the first entity for the one or more selected fiscal years with the accessed transaction data from the one or more selected accounts associated with the first entity within the one or more selected fiscal years.

20. The method of claim 1, further comprising:
autonomously generating, with the computing system, financial statements based at least in part on one or more of the generated transaction-based trial balance or the extracted transaction data;
analyzing, with the computing system, the generated financial statements to determine whether individual elements of the generated financial statements are in compliance with Generally Accepted Accounting Principles ("GAAP") based on factors determined by a certified public accountant ("CPA") firm to develop such an opinion; and
autonomously generating and sending, with the computing system, an alert notification to at least one CPA to address matters that will aid the at least one CPA in determining if the financial statements are in compliance with GAAP.

21. The method of claim 1, further comprising:
determining, with the computing system, which tax information associated with the first entity is important to a third user among one or more users, based at least in part on the determined access levels that the third user has for the first entity or based at least in part on one or more of user interactions of the third user with the computing system, user profile information associated with the third user, or user preferences associated with the third user;
generating, with the computing system, a command center user interface for the third user, the generated command center user interface being configured to highlight tax information associated with the first entity that is determined to be important to the third user, based at least in part on the determined access levels that the third user has for the first entity, the generated command center user interface comprising at least one of one or more notifications, one or more summaries, one or more alerts, or one or more options for performing one or more tasks; and
displaying, with the computing system, the generated command center user interface on a display screen of a user device associated with the third user.

22. The method of claim 21, further comprising:
accessing, with the computing system and from one or more tax information sources, tax information associated with the third user;
analyzing, with the computing system, the accessed tax information associated with the third user to determine whether the third user is an owner or an affiliate of entities other than the first entity; and
based on a determination that the third user is an owner or an affiliate of one or more second entities, aggregating, with the computing system, tax information associated with each of the one or more second entities and the tax information associated with the first entity, and displaying, with the computing system and on the display screen of the user device, the aggregated tax information for each of the one or more second entities and the first entity in the generated command center user interface, wherein the third user is provided with full access to the tax information associated with each of at least one entity among the one or more second entities based on a determination that the third user is an owner of each of the at least one entity, and wherein the third user is provided with limited access to the tax information associated with each of one or more entities among the one or more second entities based on a determination that the third user is an affiliate of each of the one or more entities.

23. The method of claim 21, further comprising:
displaying, with the computing system and on the display screen of the user device, one of a financial statement, a financial statement lead, an adjusted trial balance, a tax return, a tax lead, or a tax trial balance in a display field of the generated command center user interface;
receiving, with the computing system, a first user input, the first user input indicating to drag and drop a first journal entry or a first tax journal entry from a first account to a second account in the one of the financial statement, the financial statement lead, the adjusted trial balance, the tax return, the tax lead, or the tax trial balance;
autonomously performing, with the computing system, the following:
 crediting one of the first account or the second account;
 debiting the other of the first account or the second account;
 based on a determination that it is necessary to reverse the first journal entry or the first tax journal entry, reversing the first journal entry or the first tax journal entry;
 moving the first journal entry or the first tax journal entry under the second account in the one of the financial statement, the financial statement lead, the adjusted trial balance, the tax return, the tax lead, or the tax trial balance; and
 updating display of the one of the financial statement, the financial statement lead, the adjusted trial balance, the tax return, the tax lead, or the tax trial balance.

24. The method of claim 21, further comprising:
displaying, with the computing system and on the display screen of the user device, one of a financial statement lead, an adjusted trial balance, a tax lead, or a tax trial balance in a display field of the generated command center user interface;
receiving, with the computing system, a second user input, the second user input indicating to drag and drop a first account from a first account lead to a second account lead in the one of the financial statement lead, the adjusted trial balance, the tax lead, or the tax trial balance;
autonomously performing, with the computing system, the following:
 crediting one or more accounts in one of the first account lead or the second account lead;
 debiting one or more accounts in the other of the first account lead or the second account lead;
 based on a determination that it is necessary to reverse one or more journal entries or one or more tax journal entries in the one or more accounts in the first account lead or the one or more accounts in the second account lead, reversing the one or more journal entries or the one or more tax journal entries;
 moving the first account under the second account lead in the one of the financial statement lead, the adjusted trial balance, the tax lead, or the tax trial balance; and
 updating display of the one of the financial statement lead, the adjusted trial balance, the tax lead, or the tax trial balance.

25. The method of claim 21, further comprising:
displaying, with the computing system and on the display screen of the user device, one of a financial statement lead, an adjusted trial balance, a tax lead, or a tax trial balance in a display field of the generated command center user interface;
receiving, with the computing system, a third user input, the third user input indicating to expand or collapse one of a lead schedule or an account under the lead schedule in the one of the financial statement lead, the adjusted trial balance, the tax lead, or the tax trial balance;
in response to the third user input indicating to expand a selected lead schedule, updating display of the one of the financial statement lead, the adjusted trial balance, the tax lead, or the tax trial balance to display all accounts under the selected lead schedule;
in response to the third user input indicating to collapse the selected lead schedule, updating display of the one of the financial statement lead, the adjusted trial balance, the tax lead, or the tax trial balance to hide display of all accounts under the selected lead schedule;
in response to the third user input indicating to expand a selected account under the selected lead schedule, updating display of the one of the financial statement lead, the adjusted trial balance, the tax lead, or the tax trial balance to display all journal entries or tax journal entries under the selected account under the selected lead schedule; and
in response to the third user input indicating to collapse the selected account under the selected lead schedule, updating display of the one of the financial statement lead, the adjusted trial balance, the tax lead, or the tax trial balance to hide display of all journal entries or tax journal entries under the selected account under the selected lead schedule.

26. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
 access, from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers;
 autonomously extract the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited;

autonomously generate a transaction-based trial balance based on the extracted transaction data, the generated transaction-based trial balance serving as a living trial balance that is continually updated based on updated or new transaction data that is accessed from the first accounting software system; and autonomously generate one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

27. A system, comprising:
a computing system, comprising:
   at least one first processor; and
   a first non-transitory computer readable medium communicatively coupled to the at least one first processor, the first non-transitory computer readable medium having stored thereon computer software comprising a first set of instructions that, when executed by the at least one first processor, causes the computing system to:
      access, from a first accounting software system among a plurality of accounting software systems, at least one data file associated with a first entity among one or more entities, the at least one data file comprising accounting information associated with the first entity, wherein the plurality of accounting software systems each operates based on corresponding one of two or more commercial accounting software that are at least one of different from each other or incompatible with each other and that are published by different accounting software developers;
      autonomously extract the accounting information from the at least one data file, by extracting transaction data corresponding to a transaction entry for each individual transaction among a plurality of transactions from the accounting information contained within the at least one data file, each transaction entry comprising at least one general ledger account that is debited and at least one general ledger account that is credited, wherein a total number of debited accounts among the at least one general ledger account that is debited equals a total number of credited accounts among the at least one general ledger account that is credited;
      autonomously generate a transaction-based trial balance based on the extracted transaction data, the generated transaction-based trial balance serving as a living trial balance that is continually updated based on updated or new transaction data that is accessed from the first accounting software system; and
      autonomously generate one of a tax trial balance or an adjusted trial balance, based on the generated transaction-based trial balance, wherein the generated tax trial balance facilitates autonomous generation of tax returns for the first entity by aggregating items to input at proper input fields or lines of a tax return form based on information obtained from the generated transaction-based trial balance, wherein the generated adjusted trial balance facilitates autonomous generation of financial statements by aggregating items to input at proper fields of a financial statement based on information obtained from the generated transaction-based trial balance.

28. The system of claim 27, wherein the computing system comprises one of a processor of the user device running an app, a server computer over a network, a webserver, a cloud-based computing system over a network.

* * * * *